Oct. 25, 1966 G. GUIBEAUD 3,280,946
GEAR CHANGE CONTROL DEVICE FOR AUTOMOTIVE VEHICLES
Filed Oct. 23, 1964 6 Sheets-Sheet 1

INVENTOR
GEORGES GUIBEAUD

BY *Sherman & Shalloway*
ATTORNEYS

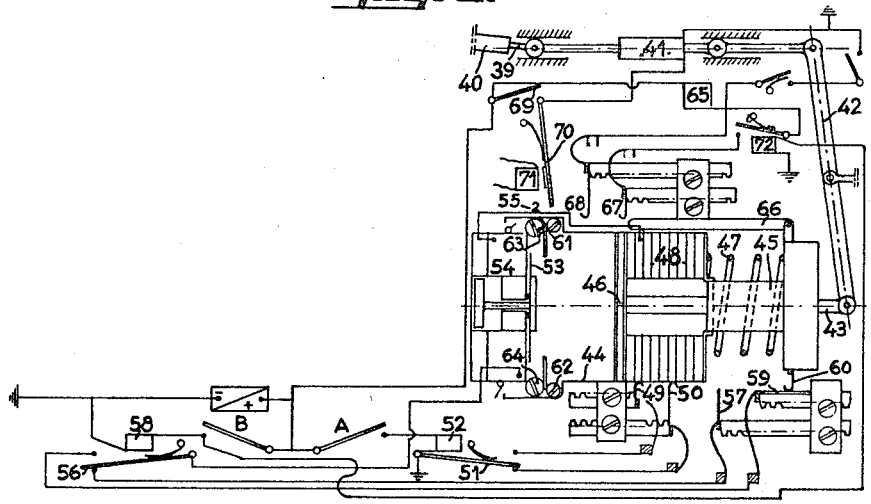

INVENTOR
GEORGES GUIBEAUD
BY Sherman & Halloway
ATTORNEYS

Oct. 25, 1966  G. GUIBEAUD  3,280,946
GEAR CHANGE CONTROL DEVICE FOR AUTOMOTIVE VEHICLES
Filed Oct. 23, 1964  6 Sheets-Sheet 4
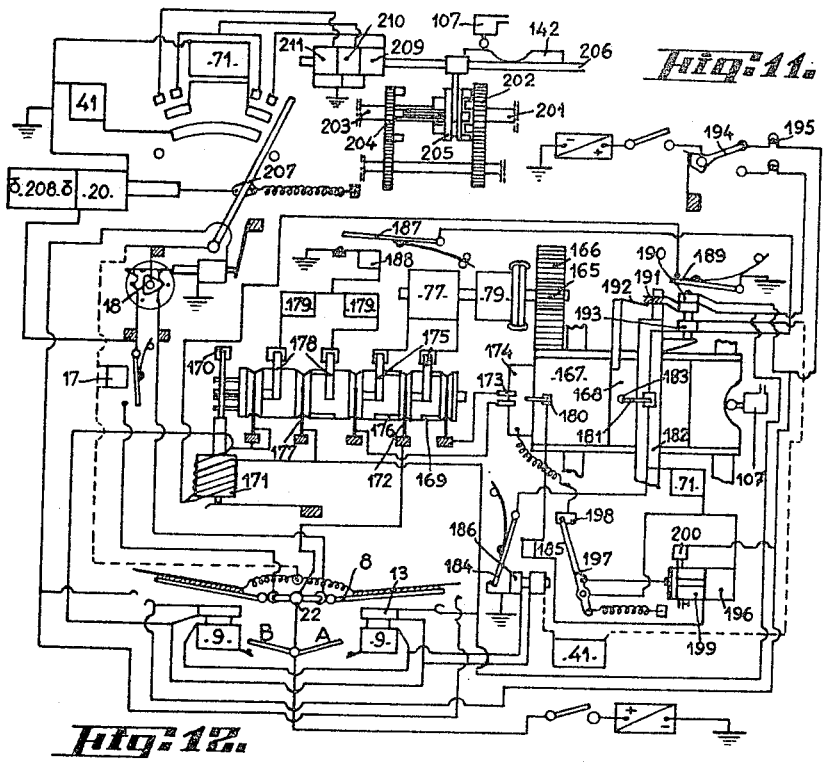
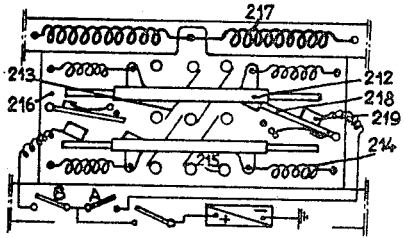
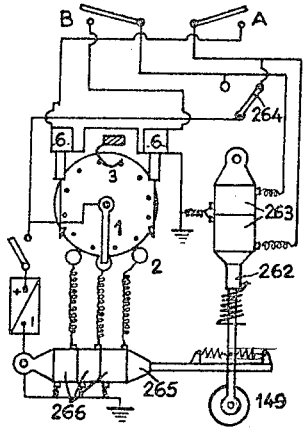
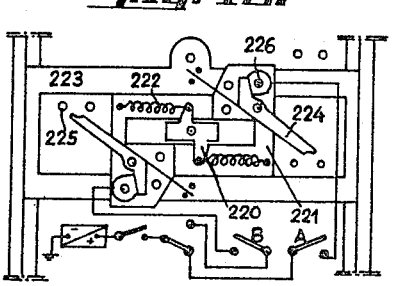
INVENTOR
GEORGES GUIBEAUD
BY *Sherman & Galloway*
ATTORNEYS

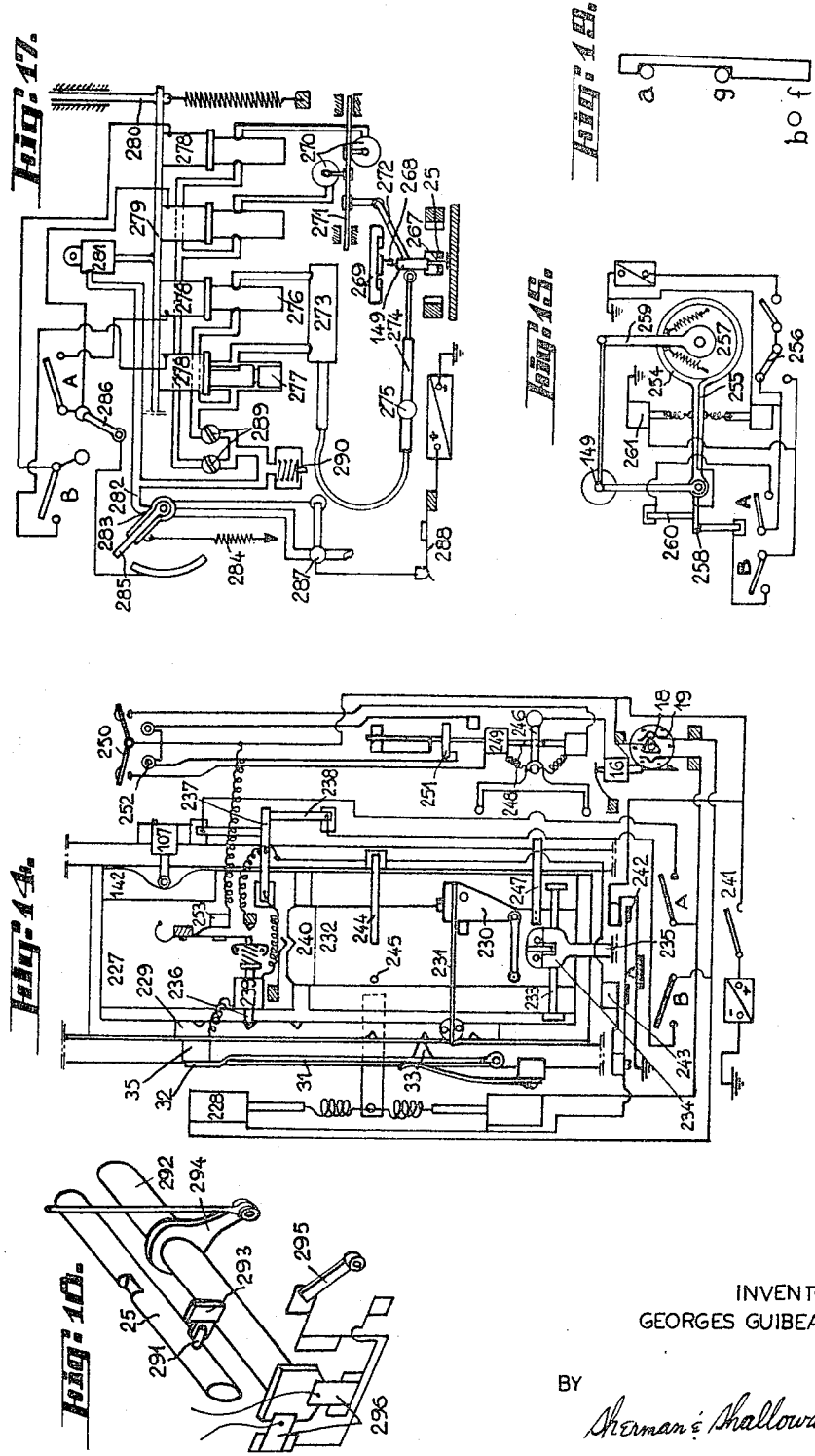

United States Patent Office 3,280,946
Patented Oct. 25, 1966

3,280,946
GEAR CHANGE CONTROL DEVICE FOR
AUTOMOTIVE VEHICLES
Georges Guibeaud, 58 Rue Marechal Foch,
Perpignan (Pyrenees Orientales), France
Filed Oct. 23, 1964, Ser. No. 406,004
Claims priority, application France, Oct. 28, 1963,
1,372,960
52 Claims. (Cl. 192—.092)

This invention relates to a device for controlling changes in the ratio of transmission of the velocity of rotation of the wheels of an automotive vehicle to the engine speed. It is applicable to any arrangement adapted to transmit an engine torque to drive wheels and designed with a view to permit the selection of certain stepped values of the ratio of the velocity of rotation of the drive wheels to the engine speed. This ratio will be referred to hereinafter as the "transmission ratio." The velocity of rotation of the drive wheels refers to the mean speed of these wheels at the moment considered. A device of the character broadly set forth hereinabove comprises separate groups of transmission mechanisms which are adapted to be rendered operative by turns for producing each transmission ratio.

This invention consists in obtaining the desired gear changes in the operation of said groups of transmission mechanisms with the assistance of two separate selector members adapted the one to produce the change to the next upper group of transmission mechanisms and the other to effect the change to the next lower group of transmission mechanisms. The actuated selector member will further disconnect the drive wheels from the engine torque.

This invention embodies means adapted to permit the application of this general principle to the various known assemblies of groups of transmission mechanisms, notably the means for automatically actuating the selector members at the proper time.

In the various forms of embodiment of the invention which are described hereinafter it is assumed that the transmission mechanisms consist of gear wheels; however, it would obviously not constitute a departure from the scope of the invention to use different transmission mechanisms and means when performing this invention in practice.

In the following description it is also assumed that the two separate selector members consist of control pushbuttons or like push members projecting notably from the floor of the vehicle and disposed along a transverse line thereof, within easy reach of the left-hand foot of the driver whose hands take no part in the gear shifts or changes of transmission ratio. The relative spacing of said control pushbuttons is such that the driver's foot can only depress one of them at a time.

In the following disclosure it will be understood that all up changes, that is, from one transmission ratio to another ratio increasing the wheel speed in relation to the engine speed, are controlled by means of the pushbutton nearest to the right-hand foot of the driver (termed "the right-hand pushbutton"), the other pushbutton (termed "the left-hand pushbutton") controlling the down changes. In the drawings showing devices wherein each pushbutton operates by closing a switch inserted in an electric circuit, the switch controlled by the right-hand pushbutton is designated by the capital A, and is constantly shown on the right-hand part of the drawing for the reader, with respect to the switch controlled by the left-hand pushbutton designated by the capital B.

It will also be understood that when anyone of these two selector pushbuttons is depressed the engine is automatically disconnected from the drive, in order momentarily to eliminate the torque and stress produced on the gears. The engine may be disconnected under the control of another pushbutton disposed midway between the aforesaid two selector pushbuttons, this engine-disconnecting or clutch-control pushbutton being thus adapted to be depressed simultaneously by the driver's foot while depressing one of said selector pushbuttons. If desired, the clutch pushbutton may also be depressed by each selector pushbutton by means of a lateral projection carried by their sliding rod or shank which engages the widened head of the clutch pushbutton which, in this case, may be concealed under the floor of the vehicle; alternately, an electromagnet may be used to control this clutch pushbutton, its energizing circuit being closed by each selector pushbutton.

In principle, any clutch type may be used in conjunction with any one of the means contemplated for selecting the transmission ratio according to this invention. As the clutch is controlled by known means separate from the selector means, notably by using a separate electric circuit, the clutch control means are generally not shown in the drawings.

According to a known arrangement, the engine may be disconnected from the drive by controlling the clutch by means of a single pedal of a width sufficient to accommodate the two pushbuttons projecting on the floor surface, each pushbutton being adapted either to close an electric circuit for energizing the corresponding selector member or to actuate this member through adequate mechanical transmission means. The function of the selector pushbuttons may also be devolved to a pair of pedals each adapted to actuate separately the clutch through a mechanical, pneumatic or hydraulic transmission. Depressing one of the selector pushbuttons may also cause the engine to be disconnected from the drive by using a motive power taken from the engine itself through any known means such as a bellows or cylinder closed by a piston and adapted to be connected (through a two-way valve normally vented to the atmosphere in the inoperative position) with the induction manifold of the engine or with a compressor when the pushbutton concerned is depressed. Finally, when the vehicle is equipped with one of the known devices wherein the engine is disconnected from the drive by closing or opening an electric circuit, each selector pushbutton actuates the circuit opening or circuit closing switch in the proper direction.

The selector pushbuttons will not cause the engine to be disconnected from the drive directly when each group of transmission mechanisms is engaged due to the specific clutch engagement of certain elements.

Other objects, features and advantages of the invention will appear as the following description proceeds with reference to the accompanying drawings, given only by way of examples, illustrating several embodiments of the invention and wherein:

FIGURE 1 diagrammatically shows the operating circuit arrangement with electric distributor, for controlling the device of the invention by means of a pair of driver-responsive push-buttons or plungers;

FIGURE 3 shows a combination driver responsive and selfacting control arrangement for the throttle and the clutch;

FIGURE 6 shows an alternative embodiment for stopping the rotation of the cam with a different time delay system and without additional speeds;

FIGURE 8 shows a modified actuating device for operating each selecting actuating rod respectively through bevelled gears;

FIGURE 11 shows a self-acting control arrangement for the changeover reversing member with double clutching, intermediate speeds and coordination with the shifting member;

FIGURE 12 is a top view of a control arrangement for the shifting member actuated by the changeover reversing member;

FIGURE 13 shows a top view of a modified control arrangement for the shifting member;

FIGURE 14 shows another example of the control arrangement for the shifting member;

FIGURE 15 shows still another modified control arrangement for the shifting member driven by the changeover reversing member;

FIGURE 16 shows a combination arrangement of the changeover reversing and shifting members wherein these are operated by separated means;

FIGURE 17 shows a sidewise control system for the driving tappet of the selecting actuating rods;

FIGURE 18 shows a locking arrangement for the driving tappet for the selecting actuating rods;

FIGURE 19 is a detail view of the selecting actuating rod used in the embodiment of FIGURE 18;

Figure 1:
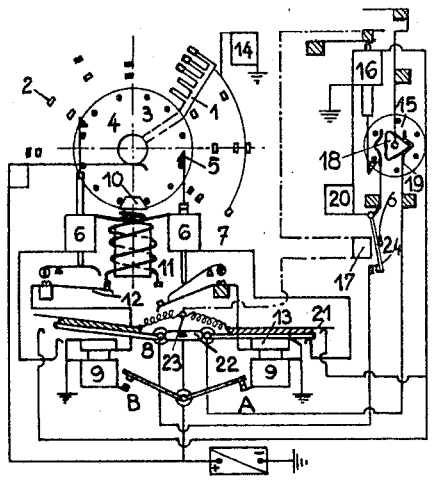

In the following disclosure it will be understood that the terms "coil" or "solenoid" will also designate an electromagnet; except when otherwise stated, all coils comprise a fixed internal soft iron core; the terms "soft iron" and "magnetic metal" will be used indifferently throughout the description; on the other hand the term "generator" will designate not only the engine driven dynamo or rectified current alternator but also the storage battery, without mentioning any choice between these two sources of current; the coil windings have one end connected to the ground or earthed to the mass of metallic parts constituting the transmission mechanisms, the same applying to one of the terminals of the generator which is assumed to be the negative terminals throughout the figures; as a rule, the shaft bearings and slideways and like mechanisms are not shown; the so-called stationary or fixed members are stationary or fixed in relation to the vehicle taken as a whole; furthermore, no electric circuit is closed as a consequence of the contact produced between an electromagnet and the core or armature attracted thereby. Certain similar parts, each dependent in the same manner from one of the aforesaid switches A or B, and shown on the same side as this corresponding switch, are designated by a common reference numeral connected to only one of them. In such figures of the drawings wherein parts parallel to the mean plane of the vehicle are viewed from the top, the portions of these parts which are nearer to the upper limit of the figure are assumed to be nearer to the front of the vehicle, and those appearing to the reader on the right-hand side of the figure are also located on the right-hand side of the vehicle. In the different figures and also in a same figure the component elements are sometimes shown on different scales.

A first class of systems for selecting the proper groups of transmission mechanisms or gearings by means of two pushbuttons is particularly adequate for assemblies of these groups wherein the changes are controlled by shifting a coupling member. This applies notably to the transmissions wherein the gear wheels adapted to transmit the torque from the engine to the final drive are of the constant mesh type. In this case each transmission ratio is obtained by rigidly connecting certain component element of a group either with their shaft, or with one another, or with the gear case containing them, by means of electromagnetic clutches having their electrical connections controlled by a circular distributor.

Thus a circular distributor of the character disclosed hereinabove is illustrated in the diagram of FIGURE 1. This distributor comprises an electrically insulated rotary arm 1 constantly connected to the insulated terminal of the source of current and carrying a plurality of perpendicular brushes each adapted to follow an inherent circular path along which a plurality of contact studs 2 are disposed, these contact studs 2 being connected through circuit means (not shown) to the electromagnet controlling one of the aforesaid clutches. In each one of its equally spaced angular positions, this arm 1 connects to the source of current the contacts studs aligned on the radius corresponding to the clutches controlling one of the groups of transmissin mechanisms, whereby the rotation of said arm 1 in a predetermined direction will control the change of transmission ratio in the increasing order. A radius without any contact stud corresponds to the arm position in which no transmission ratio is provided (neutral). In one of its positions the rotary arm 1 controls the reverse.

Referring again to FIGURE 1, the present invention is applicable to the distributor shown therein by securing on the rotary arm 1 a disc 3 concentric to the pivot of said arm and rotated through a constant angle in one direction by one of said selector pushbuttons and in the opposite direction by the other selector pushbutton. At right angles to the disc surface and near the edge thereof a plurality of pins 4 having the same relative angular spacing as the contact studs 2 are adapted to be engaged and driven by either of a pair of pawls 5 acting in opposite directions and of which the operative stroke causes the disc 3 and therefore the arm 1 to rotate through an angle corresponding to the angular spacing between any pair of adjacent radii containing aligned contact studs 2. Each pawl 5 is carried by the outer end of a flexible blade constituting the extension of the sliding core of an electromagnet 6. A return spring blade 7 is adapted, in the de-energized condition of said electromagnet, to urge upwards a nonmagnetic rod extension of the sliding core which is opposite to said pawl 5 so as to keep the latter disengaged from the pins 4. The energizing circuit of each coil 6 is closed by means of an arm 8 fulcrumed on a pivot pin connected to the insulated terminal of the generator and lifted in the inoperative condition by a spring (not shown), this arm 8 being adapted to engage a contact connected to said coil 6. Secured on the lower face of this arm 8 is a magnetic plate registering with the core of a coil 9 connected on the other hand to the ground, the energizing circuit of this coil 9 being adapted to be closed on the insulated terminal of the generator through a switch A controlled as already explained hereinabove by the corresponding right-hand selector pushbutton.

The rotary arm 1 is held in succession in each angular position corresponding to the radii on which contact studs are aligned, to permit the proper engagement between its brushes and the contact studs 2, by detent positioning means comprising a wedge-shaped stop member 10 normally urged by a coil spring to its disc stopping position between two adjacent pins 4. To reduce the resistance to the disc rotation which results from this stop member 10 the latter is moved away from the pins 4, when one of the selector pushbuttons is depressed, as a consequence of the energization of another electromagnet 11 which attracts its sliding core or armature rigid with said stop member. This electromagnet 11 comprises two separate windings constituting the extension of coil 6 on the same side and leading to a contact stud projecting externally from the bottom of this electromagnet 11. In the inoperative condition, the lower face of this stud is engaged by an insulated conducting spring blade 12 grounded through a coil 13 wound on the same core and in the same direction as the coil 9. When said first-mentioned arm 1 is substantially attaining its new position the blade 7 pushed back by the sliding core or armature of the energized coil 6 engages the spring blade 12 and moves same away from its corresponding contact stud, thus opening the energizing circuit of electromagnet 11 and allowing the stop member 10 to resume its positioning function. Coil 13 holds the arm 8 lowered until the elementary rotation of arm 1 is completed, even if the previously depressed selector pushbutton has already been released.

With a distributor of the type illustrated in FIGURE 1, it is possible to engage not only the forward drive speeds already contemplated hereinabove, but also at the most an equal number of additional ratios by means of a series of stepup gearings providing a ratio assumed to be greater than 1:1, and of any suitable type, which are interposed in the transmission and operated by energizing the coil 14. The contact studs providing these additional gear ratios repeat in the same order the relative arrangement of the contact studs of the original speeds, from the lowest one or a higher one. The contact studs of said additional series of gear ratios are associated with companion contacts disposed along an external sector or circle of which the contact engagement with a special brush of arm 1 is adapted to close the energizing circuit of said electromagnet 14. In an equivalent arrangement (not shown) another arm similar to said rotary arm 1 is driven in unison therewith but with a relative angular shift such that it engages the contact studs corresponding to said first series of forward speeds immediately as the first arm has left the contact studs corresponding to the last gear ratio. At the same time, this other arm engages with an additional brush a circular contact or sector connected to said electromagnet 14. The transmission mechanism is assumed to include only constant mesh gearings. The electromagnet 14 causes the operation of this mechanism by controlling the clutches of one or more of its component elements or gearings by means of a mechanical, hydraulic, pneumatic or electrical system. If desired, this electromagnet may also control a clutch engagement by causing two rotary plates to be urged against each other, or by rendering two drums solid with each other by magnetizing a suitable magnetic powder.

If the clutches used for operatively connecting certain elements of the engaged transmission mechanism are actuated by a fluid pressure other than the atmospheric pressure, this fluid pressure is applied to the clutch members by using a fluid distributor of known type. More particularly, the rotary member of this distributor may consist of a frustoconical valve member fitted by grinding in a fixed seat formed in a casing. This frustoconical valve member has an axial duct formed therein which is connected through a flexible hose to the source of pressure fluid or to the source of vacuum; this axial duct communicates on the other hand radially with a groove formed along one of the generatrices of the frustoconical surface of the valve member which ends at a suitable distance from the edge of said seat. Orifices or ports pertaining to ducts disposed in several planes perpendicular to the axis of said seat open into the latter. All the orifices disposed in a same plane are connected to a common receiving member, for example a bellows, controlling one of the clutches. The rotary member is rigid with a disc similar to the disc 3 of FIGURE 1 and is driven thereby under the control of the selector pushbuttons to perform movements of rotation of same angular amplitude in one or the other direction. In each position the aforesaid groove formed in said frustoconical valve member registers generally with the orifices, superposed along a common generatrix, of the ducts leading each to the receiving member of one of the clutches through which the transmission ratios are obtained. These short-stroke receiving members are returned by elastic means to their inoperative positions. Grooves similar to the aforesaid fluid distributing groove are formed on either side of, and close to, this last-named groove, and connected to an axial duct opposite to the axial duct supplying the distributor. When said distributor is switched from one position to another, the seat orifices are thus vented to the atmosphere or connected to a reservoir. This distributor, as well as that shown in FIGURE 1, may be used for providing additional gear ratios by interposition of a stepup gear or like mechanism. As it continues its rotation in the direction to change the transmission ratios upwards, the distributor groove registers with another series of feed ports or orifices disposed like the preceding ones and, in addition, with the feed port or orifice of a duct adapted to supply a member for actually engaging this stepup mechanism.

Whatever the type of rotary distributor contemplated, the disc 3 may be driven in the manner shown in FIGURE 1 or by using a piston slidably mounted in a cylinder and movable by a pressure fluid controlled by the depressed selector pushbutton. When the piston is moved towards the axis of said disc, it has a cam face extension adapted to move away the pin engaged during this movement; this cam face extension is pivotally mounted in order to recede automatically when engaging the next pin.

The piston may also act tangentially upon the disc through linkage means bearing with a notched end against the pin stopped on its path. The fluid may be compressed, in the cylinder to be operated, by the effort exerted on the control pedal, or this fluid may be taken from the fluid supply delivered to the distributor. Each pushbutton may also be adapted to pull mechanically its companion pawl 5.

The arrangement described hereinafter which is also applicable to the other change speed systems is suitable for inserting between the original forward gear ratios other ratios obtained by introducing in the transmission, at any suitable point along same, a stepup gearing adapted to multiply by a predetermined ratio assumed to be greater than 1:1, the ratio provided by the engaged original speed. The connections are so arranged that a pressure exerted on any one of the selector pushbuttons changes an original gear ratio to an intermediate gear ratio, or vice versa, that is, an intermediate gear ratio to an original gear ratio. In the general method on which this system is based, the changes in original ratios are no more controlled directly by the selector pushbuttons. Whatever pushbutton is depressed, each fresh actuation will produce alternatively either the operation of said additional gear, or its elimination from the transmission. The current reversing switch adjusting this alternation prepares simultaneously the circuit enabling, if need be, the depressed pushbutton to engage one of the original gears. This reversing switch is constructed as follows: Mounted on a fixed pivot pin is a rotary plate 15 carrying on one face near its edge six spaced pins extending at right angles thereto. Means similar to those associated with the disc 3 are provided for rotating this plate 15 through one-sixth of a revolution in the same direction each time energizing current is caused to flow through the coil 16. The magnetic core sliding in this coil has an extension in the form of a spring blade carrying a pawl tooth on its outer end which is adapted to attract towards the coil 16 that pin of plate 15 which is stopped within its reach. Another flexible blade having a fixed end urges with its opposite end a rod constituting the extension of the core of coil 16 but opposite said pawl for urging the latter to its inoperative position. This plate 15 carries preferably on its face opposite to said pins an insulated collector or slip ring slidably engaged by a brush connected through a conductor to the insulated terminal of the generator, the current in said conductor flowing through the coil 17. A cam 18 having the shape of an equilateral triangle is secured on this collector ring and centered on the plate axis. This cam 18 revolves between two opposite flexible blades 19 having one end anchored on an insulating block and a V-shaped head registering with the cam, as shown in FIGURE 1. Thus, upon completion of a 60 degree rotation (i.e. one-sixth of a revolution) one lobe of cam 18 engages the hollow of the head of one of said blades 19 and is thereby held against motion somewhat in the fashion of a detent positioning device. During the next 60 degree rotation the cam is disengaged from this blade and engaged with the opposite blade.

One of said blades 19 is connected to the winding of an electromagnet 20 having its other end grounded or connected to the mass of the mechanisms; this electromagnet is adapted to control, if necessary with the assistance of a force taken from the power unit, the clutch of the stepup gear interposed in the transmission which is independent of the gear controlled by means of the aforesaid electromagnet 14.

Each pivoted arm 8 carries with the interposition of a suitable insulating strip a blade 21 projecting somewhat from the outer end of the arm 8 and engaging in the lower position thereof one of the contact studs connected to the coil 16. A conducting strip 22 fulcrumed intermediate its ends on an insulated pivot pin constantly connected to the insulated terminal of the generator is adapted to be moved to either of two perpendicular positions under the control of a handle or knob located within easy reach of the driver's hand. In its position perpendicular to the longitudinal axis of the vehicle which is shown in the figure this conducting strip engages with its ends a pair of insulated contact studs each connected to the pivot pin of one of the aforesaid blades 8. In this position, no current can flow through the coil of electromagnet 20 controlling the stepup gear for introducing the intermediate gear ratios. In its longitudinal position, on the other hand, the conducting strip 22 connects the insulated terminal of the generator to an insulated contact stud 23 connected in turn through flexible conductors to the blade 21. This contact stud 23 may be connected to the brush slipping on the collector ring of the triangular cam 18. When one of the selector pushbuttons is depressed the assembly consisting of arm 8 and blade 21 associated therewith and responsive thereto is lowered and each member 8, 21 engages the relevant fixed contact. The blades 21 are flexible and slightly bent towards their corresponding contact stud to make the contact therewith before their associated arm 8, so that the coil 16 thus energized first will cause the low inertia cam 18 to rotate rapidly to its next angular position to preset the new circuit of the arm 8 concerned, before the contact is made between this arm 8 and the corresponding contact stud. According to an alternate arrangement shown only in FIGURE 1 the flexible blade urging the core of coil 16 to its inoperative position carries an insulated strip closing the circuit of cam 18 when the latter has already been rotated by this coil.

The fulcrum pin of the left-hand arm 8 lowered as a consequence of the operation of the left-hand switch B is connected to the flexible blade 19 energizing the electromagnet 20 controlling the engagement of the stepup gear providing the intermediate ratios. The fulcrum pin of the right-hand arm 8 is connected to the other flexible blade 19, as shown. In order to prevent the circuit connecting the insulated terminal of the generator to the electromagnet 20 from closing when the conducting strip 22 is disposed transversely, the circuit between the fulcrum pin of the left-hand arm 8 and that one of the flexible blades 19 which is connected to this electromagnet incorporates a switch wherein a spring urges a magnetic lever 24 away from its companion contact stud, this contact being closed by the coil 17 inserted in the circuit leading to cam 18 but only when this circuit is closed by the conducting strip 22 in the longitudinal position thereof. This switch may also be actuated by the means controlling said conducting strip 22, if desired.

When this conducting strip 22 is disposed parallel to the longitudinal axis of the vehicle and engages the contact stud 23, the connections of FIGURE 1 clearly show how the original transmission ratios and the intermediate ratios alternate: Thus, each time the coil 16 is energized the stepup gear providing the intermediate ratios is engaged due to the energization of electromagnet 20, if it was disengaged beforehand; on the other hand, under these conditions, this stepup gear is disengaged, if it was engaged beforehand. Moreover, if the blade 19 engaging the cam 18 is connected to the lowered arm 8, it changes the original gear ratio prepared thereby. More particularly, if the blade 19 having engaged the cam 18 is the left-hand one, and if the depressed pushbutton is on the same side, the corresponding electromagnet 6 will cause the next lower original gear ratio to be engaged but this ratio will be multiplied by the ratio of said stepup gear.

If, as contrasted with the foregoing, the ratio of the stepup gear introducing said intermediate gear ratios is lower than 1:1, each one of these gear ratios will be obtained by reducing the original ratio maintained or engaged upon each actuation. Under these conditions, coil 20, coil 17 and switch 24 are subordinate to the right-hand flexible blade 19 connected to arm 8. Intermediate ratios may be added in the same manner between these additional ratios.

The movement of the conducting strip 22 may be controlled electrically. In this case the insulated contact stud 23 is shifted so as to be engaged by the strip 22 after the latter has been rotated to an extend just sufficient to release same from its transverse studs. On a perpendicular arm of said strip a magnetic armature is attached which is adapted to be attracted by one or the other of a pair of opposite coils when energizing current is caused to flow therethrough either by closing a hand-controlled switch, or by using other means to be disclosed presently. Resilient means constantly urge the strip 22 to its last selector position. Reversing switches to be described presently may be substituted for the cam 18 and flexible blades 19.

Given adequate values of the transmission ratios introduced by the stepup gears or overdrives, the range of speeds thus obtained provides a satisfactory staging. If the number of original ratios is doubled by the means used for introducing these additional ratios, it is increased fourfold by the means introducing simultaneously the intermediate ratios.

The forms of embodiment of the present invention which are contemplated and disclosed hereinafter concern the known transmission mechanism incorporating adjacent parallel shafts the relative rotation of which may be obtained to provide stepped gear ratios either through gear wheels brought in meshing engagement by causing one of them to slide along its shaft rotatably driving same by means of splines, or through constant mesh pairs of pinions, wherein one pinion of each pair revolves freely on its shaft and is adapted to be rotatably coupled through dogs with a sleeve or hub slidably mounted on and rotatably driven from this shaft by means of splines. A feature common to these various well-known transmission mechanisms is the control of each sliding member by means of a rectilinear rod such as 25 (FIGURE 2)

adapted to slide parallel to the transmission shafts in bearings carried by the oil-tight casing supporting these shafts and containing the gears or pinions. These rods are usually referred to as the "selector rods" and each of them (as in the case of rod 25) carries a gear shift fork (shown in side elevational view in FIGURE 2) enclosing between its two arms, in a circular groove, the sliding hub 27 thus driven by this rod 25 during its movements of translation while permitting its rotation with the hub shaft.

In each endmost position, the selector rod 25 engages one of the groups of gears; in its intermediate position, no gears are engaged and this position will be termed "neutral" hereinafter.

Figure 2:
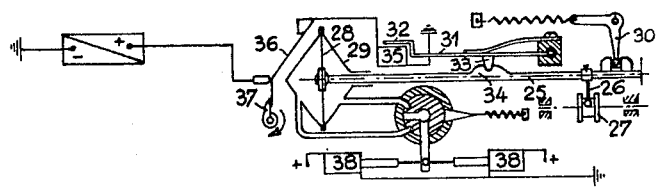
FIGURE 2 shows a control arrangement for the speed gear box through selecting actuating rods.

In the device illustrated in FIGURE 2 each selector rod is resiliently urged to its neutral position so that the force necessary for moving this rod to one of its end positions must be maintained in order to keep the rod in this selected position. This force may be transmitted through a distributor of the type described hereinabove by using the pressure or vacuum or suction of a fluid exerted on a flexible diaphragm 28 having its central portion fastened to one end of said sliding selector rod 25 and its marginal portion clamped on the outer peripheral edge of a bell-shaped case 29 connected to one of the ports of the distributor. As shown in this figure the diaphragm 28 may be common to two bell-shaped cases 29 so as to be clamped by their registering edges and adapted to move said selector rod 25 in one or the other direction, the rod 25 extending to this end through the wall of the surrounding case 29 by means of a fluid-tight rod packing, the diameter of this surrounding case 29 being increased, if necessary, in order to compensate the diaphragm surface area occupied by said rod. This rod may be urged to its end position by means of detent-positioning means comprising a bell-crank lever 30 having one arm engaged between two bosses or like projections formed on the free end of the rod. The effort necessary for holding the sliding rod 25 in its end position may be eliminated by using lock means constructed and operating as follows: An arm 31 common to all the rods is fulcrumed at its widened base on the casing containing said rods by means of a pivot pin extending transversely thereto; this arm 31 carries at the opposite end a soft iron blade 32 and, at a relatively short distance from its fulcrum, a transverse projection 33 with rounded edges acting upon all the rods of the assembly. Each rod carries two bosses 34 having inclined sides, whereby the transverse projection 33 nests inbetween these bosses 34 when the rod is in its neutral position, and clears one or the other boss 34 when the rod is moved to one of its end positions. When the transverse projection 33 is not clearing a boss 34 a spring of moderate force urges said projection against the rod. Then the soft iron blade 32 engages the core of coil 35 constantly energized by the source of current. The magnetic attraction produced by this coil, although too low to attract the blade 32 beyond a certain distance, is however sufficient to keep the transverse projection 33 depressed, this projection being urged upwards by the oblique thrust produced when clearing the moss pressed there against by the return spring attached to the sliding rod 25. The transverse projection 33 yields to this thrust when the coil 35 is deenergized; then the released rod 25 resumes its neutral position. Coil 35 is connected to the flexible blade 36 constantly pressed against an insulated terminal of the generator. The insulated pivoted arm 37, revolving through one fraction of a revolution in the direction of the arrow when one of the selector pushbuttons is depressed, moves through adequate connecting means the flexible blade 36 away from its contact stud until said pivoted arm 37 escapes from the end of this blade 36. During the return movement this arm clears the end of blade 36 without reopening the circuit of coil 35. The short break thus produced in this circuit permits the simultaneous movements of the sliding rod urged to its neutral position and of the rod moved to its end position. This locking system (or any other equivalent locking system) permits of actuating the selector rods by means of a momentary delivery of power such as the force resulting from the movement of a clutch pedal which is used for compressing a fluid in a rotary distributor of the type described hereinabove, or the vacuum created by closing the carburetor throttle in a distributor of same character connected to the induction pipe of the engine, or still an electric current acting in one or the other direction upon a soft iron core secured on the selector rod by means of two opposite solenoids each connected to one of the contact studs of the distributor illustrated in FIGURE 1. More particularly, as shown in FIGURE 2, the pair of registering bell-shaped cases 29 forming a diaphragm chamber may be connected to a fluid distributor of which the rotary valve member urged by spring means to its intermediate position in which the bell-shaped cases are vented to the atmosphere is adapted to be attracted in either direction by a pair of opposite coils 38 each connected to one of the terminals of a current distributor of the type illustrated in FIGURE 1. The overall dimensions of the members actuating the selector rods 25 may be such as to make it more convenient to attach them to rod extensions of different lengths, or to other rods parallel to and solid with said selector rods.

In their simplest forms of embodiment the devices for controlling the changes of transmission ratio with the assistance of two selector pushbuttons or the like require the same inverse movements of the feet as the actuation of these control devices by means of a conventional hand gear lever. Means to be described presently reduce these control movements to a simple pressure of any duration exerted on the proper selector pushbutton. These means are particularly advantageous when it is desired that the rotary members to be engaged be firstly caused to revolve at substantially the same peripheral speeds, by momentarily engaging the engine clutch and simultaneously accelerating during the short shift from one group of gears to another. This double declutching, involving a double action on the clutch engine and on the induction of air/fuel gaseous mixture, which is obtained by simply depressing one of the selector pushbuttons, may be operated through the automatic device described hereinafter with reference to FIGURE 3.

The carburetor throttle controlling the engine speed is mounted on a small spindle having the same diameter as the thickness of said throttle, this spindle being journalled in fluid-tight bearings fitted in the wall of the induction pipe. This spindle carries at right angles thereto, at one end, an arm normally actuated by a link controlled by the accelerator pedal urged by spring means to its upper or throttle closing position. In order not to interfere with the automatic operation the action of this link must be neutralized during the gear change or shift by eliminating the influence of the foot movements on the accelerator pedal. To this end the link connecting this pedal to the carburetor consists of a rod 39 sliding at a rigid tube 40 pivoted on the pedal. High flexibility springs interconnect these two elements and urge them to a substantially intermediate position. The rod 39 carries at its end a roller guided in a slideway. Pivoted on this roller is a cylindrical body of which the intermediate portion consists of a magnetic core, the end portions of this body being of non-magnetic material. This cylinder is adapted to slide in a fixed coil 41 having substantially the same length as the aforesaid core. When a selector pushbutton is depressed and the automatic control device is started, and until the gear change is completed, electric current flows through the coil 41. The magnetic attraction produced thereby exceeds the spring tension between the members 39 and 40 of the accelerator link, thus holding the end of rod 39 in the most convenient position for automatic operation. This position may be adjusted by moving more or less the coil 41 towards or away from the slideway engaged by the roller carried by the rod 39.

In a first device the pivoted throttle controlling the carburetor is responsive only to the rod 39. It remains wide open as long as the gear shift takes place. The induction pipe comprises another throttle valve or butterfly remaining wide open as long as the automatic control is inoperative, as it is operated only by this automatic control. This extra throttle or butterfly may consist of a thin plate adapted to slide in a fluid-tight flat recess extending at right angles to the pipe axis and to be moved through linkage means from the automatic control governing the delivery of gaseous air/fuel mixture to the engine.

In the device illustrated in FIGURE 3 the conventional throttle shutter of the carburetor is moved angularly now by the accelerator pedal, now by the automatic control device. The arm of the carburetor throttle, which is solid with its spindle, is connected through linkage means to the intermediate portion of a rocker 42 pivotally connected at one end by means of a rod to the end of the cylindrical rod slidably mounted in said coil 41, and at the other end to the end of the sliding rod 43 actuated by the automatic device controlling the carburetor and engine clutch. This automatic device is housed in a stationary cylinder 44 having slidably mounted therein an axial soft iron core 45 having an outer extension in the form of said sliding rod 43, and an inner extension in the form of a nonmagnetic rod solid with a piston 46 provided with peripheral piston rings or like packing means, which can thus slide with the desired fluid tightness and smoothness in said cylinder. The magnetic core slides in a bearing fitted through the cylinder bottom wall on the carburetor side. A high flexibility coil spring 47 bearing with one end against a circular stop forming portion of rod 43 adjacent to its end, and with the other end against the cylinder bottom wall, urges said core outside the cylinder. The cylinder portion adjacent to the carburetor is filled by a compound coil 48 consisting of an adequate number of juxtaposed flat elementary coils interconnected in series. The magnetic core 45 is adapted to slide inside said compound coil. An elongated aperture is formed through the lateral wall of the cylinder, along one generatrix thereof, in order to expose a narrow strip of said elementary coils; this strip displays stripped coil wires engageable by contact brushes 49, 50 each connected to one of the insulated contact studs limiting the angular movements of the conducting arm 51 fulcrumed on a fixed grounded pivot pin. In its inoperative position this arm 51 is urged by spring means against a contact stud connected to said brush 50. It comprises a soft iron blade registering with the fixed coil 52, the energizing circuit of which is closed when the right-hand selector pushbutton A is depressed. When this coil 52 attracts the arm 51 the latter moves away from the contact stud connected to brush 50 and engages the stud connected to brush 49. Ventilation ports are formed through the cylinder wall for cooling the compound coil 48. At a point of the cylinder which is close to the permissible stroke of piston 46 moved by the iron core 45, this cylinder is divided by a transverse partition forming a circular ring of which the central aperture may be closed by a valve member 53 having flexible edges. Secured concentrically to the cylinder 44 and at a suitable distance from said annular partition is a coil 54 containing in its portion adajcent to said partition a fixed soft iron core formed with a central orifice. The shank of valve 54, which consists of nonmagnetic metal and is slidably engaged in this central orifice, carries on its end a soft iron core adapted to slide in said coil 54 for engaging the fixed core thereof. The movable core is mounted with a play sufficient to permit the escape of any air forced thereby as by a piston. As it enters the coil 54 the valve shank is clamped between a pair of thin flexible rods having their ends secured side by side in opposite recesses formed in the cylinder wall. Their function is to retard within the necessary limits, by their frictional braking action, the valve movements; they are adapted to retain same in its endmost position in either direction by engaging with a snap effect a groove formed in said valve shank. The cylinder portion containing the coil 54 has one end connected to the contact stud 55 normally connected in turn to the insulated terminal of the generator, and the other end connected to the insulated pivot pin of the conducting arm 56 constantly urged by a spring against an insulated pin connected to the insulated contact stud 57 in the form of a flexible spring blade. The coil 58, of which the energizing circuit is controlled by the switch B closed by the left-hand selector pushbutton, is adapted, by attracting the soft iron blade secured on the arm 56, to move this arm 56 away from its contact stud and to a position of engagement of another contact stud connected to the insulated conducting ramp 59. The sliding rod 43 carries a flexible brush 60 secured on the circular abutment engaged by its coil spring, this brush 60 being thus grounded. In the inoperative condition this brush contacts the ramp 59 and moves along this ramp when the core 45 penetrates into the coil 48. After clearing the end of this ramp 59, the brush 60 engages an insulated flexible contact stud 57. The brushes 49 and 50, stud 57 and ramp 59 are each mounted on an insulated support rigid with a rack adapted to slide parallel to the cylinder 44 and meshing with a pinion of which the split stub shaft is snugly fitted in stationary member guiding said rack. These insulated contact members are connected directly to their circuit by means of a flexible conductor. Adjacent the aforesaid annular partition the wall portion of cylinder 44 which is slidably engaged by the piston has formed therethrough two opposed ducts 61, 62 of which the cross-sectional passage area is adjustable by means of a screw having a slotted or knurled head, which extends at right angles to the duct in which it penetrates more or less. On the other side of the annular partition and on the same generatrix as that receiving each one of these ducts, 61, 62, the cylinder wall has formed therethrough another pair of larger ducts 63, 64, the opening of which is also adjusted by screw means. The ducts aligned on a common generatrix open into a tubular member disposed along the outer wall of the cylinder and closed at one end, the other end of this tubular member being adapted to be closed by a valve urged by a spring (not shown), this valve opening outwards when the tubular member is connected to ducts 62 and 64 to vent the air forced by the piston, and inwards when it is connected to the other ducts 61 and 63 permitting the passage of the air sucked into the cylinder 44.

The engine clutch of the vehicle is actuated by an electromagnet 65 acting as a rule through relay means as a function of the position of rod 43, the movements of which control the coordinate actions of the engine clutch and of the carburetor throttle. The rod 43 is solid through its annular stop member with a conducting ramp or strip 66 adapted to slide in a slideway extending along the cylinder 44 and connected through this cylinder to the ground constituted by the metallic mass of the mechanisms. The brush 67, which may if desired and as explained hereinafter be connected to the coil 65, as well as the brush 68 constantly connected to this coil, are mounted in the same way as the aforesaid brushes 49 and 50, each on an insulating supporting rack member parallel to the ramp 66. These brushes 67 and 68 are in frictional or sliding contact with this ramp 66 along two parallel tracks when the rod 43 carries along said ramp during its inward travel relative to the cylinder 44.

The connection between the gear shift device of the transmission, irrespective of its construction, and the auxiliary control apparatus illustrated in FIGURE 3, which is adapted during gear shifts to eliminate the stress exerted on the transmission members, may be obtained as follows: The insulated terminal of the generator is connected through a switch 69 on the one hand to the coil 41 holding at its level against motion its sliding magnetic core or armature pivoted on the rod 39, and on the other hand, to the fulcrum of the magnetic lever 70 adapted to be attracted by the electromagnet coil 71 for engagement with contact stud 55 controlling the energization of coils 48 and 54 for actuating the auxiliary apparatus. The coil 65 is connected directly and permanently to the insulated terminal of the generator and to the aforesaid brush 68. Morever, this coil 65 may be connected to the brush 67 (normally engaging first the ramp 66) by means of a front contact urged to its open position by a spring and adapted to be closed by a coil 72 attracting against its contact the pivoted magnetic lever of said contact when the left-hand selector pushbutton is depressed to close the energizing circuit of this coil together with that of coil 58. The circuit of coil 41 is closed as long as the gear change operation proceeds. The circuit of electromagnet 71, which is normally closed when a gear change takes place, may be deenergized to discontinue the action of said coils 48 and 54. Switch 69 illustrates diagrammatically in FIGURE 3 the connection between the insulated terminal of the generator and the change speed device with which this auxiliary control apparatus is associated. In the figure showing these devices, this addition is illustrated by the diagrammatic reference to the coils 41 and 71 each inserted in one of the circuits.

As the automatic arrangement for controlling the engine clutch and carburetor throttle are shown as being separate from a change speed device, it is assumed that this arrangement is controlled directly by either of switches A or B during a time at least equal to that required for effecting said change.

When the substitution of one group of gears for another increases the transmission ratio, the engine must be slowed down by rapidly and nearly completely closing the carburetor throttle, the latter being subsequently allowed to resume slowly its initial open position. Simultaneously, the engine must be disconnected from the drive during a sufficient fraction of the time period during which the carburetor throttle is closed, so as to be braked by the suction created in the induction manifold.

In this case, the arrangement of the above-described component elements operates as follows: Assuming that switch A is closed as a consequence of the actuation of the right-hand selector pushbutton, the electromagnet 52 will attract the arm 51 for engagement with the contact stud connected to the brush 49 of which the position is adjusted to engage a sufficient number of elementary coils of the compounds coil 48 attracting the core 45 within the cylinder 44 deeply enough to close almost completely the carburetor throttle. Since no current flows through the electromagnet coil 54, the air forced by the piston escapes, notably through the duct 64 adjusted to provide a passage sufficient to retard only moderately the piston stroke. When this stroke is nearly completed the brush 60 engaging the contact 57 closes through the arm 56 the energizing circuit of coil 54 which, by attracting its movable armature, seats the valve member 53 before the piston is braked to a substantial extent. When the switch 69 is open subsequent to the change produced in the group of gears, or firstly switch lever 70 due to the opening of the energizing circuit of coil 71 in the time period in which none of the transmission groups of gears is engaged, the spring 47 urges the carburetor throttle to its initial position. Valve 53 is held in its seated position by the air suction produced by the piston only through the duct 61 the output of which is adjusted to slow down the throttle opening movement. Since the ramp 66 attracted by the core 45 of coil 48 engages the brush 68 only when the carburetor throttle is partially closed, the engine is thus disconnected from the drive only during the time in which this contact is maintained.

When a down gear shift is effected, only a moderate engine retarding action is required, and the engine may even be accelerated during the period in which it is disconnected from the drive, this being obtained by closing incompletely and slowly the carburetor throttle, and subsequently allowing the latter to move rapidly back to its initial open position. Simultaneously, the engine must be disconnected immediately as the throttle closing movement commences. It is disconnected again when the carburetor has already resumed a throttle position ensuring an adequate engine acceleration.

In this case, the above-described elements provide the following mode of operation: The arm 51 being in its inoperative position, and brush 50 closing the energizing circuit of coil 48 along a relatively short portion of its length reduces to this longitudinal section the permissible stroke of the movable armature 45, whereby the latter will close the carburetor throttle moderately. The switch B closed by the left-hand selector pushbutton causes energizing current to flow through the coil 58 which attracts the arm 56 for engagement with the insulated terminal connected to the ramp 59 and, through the arm 56, grounds the energizing circuit of coil 54. The movable armature attracted by this coil 54 will thus close the valve 53. The air compressed by the piston can only escape through the duct 62 so adjusted as to properly retard the closing movement of the carburetor throttle. The position of ramp 59 is so adjusted that the brush 60 is moved away therefrom shortly after the piston has come to a standstill. As the coil 54 is thus deenergized, the valve 53 is moved by the air which has not been able to escape through the duct 62. When coils 48 and 54 are deenergized by switch 69 subsequent to the gear shift, or firstly by switch 70 released by coil 71 during the passage from one speed to another, valve 53 being open, the piston urged by spring 47 produces an air suction mainly through duct 63 adjusted for a larger output. Due to the actuation of the left-hand selector pushbutton the coil 72 closing by its attraction the connection between coil 65 and brush 67, the engine is disconnected from the drive from the very beginning of the throttle closing movement by the engagement of ramp 66 with brush 67, and remains so disconnected until this contact is reopened when the carburetor throttle has almost resumed its initial open position.

In a simplified arrangement when the engine of the vehicle is disconnected from the drive, the engine controls the closing of the carburetor throttle by energizing a coil acting like the coil 48. The automatic control circuits of the carburetor and clutch which are shown in FIGURE 3 are closed by depressing either of the selector pushbuttons. When this automatic arrangement is further required to permit the synchronization of the peripheral speeds of the gear members to be engaged, switch 70 is opened by deenergizing the circuit of coil 71 immediately as the preceding gear ratio is discontinued or disengaged, the gear shift being deferred by a time lag device during the time period necessary for producing the desired synchronization; at the end of this time period, coil 71 is reenergized and closes switch 70.

In order to permit the resumption, when desired, of the nonautomatic control of the engine feed and engine clutch, the coil 65, in addition to its connections with brushes 67 and 68, is grounded directly through a conductor having two switches inserted in series therein. One of these switches is a front contact, i.e., urged by spring means to its open position when inoperative and adapted to be closed by depressing either of the two selector pushbuttons; the other switch is closed to eliminate the automatic control device by means of a control knob or handle holding at the same time the lever away from its contact stud 55. According to a modified arrangement of the auxiliary mechanism the cylinder 44 is mounted at the end, and as an extension, of the cylindrical member slidably engaging the coil 41, and the rod 43 is connected through a link to the arm rigid with the carburetor throttle. When the auxiliary automatic control mechanism is operated, the rod 39 is held against motion by the magnetic attraction produced by the coil 41 and the carburetor throttle is controlled only by the sliding movements of rod 43. If the air/fuel mixture is injected into the engine (as in the case of an injection engine), its output is adjusted by a mechanism similar to that actuating the carburetor throttle.

Figure 4:
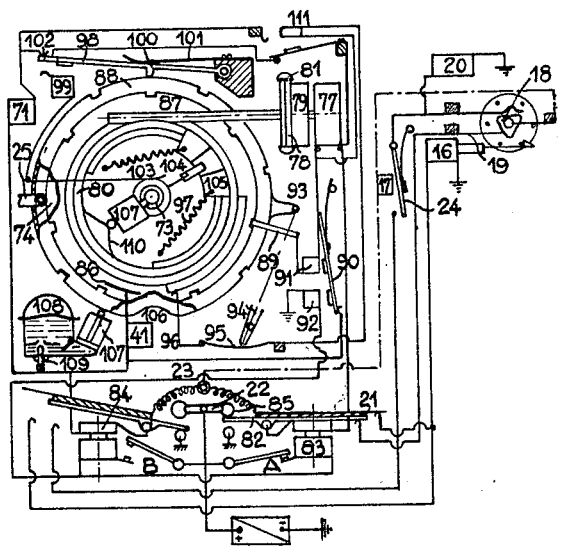
FIGURE 4 shows an operating arrangement for the selecting actuating rods through cams.

In the device illustrated in FIGURE 4, the selector rods are actuated by a corresponding number of cams carried by a camshaft 73 revolving in one or the other direction according to which selector pushbutton is depressed. The shaft 73 extending transversely to the selector rods 25 is supported at the level of these rods by bearings mounted on the gear casing. The cams consist in this example of relatively thick circular plates such as 74 extending across and rigid with shaft 73 and having formed in one or both faces a groove corresponding each to a selector rod 25, this groove being engaged by a guide pin carried by the selector rod and extending at right angles thereto and near its end, whereby the plate rotation may cause this guide pin to move along a straight line intersecting the shaft axis. The aforesaid groove follows along most of its length a circular path concentric with said shaft, during which the guide pin is not urged in any direction and therefore keeps the corresponding selector rod in its neutral position. On the other hand, this groove is formed with two sinuosities, one externally and the other internally of the concentric groove portion corresponding to the aforesaid neutral position. The height of these sinuosities as measured from the radius of said concentric portion which corresponds to neutral, corresponds to the stroke of the selector rod in one or the other direction. When the guide pin leaves the concentric portion of the groove, the selector rod departs from its neutral position and slides in a direction towards or away from the plate axis to one of its endmost positions, according to the relative inclination of the sinuosity portion or section engaged by said guide pin and also to the direction of rotation of the shaft. The aforesaid sinuosities are offset from one plate to another so that only one guide pin can engage a sinuosity at one time. When a selector pushbutton is depressed the plate assembly is caused to rotate in a given direction through the angle corresponding to the angular distance between the vertices of two adjacent sinuosities. These sinuosities may have any desired order consistent with the sequence contemplated for engaging the gear speeds increasing for a given direction of rotation of said cams. If the movements of the set of selector rods (assumed to be three in number in this example) correspond to those imparted thereto by means of the manual gear shift lever for obtaining a constant gear ratio increment, cams will act in succession, each moving its relevant selector rod to its two end positions and subsequently engaging with its concentric groove section the guide pin as the adjacent cam becomes operative in turn.

Figure 5:
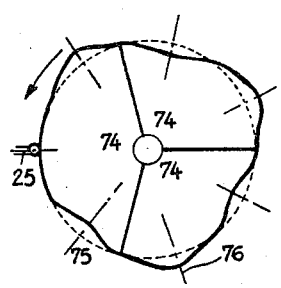
FIGURE 5 shows the arrangement of the cams on the camshaft.

FIGURE 5 shows the arrangement obtained in this case, with the cams disposed on their shaft with a view to provide in their increasing sequence the transmission ratios afforded by the three selector rods by rotating the cams in the direction of the arrow. The section of each plate containing the continuous circular groove which occupies the greater part of the sector is not shown and the remaining sector is limited to the inner edge of the groove. The plates are shown in front view and superposed. The operative sectors and the relevant cams are thus shown in the form of three superposed sectors so that by rotating the shaft in the same direction when one cam leaves its guide pin on its circular track (shown in dotted lines in the figure) the sinuous portion of the next sector becomes operative to move in turn and in succession its rod to its end positions. Upon each fresh actuation the set of cams is held against motion when one of the equidistant radii, such as 75 registers and is aligned with the plane containing the axes of the selector rods. These "stops" correspond in general to the vertex of a sinuosity successively external or internal with respect to the circle of the neutral rod positions. Exceptionally, one of the radii corresponds to the position in which all the guide pins lie on this circle so that no gear is engaged, as shown in the drawing (neutral position). The vertices of the aforesaid sinuosities on either side of this radius control the one through the radius 75 the reverse drive and the other the lowest forward speed. The radius 76 corresponds to the fifth forward speed, which provides the highest transmission ratio.

In an arrangement wherein the cam rotation must not exceed one revolution, the sector disposed between radii 75 and 76 may be dispensed with. The positions of the guide pins for the reverse and the fifth forward speed lie on the same radius where radii 75 and 76 are merged into one. The first position (reverse) is engaged during the first part of the cam rotation in the direction of the arrow, and the other position (fifth speed) during the final portion of this rotation, at the end of the broken-line groove; thus, in no case the guide pins can engage their respective sinuosities simultaneously.

The selector rods sliding level with the camshaft axis are provided with forks somewhat longer than usual. If the camshaft is at a level higher than that of said selector rods, the guide pins are secured at right angles to and at the end of arms carried by said rods or at one end of pivoted levers fulcrumed on a transverse shaft and having their other ends engaged in a notch formed on said rod. If desired, the cams may also be disposed parallel to the central plane of these selector rods, on the gear casing, or behind this casing with respect to the engine. The end portions of the selector rods which carry the guide pins are shaped with a view to keep these pins in the groove plumb to the shaft 73.

Of course, frictional contacts may be reduced by mounting a guide roller on each pin, this roller engaging the side faces of the cam groove, and by increasing the plate diameter. The cam contours may be formed only along the inner side of the cam groove. Each plate will thus have the appearance of a circular disc having two sinuosities formed along its path, i.e. an internal sinuosity and an external sinuosity, their vertices being equally spaced from the outer edge of the plate. The selector rod urged by a spring towards the camshaft axis bears with its end carrying the guide roller against the edge of said plate or disc.

The camshaft may be rigid with a disc carrying along its outer periphery a plurality of perpendicular pins, this disc being adapted to be rotated in one or the other direction for example by using the electromechanical means described in connection with the circular distributor of FIGURE 1. The effort exerted on the pins is amplified in this case due to the complementary means contemplated for the clutch release. The camshaft may also be rotated by means of an electromotor 77 revolving in one or the other direction according to which selector pushbutton is depressed. This motor is so constructed that its direction of rotation is reversed when the conductors leading to its terminals are reversed without altering their connection with the D.C. generator terminals. To simplify the description, it is assumed that this type of motor has a constant direction induction field produced notably by means of a permanent magnet. This field may also be produced by the current flowing through the motor and held in the same direction in the field winding by using rectifying means of known type. The field winding may also be fed separately from separate circuits provided with switching means (not shown).

The shaft 6 of motor 77 extends through a disc 78 linking same to a resilient system enclosed in a casing 79 rigid with said shaft. Over the stud shaft projecting from the disc 78 a tubular member is slipped with a medium fit, this tubular member carrying at the other end a disc similar to the disc 78, which bears thereagainst and has a screw-threaded shaft extention forming a worm meshing tangentially with a worm wheel 80 concentric to the camshaft 73 with which it is firstly assumed to be rigidly connected. The two discs pressed against each other by springs 81 clamping their edges together constitute a clutch whereby the motor may continue to rotate when the mechanism encounters a substantial resistance. On the other hand, a known electrical mounting may be provided to stop the electromotor when its circuit is de-energized.

The motor 77 is controlled by the selector push-buttons according to the diagram of FIGURE 4. Two identical conducting levers such as 82 are each adapted to rock on an insulated pivot pin and urged, in their inoperative position, near the end of their shortest arm, by spring means (not shown) against a grounded contact. Each lever 82 is actuated as a consquence of the attraction by a coil 83 of a magnetic blade provided thereon, this coil 83 being constantly grounded and having its circuit connected to the insulated terminal of the generator by one of the aforesaid switches A and B, each switch being controlled by one of said selector pushbuttons, as already explained. The core of each coil 83 has wound thereon, in the same direction, another coil 84 through which runs the conductor leading to the pivot pin of the corresponding lever 82, said last-named coil 84 being adapted to hold the lever depressed without being capable of moving this lever away from its inoperative position. The actuated lever 82 is released from the grounded contact stud for engagement with another contact stud 85. In the arrangement shown in the figure the two contact studs 85 are connected together to the insulated terminal of the generator through a transverse bar or strip 22.

The pivot pin of that lever 82 which is on the right-hand side of the figure is connected through the corresponding coil 84 to one of the terminals of motor 77. The pivot pin of the other lever 82 is connected through the adjacent coil 84 to a brush 86 slipping on the flat face of a conducting ring 87 mounted by means of an adequate insulating element near the edge of a disc 88 concentric to and solid with the camshaft. The outer edge of this ring 87, which is divided into a number of sectors by equally spaced notches (their relative spacing corresponding to one elementary rotation of said shaft) is engaged by a brush 89 slightly narrower than one of these notches, connected to the other terminal of the motor 77 and so disposed as to drop into the interval of two sectors upon completion of each elementary rotation of the shaft. These notches may be filled with insulating material in order to ensure the mechanical continuity of the peripheral contour of ring 87. On the conductor connecting the motor 77 to the aforesaid brush 89 an insulated pivot pin has fulcrumed thereon a conducting blade 90 of magnetic metal (or provided with a magnetic blade) urged by a spring, to its inoperative position against an insulated contact stud connected to the aforesaid brush 86. When the motor 77 is started, the energizing circuit thereof comprises, in the same order or in the reverse order, the coil 84 of the depressed lever 82 which is thus connected to the insulated terminal of the generator, this lever proper, the motor 77, the pivoted blade 90 and its contact stud, the coil 84 of lever 82 which is still grounded, and this lever proper. When the ring 87 has been rotated through a small angle, this circuit is further closed by the brush 89 engaging one of its sectors. The circuit leading to this brush 89 comprises a coil 91 registering with the pivoted blade 90; this blade is attracted away from its contact stud when current flows through the coil. The motor is de-energized when the brush 89 engages the next break in the aforesaid ring 87.

To prevent any untimely starting of the motor, as would occur immediately after its stoppage if the blade 90 were left in contact with its return spring while the selector pushbutton is still depressed, the coil 91, which holds the blade 90 as long as brush 89 remains in contact with ring 87, is completed by an adjacent coil 92 inserted in the circuit grounding the coils 83, and capable only of holding the blade 90 in its contact closing position.

As already explained in connection with the device shown in FIGURE 1, the number of forward speeds of the vehicle may even be doubled by interposing in the transmission mechanism a stepup gear or overdrive providing a ratio preferably greater than 1:1. To this end, larger plates 74 may be used in which two sinuosities are formed in each direction, in order to move each selector rod twice to each of its endmost positions during a single revolution. The number of sectors of ring 87 is doubled. When the cam assembly rotating in the direction of increasing gear ratios oversteps the angular position where the original gear ratios are engaged, a stepup gear (not shown) is operated notably through the following means: secured on the disc 88 is a radial arm 93, carrying on its outer end a pin extending at right angles to the disc surface; this pin is adapted to engage the gap formed between the two arms of a pivoting lever 94 having stable end positions. When the disc 88 moves from its position providing the highest original ratio to its position corresponding to the lowest complementary or additional ratio, the arm 93 causes the lever 94 to pivot and thus close through the flexible blade 95 of a switch the energizing circuit of a coil (not shown) adapted to control the engagement of said stepup gear providing the additional or complementary transmission ratios. The reverse pivotal movement of said lever 94 will deenergize this coil and thus neutralize this stepup gear. If desired, this lever may also be actuated by means of two opposed coils having their winding grounded at one end. An insulated brush mounted on the disc 88 and substituted for the aforesaid arm 93 is connected to the insulated terminal of the generator and adapted to engage in succession the other end of each winding; it leaves the lever 94 in its last position.

If desired, the complementary gear ratios may also be obtained by using plates of the type described, each plate having two sinuosities during a second revolution after inserting said additional stepup gear in the drive, during the initial part of the rotation following the original gear engagement having provided the highest speed. This rotation should be continued without any break until the angular position corresponding to the engagement of the original ratio is attained, this original ratio becoming, due to the operation of said stepup gear or overdrive, the complementary transmission ratio providing the lowest speed. To this end, the circuit closed by switch 95 connects the brush 89 to another brush 96 engaging an insulated conducting sector solid with ring 87 and covering an angular portion thereof which overlaps the insulated breaks which, when engaged by said brush 89, cause the plates 74 to be stopped in the position corresponding to the engagement of the reverse drive of the vehicle and in the position corresponding to the suppression of any driving connection between the engine and the wheels of the vehicle.

A mechanism similar to the mechanism incorporated in the change-speed device illustrated in FIGURE 1 permits of introducing intermediate ratios between those provided in succession by the device illustrated in FIGURE 4. The component elements having in this last-named device the same functions as in the device illustrated in FIGURE 1 are designated by the same reference numerals. The new features in the arrangement of FIGURE 4 are as follows: The conducting strip 22 connected through its central pivot pin to the insulated terminal of the generator engages in its transverse position the contact studs 85 either of which is engaged by that one of levers 82 which was inclined when the corresponding selector pushbutton was depressed. The flexible blades 21 are each associated through an insulator with one of the levers 82 and connected through a flexible conductor to the insulated contact stud 23 connected in turn to the pivot pin of the triangular cam 18. This contact stud 23 is connected to the insulated terminal of the generator when the strip 22 moved to its original position engages this stud 23. The flexible blades 19 alternatively engaging the triangular rotary cam 18 are connected the one (energizing the electromagnet 20 controlling the stepup gear or overdrive of the intermediate gear ratios) to a contact engaged by the left-hand lever 82 when it is depressed, and the other to the contact engaged by the right-hand lever 82. The first one of these circuits is closed only when current is delivered to the cam 18 through the coil 17 of which the energization closes the switch 24. Of the stepup gear or overdrive providing transmission ratios complementary to the original ones is maintained, the mechanism controlled by electromagnet 20 interposes intermediate ratios between said original ratios.

The preliminary approximate synchronism of the gears of which the rotations are to be brought to unison under the control of a selector rod moved to its end position may be obtained by using the following means: Mounted in the circuit connecting the pivot pin of the left-hand lever 82 to the ring 87 is an electromagnet 41 responsive to the device illustrated in FIGURE 3 and adapted to hold against movement, during the time required for a gear change, the end of rod 39 positioning the carburetor throttle as a function of the momentary position of the accelerator pedal.

In the first system the worm wheel 80 meshing tangentially with the worm portion of the shaft of motor 77 has its considerably widened central orifice mounted in free fit conditions on a sleeve secured at right angles on the disc 88. Thus, it drives this disc 88 elastically through coil tension springs 97 housed inside the wheel 80 and attached each with one end to a peg secured at right angles to the disc 88 and with the other end to an annular sector or plate 105 secured on the edge of said wheel 80 and projecting over the sleeve. The wheel may be closed by a disc secured on its edges and revolving on the shaft 73.

A locking system similar to that illustrated in FIGURE 2 is adapted momentarily to discontinue the rotation of said cams half-way of the passage from one gear ratio to the next gear ratio. It comprises a lever 98 pivoted at one end on a fixed pin parallel to shaft 73 and carrying near its other end a blade of magnetic metal such as soft iron which is adapted to engage the fixed core of electromagnet 99. At a short distance from its pivot pin this lever 98 is formed with a round-edged boss 100 adapted, under the elastic pressure of a spring 101 of relatively moderate force, to engage equally spaced notches formed along the outer periphery of said disc 88 and adapted to register by turns with said boss each time, during an elementary rotation of said shaft 73, the selector rods 25 are in their neutral position. The lever 98 carries on its free end an insulated conducting section 102 normally connected to the pivot pin of the right-hand lever 82. When the lever 98 is moved away from the disc 88 by the boss 100, this section engages an elastic stud provided at the end of the winding of coil 71 connected on the other hand to the pivot pin of the left-hand lever 82; this coil 71 associated with the change-speed device described is an integral part of the auxiliary device illustrated in FIGURE 3. This contact causes the engine clutch to be disengaged and the carburetor throttle to be closed. When the boss 100 drops into one of the peripheral notches of disc 88, the conducting sector 102 leaves the elastic contact stud of coil 71. As this coil 71 releases the switch lever 70 closing the circuits controlling the operation of the aforesaid auxiliary device, the engine clutch of the vehicle is momentarily reengaged while its carburetor resumes its prior open position to accelerate the engine. Section 102 will engage immediately thereafter an elastic contact terminating the winding of coil 99 connected on the other hand to the fixed brush 103 slipping on an insulated conducting ring carried by and rigid with the shaft 73. Secured on the disc 88 at right angles to the shaft is an insulated brush 104 connected to the ring and engaging with its end, in the inoperative position, the central portion of the noninsulated and therefore grounded annular conducting sector 105 rigid with wheel 80. This central portion of sector 105 is surrounded by a pair of insulating sectors. As long as this circuit is grounded through coil 99, the attraction exerted by this coil on the magnetic blade holds the boss 100 engaged in its recess, thus holding against motion all the selector rods in their neutral position. As the worm wheel 80 continues its rotation it carries along the annular sector 105 until the central conducting portion thereof escapes from brush 104, thus eliminating its contact with the ground. The coil 99 is thus deenergized and releases the lever 98 of which the boss 100 is expelled from the notch due to the resilient force of the springs connecting the disc 88 to the wheel 80. Thus, the vehicle engine is again disconnected from the drive and the carburetor throttle is reclosed.

The time necessary for synchronizing the gear members to be engaged is subordinate to the angular movement accomplished by the brush 104 on the conducting portion of the annular sector 105, which portion may have different lengths on one end and the other side of the mean position of the brush according to the direction in which the gear shift is produced (up or down). The return movement of the disc 88 to its position of equilibrium on the wheel 80 may be retarded in order to reduce possible shocks between the members to be engaged with each other, notably through the following arrangement: The disc 88 is doubled, on its face opposite to that carrying the ring 87, by another, relatively thick disc having substantially the same diameter and having formed along its outer periphery a plurality of spaced hollows or indentations such as 106 registering with and of same relatively angular spacing as the notches of the first disc, the width of these hollows or indentations approximating the angular value of the wheel movement in relation to the disc; the contour of these hollows meets on the other hand the following operative requirement: Along one radius of disc 88 which corresponds to the vertex or trough of each hollow 106, at midlength of the elementary cam rotation, a rod is adapted to slide and bears through an end roller against the peripheral contour of the disc in which said hollows 106 are formed. This rod carries at its opposite end a piston slidably mounted in a cylinder 107 which is stationary in relation to the vehicle. Moreover, this rod is guided by the central bearing of an apertured disc secured on the edge of said cylinder 107. A duct connects the bottom of this cylinder 106 to a reservoir 108 filled under a relatively moderate pressure partly with a liquid and partly with a gas, both of adequate types, separated if necessary by a flexible diaphragm. The bottom of this reservoir 108 is isolated from its main body by a partition in which a relatively large aperture is formed; this aperture is adapted to be closed by a valve member responsive to spring means (not shown), which opens in the direction of the aforesaid duct leading to the cylinder. Formed in said partition is a round orifice engageable by the tapered tip of a screw-threaded rod 109 screwed in the bottom of the reservoir and adapted to adjust the liquid output through the orifice. The rod 109 may be locked against movement; closed or plugged orifices (not shown) are provided for making up any loss of liquid and gas.

When the cam rotation brings the edge of one of the aforesaid hollows 106 in alignment with cylinder 107, the expansion of the gas contained in the reservoir will move the piston through the liquid mass flowing freely through the aperture of said partition which is open by the valve member, thus urging the rod carried roller against the side of the registering hollow, down to the bottom of this hollow. When the cams resume their rotation, the valve member being seated by its spring, the liquid mass constitutes for the piston of cylinder 107 a nonelastic resistance. The rectilinear movement of the piston is slowed down immediately to the extent in which the tapered rod 109 retards the flow of liquid through the round orifice formed in said partition of the reservoir. The rotation of disc 88 due to the action of the spring means connecting same to wheel 80, which is faster than the rotation of this wheel proper in order to restore the equilibrium therebetween before the gear shift is completed, is slowed down to the same extent and, furthermore, the steeper the side face of the hollow engaged by the roller carried by said rod, the higher the retarding effect thus produced.

In a modified form of embodiment of this system the cylinder 107 may be fixed and partly fitted in the disc 88 so as to constitute the extension of brush 104. In this case the piston rod engages with its end roller the projecting cam 110 secured with its base against the inner face of the annular worm wheel 80. The sleeve on which the worm wheel rotates is discontinuous to permit the angular movement of said cam 110. The cylinder 107 communicates with its reservoir mounted on the end of shaft 73 through an inner duct formed in this shaft. The contour of cam 110 has the same effect as that of said hollows 106. These contours are asymmetrical if the time required for synchronizing the members to be engaged with each other differs according to the direction of rotation of the cams. A lever similar to the aforesaid lever 98 may resiliently engage with its boss a series of notches formed on the disc in which said indentations are also formed, in order to hold against motion the selector rods 25 at the end of each elementary rotation. The lever 98 may have the same function due to notches formed in the disc 88 which are disposed half-way with respect to the first ones. Thus, the brush 103 engages at the end of each rotation breaks of continuity of the conducting ring solid with shaft 73. As long as the circuit of brush 96 remains closed, coil 111 depending thereon deenergizes the current in section 102 by attracting the flexible magnetic blade normally supplying current thereto. Thus, this blade will engage a contact connected to the coil 71 and close its circuit. When the rotation of shaft 73 is produced by using the mechanism shown in FIGURE 1, the disc carrying the aforesaid pins is elastically connected to shaft 73, the latter being held against rotation in the middle of each elementary rotation like the disc 88. In the system illustrated in FIGURE 6, which is derived from the preceding one and wherein the component elements have the same functions as those of FIGURE 4 designated by the same reference numerals, the preliminary approximate synchronization of the members to be engaged is obtained by interrupting the rotation of the electromotor 77 when the selector rods 25 are in their neutral positions, while the vehicle engine is reconnected to the drive and accelerated.

The insulated conducting ring 87 has formed on its edge engaged by the brush 89, in addition to the aforesaid breaks registering with this brush at the end of each elementary rotation of said cams, similar breaks interposed half-way with respect to the preceding ones and adapted to be engaged by the brush 89 when all the selector rods are in their neutral position. The ring is also formed along its inner edge with notches of same relative spacing as the original breaks of its opposite edge which register in succession, at the end of each elementary rotation, with a brush 112 slipping on the inner edge of the ring. The conducting blade 90 having the same function as in the arrangement of FIGURE 4 is not moved directly by the attraction produced by the coil 91. In fact, this coil has a sliding core or armature which, when attracted by the coil, pulls through an insulating wire one arm of lever 113 fulcrumed on the same insulated pivot pin as the lever 90 and causing in turn the pivotal movement of this lever by means of a shoulder, at the end of its rotation. Another flexible conducting blade 114 having one end secured to an insulated peg connected to the conductor leading from one terminal of motor 77 to the aforesaid brush 89, and the other end connected to the conducting lever 113, tends to rotate this lever to the position in which it is shown. The blade 90 may then engage, with the assistance of a spring, the contact stud supported by the coil 91 and connected to one terminal of the winding of this coil 91, the other terminal of coil 91 leading to the brush 89. As this brush 89 registers with one of the original breaks of ring 87 as a consequence of an elementary rotation of said cams, the motor 77 is started by closing its circuit by virtue of the momentary connection passing through the flexible blade 114, blade 90 and brush 86, and through coil 91. Registering with one of the magnetic blades carried by the blade 90 opposite its face contacting the contact stud of coil 91 is another coil 115 through which current is caused to flow during the complete time period required for effecting a gear shift, as will be explained presently, this current being only capable of producing a magnetic field holding the blade 90 without moving same away from its contact stud. When the motor 77 is started the coil 91 in which energizing current is caused to flow attracts through its core the arm of lever 113 to which it is attached by means of an insulating wire. As it is thus pivoted this lever 113 bends the blade 114 and, by engaging the blade 90 at the end of its stroke, causes this blade 90 to strike the coil 115. At the end of its stroke, the core of coil 91 engages the fixed core of coil 116 branched off the conductor leading to brush 89, whereby this coil 116 will hold the core of coil 91 as long as current flows through the brush 89. This brush has closed the energizing circuit of motor 77 through the ring 87 immediately as the cams have accomplished a small angular movement.

The arm of lever 113, on which the flexible blade 114 connected to the motor 77 is pivoted, carries on its outer end a brush engaging in its inoperative position (as shown) the contact stud 117 connected to the brush 112. When the brush 89 contacts the break of ring 87, half-way of the elementary rotation of the cams, the coil 116 releases the core of coil 91 and the latter, urged by the spring 114, moves the lever 113 to its inoperative position. The time period during which the motor 77 is stopped, which runs from the moment the brush 89 is moved off the ring 87 to that in which the stud 117 is engaged by the brush of lever 113, should be sufficient, without any excess, for synchronizing the peripheral speeds of the members to be brought into relative engagement. This time period is adjusted through the following means: The coil 91 has an extension in the form of a cylinder 118 slidably engaged by a piston attached to the outer end of the sliding core or armature of this coil. This cylinder 118 is closed at its end opposite to the coil. The flexible wire attached to the center of this piston extends through a fluid-tight orifice in the bottom of the cylinder and has its other end attached to the edge of a circular sector of said lever 113. The piston is surrounded by a flexible segment formed with a free edge bent towards said closed bottom wall of the cylinder, so that its movement is slightly retarded when it is pulled by the core sliding within the coil 91; on the other hand, it compresses the air trapped therein when it is pulled by the expansion of the aforesaid flexible blade 114. The bottom of cylinder 118 communicates with a valve or cock for adjusting the venting of air therefrom. Moreover, an adjustable output orifice (not shown) may be provided in the vicinity of said valve or cock, this orifice being normally closed by a valve and adapted to be opened by an electromagnet (not shown) responsive to the left-hand selector pushbutton for reducing the synchronization time period.

When the lever 113, as a consequence of the expansion of the flexible blade 114, which is retarded by the throttling of the air escaping from the cylinder, engages with its brush the contact stud 117, the motor energizing circuit is reclosed by the brush 112 until the latter engages the inner notch of ring 87. Branched off the circuit of motor 77, preferably between the terminals of this motor, is an electromagnet 71 forming part of the auxiliary device illustrated in FIGURE 3 and closing the switch transmitting energizing current to the clutch electromagnets causing the vehicle engine to be disconnected from the drive while closing the carburetor throttle.

The cycle of elementary rotation of the cams being determined by breaks formed along the inner edge of ring 87, the circuit of brush 112 comprises on the one hand the electromagnet 41 inserted in the device of FIGURE 3 and adapted to hold against motion, during gear shifts, the end section 39 of the link connecting the carburetor throttle to the accelerator pedal, and on the other hand the aforesaid coil 115 holding the blade 90 away from its contact stud and the coils 84 each adapted to double one of the coils 83 energized through one of said switches A or B, in order to keep in its lower position the lever 82 controlled by the switch concerned until the gear shift is completed, even if the time during which the pushbutton is depressed has been shortened.

In order to keep the selector rods 25 in the positions in which they are to be held against motion, a positioning device similar to the one illustrated in FIGURE 4 urges its boss 100 into one of the notches formed along the peripheral edge of a disc (not visible in the figure) rigid with ring 87, said notches being separated by angular intervals corresponding to an elementary rotation. This positioning device may be released by an electromagnet branched off the motor circuit.

The devices illustrated in FIGURES 4 and 6 differ only by the manner in which the cam rotation is discontinued; FIGURE 6 repeats the features of FIGURE 4 and needs no further description.

The means for adding complementary transmission ratios are not contemplated in the arrangement of FIGURE 6; therefore, in this case the cam rotation does not exceed one revolution. Intermediate ratios may be interposed between the original ratios, according to the arrangement shown in FIGURE 4.

The momentary engagement of the engine clutch and the simultaneous acceleration of the engine for producing the approximate synchronization of the members to be engaged, when the selector rods are in their neutral position, may be obtained under the driver's control without using the automatic system illustrated in FIGURE 3.

The driver is informed of the movements to be effected to this end by a telltale lamp. The electromagnets 41 and 71 are suppressed in the devices shown in FIGURES 4 and 6. The telltale lamp is substituted for the coil 71 so that it is lighted when the driver disconnects the engine from the drive by depressing the selector pushbutton while releasing the accelerator pedal. This lamp is out during a short time when the actuated selector rod resumes its neutral position, thus informing the driver that he or she must release the depressed selector pushbutton for reengaging the engine clutch and simultaneously increase the engine and vehicle speed by depressing the accelerator pedal. When the telltale lamp is ON, the driver immediately disconnects the drive and discontinues the engine feed. When the lamp is OFF to indicate that the gear shift has been completed the driver's feet resume their normal driving position. The above-described members likely to interfere with this operation are eliminated. To avoid another rotation of cam 18 when depressing the pushbutton again, the core sliding in coil 16 is retained at the end of its stroke in a position of engagement with a coil (not shown) energized during the entire time period necessary for effecting a gear change, as in the case of coil 41.

Instead of being driven by the motor 77 the disc carrying the ring 87, which is then provided with pins like the disc 3 of the distributor shown in FIGURE 1, may be rotated in either direction by using two electromagnets acting upon these pins as in the case of the distributor of FIGURE 1. The electrical mounting of FIGURE 6 is arranged as follows: The conductors leading to the terminals of motor 77 are connected together by this end. The conductor common to brush 86 and to the left-hand coil 84 is constantly connected not to lever 82 but to the ground. The two driving coils are connected with one end of their winding each to the pivot pin of one of the aforesaid levers 82 and together with their other end to the output wire of the right-hand coil 84 towards the coils 41 and 71. The levers 82 engage insulated stops in their inoperative position. The angular spacing of the pins carried by the disc solid with ring 87 equals half its elementary rotation so that when one of the selector pushbuttons is depressed it will cause the energization of the corresponding electromagnet, thus causing the disc firstly to move through half an elementary rotation whereafter the current flow is discontinued in brush 89 and the pawls having driven the disc resumes its inoperative position. After the time lag necessary for synchronizing the members to be engaged, the engagement of the brush carried by the outer end of said lever with the contact stud 117 will restore the energizing current in the driving coil, whereby the disc will be caused to move through the remaining half revolution which is completed when the brush 112 drops into the next inner notch of ring 87. If the half-way stoppage of said disc is not necessary, the means used to this end may be dispensed with and the relative spacing of the pins may be doubled. The same connections may control the electromagnets of the distributor shown in FIGURE 2 for operating two driving members transmitting in opposite directions to the disc pins the effort resulting from a fluid pressure or vacuum. If a device of this character is contemplated in case of failure of the motor 77 the worm-forming portion of the motor shaft may be moved away from the worm wheel 80 by pivoting the motor 77 about an axis parallel to the shaft 73, adequate switching means being provided for modifying the connections accordingly. The system contemplated according to the description of FIGURE 4 for retarding the return of the disc 88 to a position of equilibrium with respect to the wheel 80 may be used for slowing down the cams during the second half of their elementary rotation by means of indentations or hollows such as 106 formed in the edge of the disc rigid with ring 87 and engaged by the roller carried by the outer end of the rod of the piston slidably mounted in cylinder 107. By so retarding the movement of the members to be engaged towards each other, which movements are produced elastically, this system makes it possible to improve their approached synchronism. These members comprise similar and opposed dogs carried by a pinion revolving freely on its shaft and the others by a registering sleeve rotatably mounted on, and adapted to drive, said shaft through splines; their smooth relative engagement, and the relative slipping contact, under increasing pressure, of their registering faces, are obtained as follows: The roller connected to the cylinder 107 is positioned in the bottom of a hollow 106 when all the selector rods 25 are in their neutral position. When the cam rotation is resumed, the resistance to the side thrust of said hollow, which is produced by the liquid in cylinder 107 through this roller, the motor 77 revolving at a substantially constant speed, causes energy to accumulate within the elastic system connecting the casing or sleeve 79 to the worm, the rotation of which determines the movement of translation of the dog sleeve along the splines of its shaft. This slipping movement, as long as it is not impaired by any resistance, is retarded to the same extent as the out-flow, from its reservoir, of the liquid throttled by the tapered rod 109, according to a law governed by the contour of said hollows 106. The movement of the registering dogs towards each other is strongly retarded only when they are about to engage each other.

A substantial reduction in the relative speed of the relatively movable members in one or the other direction may be obtained, before they actually engage each other, by providing a member movable inside one or a plurality of them, notably in a striking dog ring of the sliding sleeve which projects from the dog face in which it can recede. Notably, this dog ring has a slotted front face and the plane of this slot diverges from the rotary shaft; this slot is engaged by a relatively thick plate with rounded edges which is urged away from the shaft axis by the centrifugal force. A pin secured in the dog ring at right angles to the plane of said slot extends through the plate by engaging an elongated aperture formed therein across the shaft. The edge of this aperture which is adjacent to the bottom of said slot has an outflaring notch formed therein intermediate its ends, and the centrifugal force exerted on the plate tends to engage the pin into the trough of said notch, so that the plate will project out from its recess without emerging from the sides thereof before striking an obstacle. The plate is formed with a concave surface registering with the dogs so that when the plate bears with one end on the face of a dog ring while moving away from this ring, its intermediate notch escaping from the pin, it will throw its opposite end against the next dog. This plate consisting preferably of sound-proof material will, each time it engages a dog, slow down the sleeve in relation to the pinion in a position promoting their relative engagement. This plate may be parallel to the sleeve axis and urged away from its recess by a spring. It may be replaced by a flexible blade or wire of similar contour either pivotally mounted like this plate or secured in the bottom of its recess. In order to take advantage of the mutual frictional engagement of the dogs having contacted each other for equalizing their speeds, these dogs have a relatively wide front surface, whether flat or slightly domed, extending at right angles to their axis of rotation, their edges being flanged down. The force of the resilient system released as the roller engaging the inclined side of hollow 106 drives out the liquid contained in cylinder 107, increases between the dog faces of which the relative speed decreases until it permits their engagement. To extend the frictional contact between the dogs, these, preferably reduced in number, may be wider on one of the registering rings. More particularly, the sleeve may carry a single, narrow dog engaging a recess formed in a flat ring solid with the pinion. If the opposite dogs were kept pressed against one another, they would produce the engagement immediately as the engine clutch were released, provided that the sliding sleeve and the rod actuating same are resiliently interconnected, notably by resiliently mounting the sliding fork on its guide rod. The slowing down of the sleeve along its shaft may be combined with the friction synchronizers of known type. Another class of devices for changing the transmission mechanisms by means of a pair of pushbuttons comprises those wherein each selector rod is actuated by a self-contained unit. In the arrangement illustrated in FIGURE 7 depressing either of the control selector pushbuttons operates in succession two separate electric circuits.

The first circuit common to all the selector rods 25 actuates the device provided for resetting to neutral all the rods located in an end position when the clutch is disengaged; the other circuit prepared by the depressed pushbutton is adapted to preselect the next gear combination.

Figure 7:
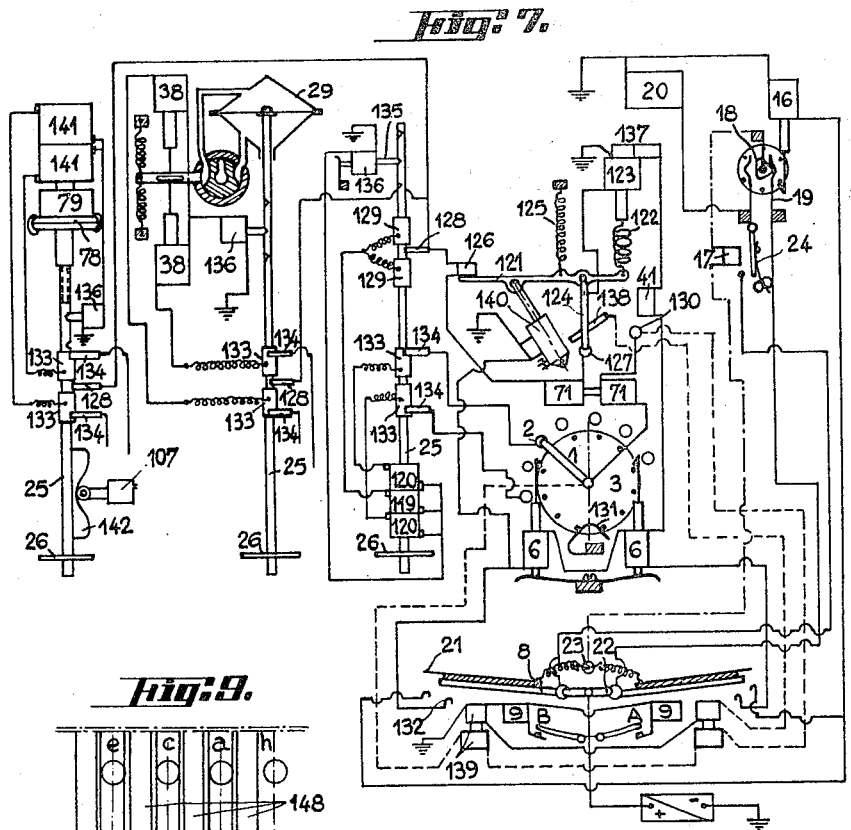
FIGURE 7 shows an arrangement of separate servomotors for each selecting actuating rod respectively with two independent electric circuits.

These electric circuits may actuate selector rods through various means to reduce the number of figures in the drawing, each one of the three selector rods illustrated in FIGURE 7 is actuated by a different means although in practice it would obviously be more adequate to control all the rods through the same means.

The selector rod 25 illustrated in FIGURE 7 (on the right-hand side of the three-selector assembly) is actuated by three stationary coils disposed in series along the rod 25 and each adapted to attract in succession, when energizing current is caused to flow through it, a magnetic core, notably a soft iron core secured on the rod 25.

The intermediate coil 119 when energized attracts at its level the magnetic core to restore the rod 25 to its neutral position; each one of the other coils 120 attracts this core and therefore the rod 25 to one of its end positions in which it engages a pair of gears of the transmission mechanism.

The two circuits may be controlled in succession as follows:

The lever 121 fulcrumed on a fixed pivot pin has an extension beyond this pin in the form of a relatively short arm receiving on its outer end, by means of a spring 122, the tractive effort exerted by a magnetic core sliding in the coil 123 when the latter is energized. The lever 121 also carries across it an insulated brush 124 receiving current through said coil 123 or from a branch thereof. The lever 121 raised in its inoperative position as shown in the figure by a relatively weak spring 125 bears with its end provided with a magnetic blade against the core of the stationary coil 126, the latter being doubled, if necessary, by a permanent magnet of relatively low coercitive force. The insulated brush 124 engages in this case the stud 127 connected to the fixed brush 128 adapted to slide on either of a pair of insulated conducting sections 129 mounted on the rod 25 and separated by a groove or insulating section of a width slightly superior to that of this brush 128. This gap registers with the brush 128 when the rod 25 is in its neutral position. Both conducting sections 129 are connected to the intermediate coil 119.

When a selector pushbutton is depressed, and at least until the gear shift is completed, energizing current flows through the coil 123 and feeds either in series or in parallel the energizing circuits of the electromagnets linked through the brush 124 rigid with lever 121. When current flows through said brush 128, if the rod 25 is engaged (that is, in a position other than its neutral position) the brush 128 will close on one of said sections 129 and therefore through coil 119 the energizing circuit of coil 123 until the rod resumes its neutral position. As coil 126 is interposed in or branched off, the circuit connecting brush 124 to brush 128, it holds the lever 121 against its core as long as current flows therethrough; it releases same to permit the action of spring 122 when this energization is discontinued. Then the lever pulled by the spring 122 will cause its brush 124 to engage the contact stud 130 connected to the rotary brush or arm 1 of a distributor of the type illustrated in FIGURE 1. The delivery of current to brush 124 and, simultaneously, the rotation of arm 1, are controlled by the depressed selector pushbutton. The latter causes the operation of the distributor mechanism which is similar to the one already described in connection with FIGURE 1; therefore, the component elements of this device which are shown in FIGURE 7 are designated by the same reference numerals as in FIGURE 1.

Due to their low inertia, the distributor disc 3 carrying the driving pins therefor, and the arm 1 driven thereby may be held against motion subsequent to an elementary rotation due to a flexible blade formed with an elbow 131 engaging the gap between two adjacent pins. If, nevertheless, the resilient stop member 10 released by coil 11 as shown in FIGURE 1 were deemed necessary, each separate winding of the coil would be connected to a separate contact stud carried by the corresponding lever 8.

Depressing either of the selector pushbuttons will close through one of said switches A or B the circuit of the relevant coil 6 and thus control the rotation of the arm 1 from one stud 2 to one of the adjacent studs in one or the other direction; at the same time it supplies current to the circuits controlling the electromagnets for actuating the rods 25, due to the following connections: studs 132 receiving current from levers 8 are connected together through one of said coils 6 to the coil 123 and also to the pivoted brush 124. The circuit closed by the lever 8 depressed towards its contact stud 132 leads to the ground firstly through coil 119 restoring the selector rod 25 to its neutral position and subsequently, if necessary, through one of the aforesaid coils 120 moving said rod or another rod to the end position in which it engages the new transmission gear.

Rod 25 comprises two insulated conducting sections 133 similar to the preceding ones and each engaged by a fixed brush 134. Section 133 and the end coil 120 which are nearest to brush 128 are interconnected through a flexible conductor. The other section 133 and the other end coil are also interconnected. Each brush 134 is connected to one of the contact studs 2 of the circular distributor. When one of these studs is connected to the insulated terminal of the generator through the rotary arm 1 and the pivoted brush 124, current is caused to flow through the brush 134 connecting the stud 2 to the conducting section 133 connected to coil 120, thus causing the latter to attract the rod 25 to the end position corresponding to this stud 2 then contacting the arm 1. When the rod 25 has attained this position the brush 134 drops into the gap between sections 133, thus deenergizing coil 123. The three coils actuating the rod 25 are connected on the one hand to the conducting sections 129 and 133, and on the other hand to the ground. A spring-loaded locking or detent positioning device of known type may be used for resiliently holding the rod 25 in its neutral position or in either of its end positions. This locking or positioning device may consist of a cylindrical bar 135 of magnetic metal extending at right angles to said rod 25 and formed with a rounded tip adapted, due to the elastic force of a flexible blade reacting against its opposite end, to engage one of a series of three aligned notches or recesses formed in the rod and corresponding to the three permissible positions of this rod. This bar constitutes at one end the sliding armature or core of an electromagnet 136 the winding of which is inserted in the circuit grounding the driving coils of selector rods 25. The bar 135 is moved away from the selector rod 25 when this electromagnet 135 is energized together with one of the driving coils.

Coil 123 has associated therewith a concentric coil 137 connected on the one hand to the conductor through which coil 123 is energized and on the other hand to the ground. The sliding core of coil 123, when the latter is energized, engages the fixed core of coil 137. The magnetic force of this coil 137 is just sufficient to hold its core engaged by said sliding core and therefore to hold the spring 122 tensioned when the coil 123 is deenergized as the brush 124 of contact stud 127 engages the stud 130, or when the current flowing through coil 123 at the same time, as will be explained presently, is too weak to counterbalance by magnetic attraction the force of spring 122. This pull, maintained due to the energization of electromagnet 137, will cause the angular movement of brush 124 and counteract, in addition, the backward movement of this brush 124 towards stud 127 which is caused by spring 125 and which, by closing through brush 128 the energizing circuit of coil 119, would move the selector rod 25 back to its neutral position if the selector pushbutton remained depressed subsequently to the gear shift.

In the general case where the contact studs 127 and 130 have a relatively considerable relative spacing the latter will be filled mainly by an intermediate contact stud 138 projecting from the stud 127 so that the brush 124 will firstly engage simultaneously both studs, and subsequently stud 138 alone, leaving the latter only after having reached stud 130.

In order to ensure a complete gear change even if the selector pushbutton closes switch A or B during a time period just sufficient for lowering the corresponding lever 8, each coil 9 is doubled by another coil 139 shown adjacent to said coil 9 in the figure but adapted to be mounted on a common core therewith. The magnetic pull exerted by these coils 139, while being not sufficient to attract from an appreciable distance the magnetic metal blade of the corresponding lever 8, is adapted to hold the latter in engagement with their core, thus holding the lever 8 lowered until the gear shift is completed when the previously depressed selector pushbutton is released.

Each coil 139 comprises two separate windings energized in succession by means of a low strength current to produce a magnetic attraction having practically the same force in both coils. These windings are shown as being superposed on the core of each coil 139. The windings of same level in each coil 139 are inserted together in a separate circuit. The circuit operated first will ground through windings (not shown) at the upper level of coils 139 either the aforesaid contact stud 138 or, in the absence of this stud 138, contact stud 127. The other circuit connects through another pair of windings of coils 139 the contact stud 130 to the center of the rotary arm 1 also grounded through one of the coils 120. In order to equalize the tangential speeds of the gear members of the next gear contemplated the auxiliary device of FIGURE 3 may be associated with the device of FIGURE 7 by incorporating in this last-named device, as shown, the coils 41 and 71 controlling the operation of the adjacent device: the coil 41 holding against motion the foot-controlled accelerator pedal during the gear shift is inserted in a circuit connecting the depressed lever 8 to the ground. The other coil 71 actuating the engine clutch and deferring the delivery of air/fuel mixture to the engine comprises two separate windings on a common core, these separate windings being energized in succession. The winding energized first is inserted or branched off the conductor leading from contact stud 127 to brush 128. The other winding operated subsequently if necessary is inserted similarly between the stud 130 and arm 1. During the passage of brush 124 from stud 127 to stud 130, the core common to both windings, shown in juxtaposed relationship, loses its magnetism, thus permitting the momentary clutch engagement and acceleration of the vehicle engine. The time required for this passage, which involves a considerable movement of brush 124, requires the use of the intermediate stud 138 in order to keep the first circuit of coils 139 in its closed condition.

The time necessary for synchronizing the rotary members to be engaged is adjusted by slowing down the passage of brush 124 from stud 127 to stud 130 under the control of the pull exerted by spring 122 on lever 121. The angular movement of this lever may notably be slowed down by using a piston having its rod pivotally connected to said lever 121 and sliding in a cylinder 140 pivoted in turn on a fixed pivot pin parallel to that of lever 121. This piston is surrounded by a flexible segment so disposed as to compress the air trapped in the cylinder when the piston is moving towards the bottom thereof and, inversely, to permit the passage of this air when the piston is moved the opposite way, without resisting appreciably to the return spring 125. The air compressed by the piston in the cylinder is vented therefrom through a duct with an output adjusted by adequate valve means. An additional orifice of which the output may be adjusted in the same fashion may be uncovered due to the energization of an electromagnet shown adjacent the cylinder 140 and branched off the circuit closed by the left-hand pushbutton. The movement of lever 121 may be retarded by using any other suitable braking means such as an escapement of the type used in clockworks, or a centrifugal brake of known type.

The coils concentric to rod 25 may be replaced with pairs of coils disposed on either side thereof, their magnetic flux path being closed through the core secured on these coils.

When all the selector rods 25 are actuated like the right-hand rod 25 of FIGURE 7 each coil such as 120 adapted to move them to an end position is connected to one of the contact studs 2 of the circular distributor.

The driving member specially provided for returning the selector rod to its neutral position may be dispensed with, provided that its function is devolved to each one of the driving members moving the rod to one of its end positions but of which the action is suspended when the rod attains its neutral position. Thus, the selector rod adjacent to that of which the mode of operation has just been described is actuated by a double-acting diaphragm similar to that shown in FIGURE 2, this diaphragm being mounted in the same manner on the selector rod between two bell-shaped shells 29 and subjected to a pressure or suction effect on one or its other face according to which side is fed from a distributor of the type illustrated in FIGURE 2. A spring urges the rotary valve member of the distributor to the intermediate position in which it vents the two sides of the diaphragm to the atmosphere. This valve member may assume two end positions with respect to its intermediate position, so as to connect one or the other side of the diaphragm to the source of fluid under pressure other than the atmospheric pressure. This valve member is responsive to a pair of opposed coils 38 each adapted to attract in a different direction a common sliding core pivoted on said rotary member in order to cause said selector rod 25 to slide in one or the other direction. The selector rod carries two identical insulated conducting sections 133 separated by a gap which, when the selector rod is in its neutral position, registers with the fixed brush 128 slightly narrower than said gap. Symmetrically in relation to said brush 128 are two fixed brushes 134 of same width as the brush 128 and each connected to one of the contact studs 2 of the circular distributor which are engaged by the arm 1. The insulated section 133 nearest to the front of the vehicle is connected through a flexible conductor to that one of coils 38 which actuates the fluid distributor for causing the sliding movement of the selector rod towards the front of the vehicle. The other section is likewise connected to the coil controlling the movement of the selector rod 25 in the opposite direction. If, during the initial phase of the gear shift, the selector rod is in one of its end positions, the brush 128 engages that section 133 which is connected to the coil controlling the sliding movement of the rod to its neutral position. When the rod is in this position, the gap between sections 133 registers with brush 128, thus isolating the latter of any electrical connection; the rotary valve member of the fluid distributor is then moved by the return spring to its neutral position. As lever 121 is no more retained by the magnetic attraction produced by the coil 126, the brush 124 moves from contact 127 to contact 130 according to the process already explained hereinabove. If at that time one of the brushes 134 is connected through the rotary arm 1 to the insulated terminal of the generator, the section 133 engaged by this brush 134 will close the circuit of that one of coils 38 which controls the movement of the selector rod concerned in the direction of the end position corresponding to said brush 134.

According to the same principle, the right-hand selector rod may be actuated by only two juxtaposed coils adapted to attract in opposite directions, as in the case of coils 120, the magnetic core secured on the rod. Two insulated conducting sections 133 rigid with the rod are connected to these coils in the same manner as coils 120, Brush 128 is mounted intermediate the brushes 134 as on the central rod. On all selector rods the brushes 128 are interconnected and each brush 134 is connected to one of the corresponding contacts 2 of the circular distributor. These last-named connections are shown only in the case of the right-hand rod 25.

Similarly, the third rod illustrated on the left is actuated in either direction of translation by two similar electromotors 141 superposed in opposite directions on a common shaft. One of their terminals is grounded and the other is connected to a different conducting section 133, whereby the motor shaft will revolve in one or the other direction according as it is the insulated terminal of one or the other motor which is connected to the insulated terminal of the generator. According to the same friction driving arrangement as illustrated in FIGURE 4 the shaft common to the two motors extends through, and is resiliently solid with, a disc 78. The free end of this shaft has threaded thereon a tubular member carrying at one end a disc similar to the preceding one and engaged by marginal springs; the other end of this tubular member is internally threaded and engaged by the screw-threaded end of selector rod 25. This rod is prevented from rotating about its axis by the fork 26 and moved towards or away from the driving motor according to the direction of rotation thereof. The electrical connections are the same as those concerning the intermediate selector rod. If the rod, at the beginning of the actuation, is in one of its end positions, the brush 128 will engage that conducting section 133 thereof which is connected to the insulated terminal of the motor, the rotation of this motor restoring the rod to its neutral position. When this position is attained, the insulated terminals of the motor can receive current from the rotary arm 1 of the distributor which is positioned beforehand by the depressed selector pushbutton.

The selector rod actuating members may be mounted on auxiliary rods separate from and parallel to the rods to be actuated, these auxiliary rods driving the selector rods through any mechanical means affording a different, notably a greater amplitude of, translation.

The gear change device responsive to the two selector push members which is illustrated in FIGURE 7 permits of doubling the number of transmission ratios by interposing in the drive a stepup gear due to the additional connections contemplated to this end in the circular distributor of FIGURE 1.

The same change speed arrangement may also permit of interposing intermediate gear ratios between the original ratios, due to the device associated to this end with the gear change distributor system utilizing a circular distributor of the type illustrated in FIGURE 1 and reproduced with the same reference numerals in FIGURE 7. The engagement of the stepup gears providing the intermediate ratios is prepared or preselected by rotating the conducting strip 22 either closing through contact stud 23 the connections controlling this stepup gear, or alternatively suppressing same, to substitute an original gear ratio for another.

The device illustrated in FIGURE 7, as just described, is capable of controlling the gear-shift operations by simply exerting a pressure of any duration on either of the selector push members.

It may be simplified as follows:

As already explained in connection with the change speed device utilizing rotary cams for controlling the selector rods, as shown in FIGURES 4 and 6, the rotary members to be engaged are synchronized without resorting to the auxiliary mechanism illustrated in FIGURE 3, according to the information given by a telltale lamp guiding the alternating movements of the driver's feet. Coils 41 and 71 are dispensed with and a telltale lamp is substituted for this last-named coil. A switch may be provided to this end. The coils 139 retaining the levers 8 are also eliminated, but their circuits are maintained for energizing a coil (not shown) adapted to retain in its innermost position the sliding core of coil 16 actuating the triangular cam 18 and thus prevent the rotation of this cam when the circuit of coil 16 is reclosed by the driver repeating his or her pressure on the selector pushbutton when the driver sees that the telltale lamp is ON. The coils 6 may also be retained in their end position by a similar means for preventing another rotation of arm 1. An equivalent means consists in positioning the contact studs 2 at an angular spacing which is twice that of the pins carried by the rotary disc.

These cares become useless if on the other hand it is deemed advantageous to equip the vehicle with means for momentarily disconnecting the vehicle engine from the drive without changing the transmisison ratio. This is obtained by using a third pushbutton disposed at a higher level than said selector pushbuttons and which is more remote from the driver. Thus, instead of redepressing the selector pushbutton when the telltale lamp guiding his operation lights up again, the driver will depress this special clutch release control.

If the mechanism for shifting the transmission gears is already of a type adapted to synchronize automatically through known means the members to be engaged, the parts provided to this end in FIGURE 7, and more particularly the device provided for retarding the movement of lever 121 and intermediate stud 138, may be dispensed with. The first one of the circuits of coils 139 which is brought into operation is connected directly to contact stud 127; this stud is relatively close to stud 130, the gap left therebetween being substantially inferior to the width of brush 124.

Moreover, when it is up to the driver to keep the selector pushbutton depressed only until one of the telltale lamps is ON to inform the driver, as will be explained presently, that the new gear is engaged, the coils 139 are also eliminated together with the brushes 134; then the studs 2 are connected directly to the coils or terminals with which they were connected through these coils. The coil 123 may also be dispensed with if the traction exerted on spring 122 is produced by the depressed selector pushbutton due to a proper mechanical connection. The means for controlling the relative frictional engagement of the dogs of the rotary members in order to bring their speeds to unison, which are used on the device driving through cams the selector rods, are applicable directly to these rods. To this end, each selector rod 25 has secured thereon a flat cam 142 the contour of which repeats the characteristics of the aforesaid indentations or hollows 106 (FIGURE 4) and is engaged by the rollers carried by the outer end of the rod of the piston sliding in cylinder 107 mounted at right angles to the mean plane of said selector rods 25 (but shown parallel to this plane to simplify the drawing). The projections of the contour of these cams 142 on a plane parallel thereto are coincident when all the selector rods are in their neutral position, the retarding system being common to all the rods and acting through a roller associated with all the cams of the device. As the rod 25 is resiliently urged its movement of translation from its neutral position is retarded according to the position of said roller on cam 142 and to the flow of liquid forced by the piston of cylinder 107 through the round orifice formed in the partition of reservoir 108 and throttled by the needle valve or screw 109. The elastic system of which the expansion is thus controlled differs from the selector rod driving system. In the case of a selector rod of the type carrying said cam 142 a group of springs tensioned in opposite directions and housed within the casing 79 connects the common shaft of said oppositely running electromotors to the disc 78 entraining by frictional engagement the internally screw-threaded tubular member in which the selector rod 25 is screwed. The translation of the intermediate rod of FIGURE 7 is facilitated by the elasticity of the fluids fed to its opposite motors. The magnetic core of the right-hand selector (as shown in this figure) is adapted to slide along this core between equally tensioned springs.

In a device derived from that illustrated in FIGURE 7 the selector rods are driven somewhat in the fashion of the left-hand rod 25 in the same figure. As shown in FIGURE 8, the driving system (of which the rotation produces the movement of translation of the selector rod in the device of FIGURE 7) is replaced by a bevel wheel 143 having a hollow shaft formed with an internally screw-threaded portion engaged by the screw-threaded end of the selector rod. This bevel wheel 143 is in constant meshing engagement with a pair of registering bevel pinions 144 mounted in smooth frictional contact on a shaft 145 extending across the selector rods and driven in the same direction of rotation through a suitable connection either from the vehicle engine or from a separate electromotor. This prime mover may also be the starter motor of the vehicle, which is then fed with a low-strength current and adapted to be disconnected from the engine of the vehicle through any suitable means. More particularly, its rotation may take place in this case in the direction opposite to that required for starting the engine. If the rotation of shaft 145 is limited to the time necessary for shifting from one gear to another, it is controlled by the same mechanism as the transmission clutch. The bevel pinions 144 are made of magnetic metal, or at least provided on their face opposite to their toothed face, especially if they consist of plastic material, with a soft iron ring slidably engaged by a relatively thick soft iron disc 146 formed with a circular groove registering with said spring, a winding of insulated conducting wire connected at one end to said shaft 145 and at the other end to an insulated conducting ring, surrounding the edge of said disc and being engaged by a brush 147. The disc 146 may be secured on or driven from said shaft 145 by means of a helical spring. When currents flow through the annular coil, its energization attracts the magnetic core of that bevel pinion 144 which is drivingly connected with shaft 145. This coupling may slip in case of accidental holding of the pinion against movement.

The selector rod carries (as in the case of the intermediate and left-hand selector rods of FIGURE 7) two insulated conducting sections 133 separated by an interval or an insulated ring. Each selector rod is connected through a flexible conductor to a fixed brush 147 slipping on an insulated collector ring carried by one of said discs 146. These coils are energized according to the same procedure as applied to the energization of the terminals of the left-hand selector rod driving system shown in FIGURE 7. The current flows firstly to the fixed brush 128 registering with the gap between sections 133 when the selector rod concerned is in its neutral position. If the rod is moved away from this position, brush 128 engages section 133 connected to the annular coil causing the engagement of that one of said pinions 144 which determines the return movement of the brush. Each brush 134 disposed symmetrically in relation to brush 128 is connected to the contact stud 2 of the circular distributor shown in FIGURE 7. It transmits the current likely to be fed thereto through the annular coil of disc 146 of which the pinion brings the selector rods to one of its end positions in which the brush 134 registers with the gap provided between said sections 133. The selector rods 25, which are three in number in the example illustrated, are assumed to be mounted in their bearings parallel to the longitudinal axis of the vehicle and these rods have the relative arrangement shown in FIGURE 9 in top view from above and in neutral, the upper portion of FIGURE 9 being assumed to be directed towards the front of the vehicle.

In the change speed devices described hereinafter the selector rods are moved successively in their axial direction by a rigid pin engaging a transverse notch formed in the rods, this pin being actuated through various means.

A detent positioning device holds the rods 25 either in their neutral position or in one of their end positions. In their neutral position their notches registering with each other constitute together a kind of transverse channel whereby the control pin may move from one selector rod to the adjacent rod for driving same in turn. The pin is also normally guided, in a direction parallel to the rods 25, by partitions 148 secured intermediate these rods for example, on the bottom of the casing enclosing them; these partitions are discontinued across said notches when the rods are in their neutral position. These breaks of continuity of said partitions constitute in turn a transverse channel permitting the lateral transfer of said control pin. When this pin is mounted on the lower ball-shaped end of a gear shift hand lever, the most convenient maneuver for engaging gears in the increasing direction leads to move the control pin alternatively forwards and then backwards with respect to the vehicle, and to shift the lever laterally in a predetermined direction, if necessary, when it registers with the transverse channel for switching to an adjacent selector rod.

In the devices described hereinafter the longitudinal movements of translation in opposite directions of said control pin are obtained by means of a so-called "reversing" member of which the lateral movements are obtained by means of a so-called "deviator" member.

Figure 9:
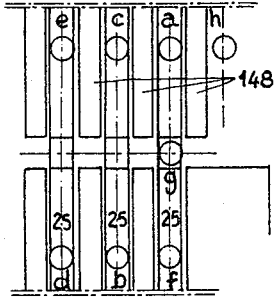
FIGURE 9 is a fragmentary top view of the selecting actuating rods of FIGURE 8 in their neutral position, showing the conventional positions of the rod driving tappet for each speed.

In FIGURE 9 small circles designated by reference letters correspond to the various positions in which the control pin is held in the grid formed by the aforesaid partitions 148. According to a conventional disposal it will be understood that the circles designated by the letters $a$, $b$, $c$, $d$ and $e$ show the positions of said control pin respectively for each gear stepped in the increasing direction (i.e. from first gear to top forward gear), so that position $a$ corresponds to the gear engagement providing the lowest transmission ratio, and position $e$ the gear engagement providing the highest transmission ratio. Position $f$ provides the reverse gearing, and position $g$, in which the control pin may be held against motion, no gear engagement takes place. Position $h$ externally of said grid, will be discussed presently.

Having thus established the correspondence between the positions of said control pin and the groups of transmission gears engaged by this pin in each position the movements imparted longitudinally to said pin by said reversing member and transversely by said deviator member are coordinated into two different systems according as the next group of gears to be engaged is expected to increase or decrease the velocity of the drive wheels in relation to the engine speed.

To engage the next higher gear ratio:

When said control pin is moved forwards, it is not deviated and remains on the same rod;

When said pin is moved backwards, it is deviated laterally to the left at mid-stroke to carry along the adjacent left-hand selector rod.

To engage the next lower gear ratio:

When said pin is moved forwards it is deviated laterally to the right at mid-stroke to carry along the adjacent right-hand selector rod;

When said pin is moved backwards, it is not deviated and remains on the same rod.

In the assemblies comprising a reversing member and a deviator member which are described hereinafter the choice between the two coordinating systems is prepared by the depressed selector pushbutton due to the connections provided between the pin-driving members and the pushbuttons. The deviator member applies to the control pin an elastic pressure increasing during the first half of its longitudinal travel; thus, when the pin eventually registers with the aforesaid transverse channel, it is projected through this channel to the adjacent rod by the expansion of the elastic system. The force necessary for actuating the reversing member may be taken from the pressure exerted by the driver's foot on the clutch pedal, with the assistance if necessary of the means already contemplated in connection with the clutch.

Figure 10:
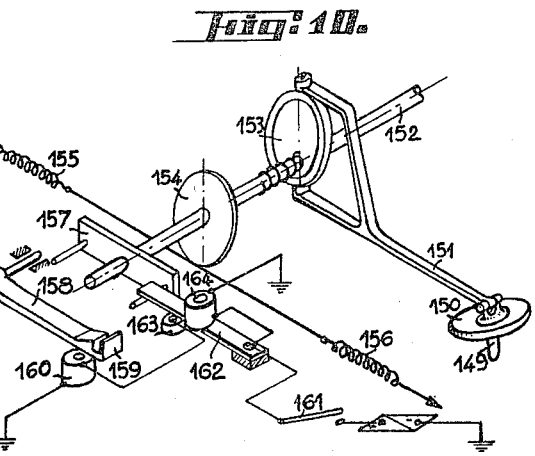
FIGURE 10 is a perspective view of the changeover reversing member moving the driving tappet of the selecting actuating rods.

In the example of a member of this character which is illustrated in FIGURE 10 the pin 149 extending through an aperture formed in the cover of the casing enclosing said selector rods is mounted centrally of a disc 150 adapted to slide in all directions with a moderate play between the cover face and a flat ring (not shown) secured thereon. If desired this control pin may, as shown in the figure, be secured at right angles to and extend through the disc 150, and in this case the end of said pin which emerges from the disc is pivotally connected to the member driving said pin in a direction substantially parallel to the longitudinal axis of the vehicle. This pin may also be rigidly secured, with an inclination approximating 90 degrees, to the end of a connecting rod 151 to which a reciprocating motion is imparted. In this case the pin is connected through a ball-and-socket joint or like means to the disc 150 through which it extends. The reciprocating motion of said connecting rod 151 (parallel to the longitudinal axis of the vehicle) is obtained in this case by rotatably driving in a constant direction the shaft 152 revolving in fixed bearings and acting by means of a crankshaft or an eccentric. In the example illustrated in FIGURE 10 this crankshaft is embodied in the form of a wheel 153, the shaft 152 extending through this wheel in the vicinity of its edge and being rotatably solid with said wheel. The wheel 153 is formed with a peripheral groove engaged by a sliding collar carrying two diametrically opposed trunnions each pivotally engaged by one of the arms of said connecting rod 151 carrying on its opposite end the control pin 149. Secured on and concentric to said shaft 152 is a pulley 154 having a flat-bottomed groove in which a flexible wire is wound. This wire has one end anchored to a fixed point by means of a relatively weak return spring 155 and the other end attached through a spring 156 of adequate strength and flexibility to a member exerting in the direction of the arrow (FIGURE 10) the effort applied to the clutch pedal through any suitable means. The clutch pedal may be assisted or replaced by a force taken from the power unit. More particularly, the spring 156 may be attached to the movable bottom of a fluid-tight bellows provided in its fixed bottom with a valve normally open to the atmosphere. The clutch pedal or any one of the selector pushbuttons will actuate this valve to connect the bellows to the induction manifold of the engine, the vacuum created therein actuating said movable bottom. Across the end of shaft 152 a cross plate 157, substantially perpendicular to the direction of that diameter of pulley 153 which intersects the axis of shaft 152, carries adjacent to its ends a perpendicular pin, as shown. Inserted in the circular or arcuate paths of these pins is a pivoted lever 158 carrying at one end a perpendicular stop 159 in the form of a flat plate. Just before this stop member 159, at a distance therefrom sufficient to permit the passage of a pin, an inclined tooth projecting less than said stop member is formed on or carried by the lever. As the lever 158 bears with its flexible arm, beyond its fulcrum, against a fixed stop or rod, it tends to rise to the position in which it retains one of said pins between said stop 159 and said inclined tooth. This arm carries a magnetic blade registering with a stationary electromagnet 160 of which the circuit is closed by means of a switch 161 actuated by the clutch pedal or any one of the aforesaid selector pushbuttons. The stop member 159 depressed by the attraction exerted by the coil 160 releases the cross plate 157 and at the same time the spring 156 is tensioned and pulls the cable wound in the groove of pulley 154 in which it adheres due to the tension of spring 155, thus causing the shaft 152 to rotate. The circuit of coil 160 is opened at the end of a time period inferior to that corresponding to a half revolution of said shaft 152, whereby the pin opposite to the one just released is stopped by the member 159. To this end, the energizing circuit of coil 160 comprises a flexible conducting blade 162 connected to the insulated terminal of the generator and resiliently engaging in its inoperative position the stationary contact stud 163 connected to the coil 160. The blade 162 lies in the circular path of the pins carried by cross plate 157 and carries a magnetic blade registering with a stationary electromagnet 164 energized through a separate circuit as long as switch 161 is closed. When one of the pins engages the magnetic blade 162 during its travel, this blade is moved away from its contact stud to the position in which it is shown, with the tip engaging the core of coil 164, the latter having a magnetic force just sufficient to keep this engagement. Coil 160 may also be energized through two conducting elements interconnected during a brief period during the initial part of the operation. Upon releasing the tension of spring 156 the cable urged by the other spring 155 slips with a moderate frictional contact on the pulley 154 retained by the pin inserted between the stop member 159 and the inclined tooth. Since each pin is stopped, for an opposite position of the connecting rod, each time one of the selector pushbutton is depressed again, the pin 149 will move from one end position to the other end position. Driven by spring 156 the connecting rod 151 applies its effort with an adequate elasticity on the pin in each direction. For the same purpose, the pulley 153 may be rotated by shaft 152 through a helical spring surrounding same. The reversing member may be reduced to a link having one end fulcrumed on a fixed point of the vehicle and the other end pivoted on the member carrying the aforesaid pin 149, this link comprising two sections sliding telescopically in each other under the control of a prime mover incorporated in the section fulcrumed on the fixed point, and adapted to expand and contract this link to its maximum length and minimum length, alternatively.

This expansible and collapsible driving link may consist for example of an assembly similar to that actuating the intermediate selector rod shown in FIGURE 7. In this case the assembly is pivoted on a fixed support of the vehicle by means of a joint mounted centrally of the outer surface of the bell-shaped case 29. The sliding rod 25 sliding through the other bell-shaped case towards the pivotal link mounting on the fixed point has its free end pivoted on a disc similar to the disc 150 of FIGURE 10 by having either the pin 149 formed integrally therewith or the end of the connecting rod bent at right angles and forming a pin-like extension through said disc. A two-way elastic system may be incorporated in the connecting rod. During the initial part of each manoeuvre, the depressed selector pushbutton actuates the reversing switch to alternatively close the circuit of one or the other of the opposed electromagnets 38 actuating in opposite directions the valve member of a distributor, for example of the type shown in FIGURES 2 and 7 for successively causing each face of the diaphragm to communicate with the source of compressed or vacuumized fluid.

An expansible and collapsible (or telescopic) connecting rod pivoted at its ends like the preceding one may consist of a pair of coils assembled end to end and having one end fulcrumed centrally of its end face on a stationary support. The other end has a tubular extension of non-magnetic metal guiding a rod pivoted at one end, like the preceding connecting rod, on a disc 150 carrying the pin 149 and comprising a magnetic metal core attracted to the level of the center of that one of said coils which is energized. The energizing current is distributed alternatively to each coil through a reversing switch.

The connecting rod may also consist of an assembly similar to that actuating the selector rod illustrated in the left-hand portion of FIGURE 7. In this case the prime mover actuating this rod rotates preferably in a direction reversed upon each gear change by reversing the connections between its terminals and the polarity of the generator, by using a reversing switch; thus, the rotation of the internally screw-threaded tubular member fitted on the motor shaft will move alternatively the screw-threaded rod (and therefore the disc 150 leading therefrom) which is engaged in said tubular member away and towards the motor.

A motor changing its direction of rotation and shifting alternatively from one transverse shaft to another upon each actuation is adapted to actuate similarly in opposite directions through an arm perpendicular to the shaft a connecting rod leading to the disc 150.

The connecting rod may also be coupled with a longitudinally slidable carriage as will be explained presently.

The current reversing switch may be of the type illustrated in FIGURE 1 which comprises a triangular rotary cam 18 connected to the insulated terminal of the generator and adapted to engage alternatively each one of the blades 19 connected to oppositely acting coils.

The reversing switch may also close the circuit of each opposite coil by means of a brush adapted to be tilted between two stationary contact studs. More particularly, this switch may comprise a wedge-shaped member fulcrumed on a pin coincident with its axis of symmetry, the side faces of this member being bent at their endmost edges. A connecting rod moved in the direction of the pivot pin carries across it a peg which, by engaging one of said side faces of the wedge-shaped member, slides along this member until it engages its bent edge so as to exert a thrust thereagainst and tilt the member to its opposite position. This wedge-shaped member is solid with a brush connected to the insulated terminal of the generator, which engages by turns the contact studs of the two coils acting in opposite directions. The wedge-shaped member is urged to its end positions by a spring exerting its maximum pressure on this member when the latter is in its intermediate position.

This reversing switch may actuate directly, alternatively in either direction, a fluid distributor of the type illustrated in FIGURE 2. It constitutes a typical reversing switch of which the dimensions are preferably consistent with the effort to be transmitted. The wedge-shaped member receiving alternatively on its side faces the thrust exerted by a connecting rod actuated by the clutch pedal carries an arm fulcrumed on the connecting rod and leading to the disc 150.

When the reversing switch is designed with a view to supply energizing current alternatively in opposite directions to the terminals of a motor for reversing its direction of rotation, it actuates, together with the tilting brush connected to the insulated terminal of the generator a pair of grounded brushes disposed on either side of this tilting brush. Interposed in the path of these brushes are a pair of studs each connected to one of the motor terminals, so that when one of these terminals is connected to the insulated terminal of the generator the other terminal is connected to the other terminal.

This reversal of the connection may be deferred until the gear shift is completed in order to prepare the next gear shift. When a selector pushbutton is depressed the electromagnet controlling the switch restores the latter to its inoperative position by tensioning a spring producing the next reversal when it is released by the subsequent current break. The following reversing switch has a more comprehensive function. In the arrangement illustrated in FIGURE 11 an electromoter 77 of which the direction of rotation is reversed upon each actuation is secured across the selector rods 25 and drives through a friction clutch and an elastic coupling a toothed pinion 165 meshing with a rack 166 assumed primarily to be solid with the carriage 167 sliding in fixed longitudinal slideways. The pin 149 (not visible in the figure) is secured at right angles under a plate 168 sliding in transverse slideways provided on the carriage 167 shown in plane view from above. It can shift from one selector rod to another when these are in their neutral position. The motor 77 drives by turns the carriage 167 to its end positions in either direction by means of a switch reversing its direction of rotation before each stroke, by reversing the connections between the generator terminals and the motor terminals.

This reversing switch may be constructed as follows: A cylinder 169 of insulating material revolves freely about its fixed axis in a predetermined direction due to the attraction exerted by an electromagnet, in the same way as in the case of the triangular cam 18 of the reversing system illustrated in FIGURE 1. Secured on a lateral face of cylinder 169 on a circle and at spaced intervals are a plurality of pins adapted to be moved by turns by means of a pawl 170 carried by the end of a flexible blade constituting the extension of the sliding core of coil 171, each stroke thus produced corresponding to the angular distance between two adjacent pins. A flexible blade (not shown) engages with an elbow the gap formed between two adjacent pins for holding the cylinder against movement after each rotation thereof. Another flexible blade exerts an elastic pressure against the end of a nonmagnetic rod constituting the extension of the core of coil 171 opposite to said pawl for urging said core outside the coil in the inoperative condition. In the example illustrated in FIGURE 11 the cylinder 169 carries six pins and has formed in its surface on the right-hand side as seen in the drawing three conducting grooves receiving each a flexible brush forming insulated rod 172 secured by one end. The intermediate rod is constantly connected to the insulated terminal of the generator. Each end or lateral rod is connected to a flat insulated brush 173 extending transversely to the vehicle and adapted to engage an insulated conducting strip 174 alongside the carriage 167; this strip 174 is connected to the ground as long as the motor 77 is driving the carriage. One of the aforesaid brushes 173 is so disposed as to move away from the strip 174 when the carriage 167 has attained its endmost position towards the front of the vehicle. The other brush 173 is moved away from the strip 174 when the carriage has attained the opposite end position. Between the conducting grooves receiving the rods 172 two stationary insulated and flat brushes 175 are in frictional contact with the surface of cylinder 169. Each one of these two brushes is connected to one of the terminals of motor 77. On generatrices of said cylinder 169 which are spaced 60° from one another a plurality of conducting strips or flutes 176 are inserted so as to project slightly from the cylinder surface. These strips are stopped under the brushes after each elementary rotation of the cylinder. Some of these studs connected to the intermediate groove are disposed by turns on either side thereof. The other studs are disposed in the gaps formed between the preceding ones, and connected by turns to the right-hand groove and to the left-hand groove with respect to said intermediate groove. Thus, when one of the terminals of motor 77 is connected to the insulated terminal of the generator the other terminal is connected to one of the transverse brushes 173. In the next cylinder position this terminal is connected in turn to the insulated terminal of the generator and the other terminal is connected to the other brush 173. The same contact stud arrangement is provided under the brushes 175 after two-sixths of a cylinder revolution. The connections obtained are such that the motor 77 drives the carriage 167 to its endmost position opposite to that occupied beforehand. When the carriage has attained its new position the insulated conducting strip 174 is moved away from the brush 173 connecting the motor 77 to the ground and the driving action ceases. On the other hand the cylinder 169 carries on its left-hand portion as seen in the figure a pair of conducting grooves similar to the preceding ones and each resiliently engaged by an insulated flexible rod 177. Each rod may be connected to the insulated terminal of the generator, one when contact A is closed, and the other when contact B is closed. On the right-hand side of each groove a flat brush 178 slips on the cylinder 169. Alternatively under each brush a contact stud similar to and mounted like the preceding ones is held against motion and connected to the groove positioned on the left of the brush concerned. The brush 178 located on the right of said groove engaged by the flexible rod 177 responsive to said switch A engages a stud of this groove when the pin 149 is to be moved towards the rear of the vehicle. This brush is connected to an electromagnetic device adapted resiliently to drive the pin to the left when switch A is closed, this device being illustrated diagrammatically in the form of a coil 179 depending on this switch. The other brush 178 engages one of the studs connected to the groove receiving the flexible rod 177 depending on switch B when the carriage is to be moved towards the front of the vehicle. This brush is connected to an electromagnetic device illustrated diagrammatically in the form of the other coil 179 which deflects the pin to the right when switch B is closed. The coil 171 of which the sliding core actuates through its pawl 170 the cylinder 169 comprises two separate windings both connected by one end to the ground, and adapted on the other hand to be connected each separately to the insulated terminal of the generator in the same fashion as each winding of coil 11 illustrated in FIGURE 1. The members controlling the energization of the windings of coil 171 are similar to those energizing the windings of coil 11 and are designated by the same reference numerals as in FIGURE 1. The contact of that one of levers 8 which was depressed against its contact stud as a consequence of the magnetic attraction of the corresponding coil 9 energized through one of said switches A or B, closes the circuit of one of the windings of coil 171 to the insulated terminal of the generator and, due to the attraction of this coil, causes the cylinder 169 to rotate through one-sixth of a revolution. By virtue of this rotation that one of brushes 173 which was not connected to the generator during the preceding actuation is now integrated into the energizing circuit of motor 77 through the contact established between one of the studs 176 depending on the groove connected to this brush and one of the brushes connected to the terminals of the motor. The motor energizing circuit is thus closed and the carriage travels in the opposite direction. At the same time the depressed lever 8 closes, if necessary, through the flexible rod 177 and the relevant brush 178, the circuit controlling the electromagnetic device designated by one of the coils 179 for deflecting the pin in the lateral direction in conjunction with the direction of this longitudinal translation. Under the preset conditions wherein the pin 149 is in the position designated by the reference letter $g$ in FIGURE 9, when no transmission gear is engaged the device described hereinafter is provided for stopping and starting the pin to and from this position.

A fixed insulated brush 180 is disposed symmetrically with respect to the brushes 173 against the edge of the insulated conducting strip 174 which is opposite to these brushes, this brush 180 being connected to another insulated brush 181 carried by a fixed cross member 182 straddling the carriage and kept in frictional contact with the surface of plate 168 connected to the ground. Secured on this plate 168 and flush to its surface is an insulating knob 183 slightly wider than the brush 181 and engaged by this brush 181 when the pin 149 is in its position $g$, FIGURE 9. At that time the connection between strip 174 and the ground is discontinued and the energizing circuit of motor 77 is open, so that the carriage will stop at midstroke. The motor energizing circuit is restored upon a fresh actuation from this position by depressing either of the selector pushbuttons, through the following means: An insulated conducting blade 184 of magnetic metal connected to the strip 174 either directly through a flexible conductor or according to the diagram of FIGURE 11 is urged by a spring, to its inoperative position, for engagement with a grounded contact stud. Registering with the blade 184 is an electromagnet having its coil 185 inserted in the circuit connecting the brush 180 to brush 181. If either of the selector pushbuttons is still depressed, the insulated strip 174 being grounded through the blade 184 engaging its contact stud, the energizing circuit of motor 77 is closed and carriage 167 will start in the direction consistent with the connections provided at that time by means of the cylinder 169. Immediately as the movement of carriage 167 enables the brush 181 to project from the insulating knob 183 with which it was previously engaged, the circuit of coil 185 is closed. This coil will thus attract the blade 184 away from its contact stud and eliminate the effects produced by its connection with said strip 174. The blade 184 is kept away from its contact stud, as long as the selector pushbutton remains depressed, by a coil 186 forming an integral part of the conductor connecting the coils 9 to the ground. The core of coil 186 comprises a second winding of same direction connecting the coils 13 to the brush 181, notably through the coil 41 of the auxiliary mechanism illustrated in FIGURE 3, for retaining the blade 184 away from its contact stud when the strip 174 becomes disengaged, at midstroke, from the brush 180 as will be explained presently. To prevent energizing circuit of motor 77 from being broken when the pin 149 passes through its position g of FIGURE 9 during its movements from position a to position b, brush 181 is connected to the insulated pivot pin of a magnetic lever 187 normally urged by a spring away from its contact stud connected to the ground, this lever being adapted to engage this stud by the attraction of a coil 188 interposed in the conductor connecting to this stud the coils 179 controlling the deviation of pin 149. If this pin 149 from position g is to resume its movement in the same direction as that of its preceding movement, the reversing effect produced by cylinder 169 on the carriage is discontinued by means of the normal operation of the selector pushbuttons, through the following arrangement: The two separate windings of coil 171 are both connected at one end to an insulated stud normally engaged by a spring-loaded grounded pivoting lever 189. Registering with this lever is a magnetic core comprising two separate windings 190 wound in the same direction. On the right-hand slideway of carriage 167 or on the cross member 182 there is secured, as shown in FIGURE 11, a narrow insulated block carrying two rigid conducting blades 191 extending at right angles to the direction of travel of the carriage. To that one of blades 191 which is nearest to the front of the vehicle leads one of the windings 190 connected on the other hand to the stud of the left-hand coil 13. The other winding 190 connected to the stud of the right-hand coil 13 leads to the other blade 191. An arm constituting an extension of plate 168 carries on its end another flexible blade 192 parallel, in its inoperative position, to the blades 191. It engages these blades when the pin 149 driving the selector rods is moved to its position g, FIGURE 9. As a consequence of its contact with that one of blade 191 towards which it is deflected, blade 192 grounds the circuit of that one of windings 190 which is dependent on the selector pushbutton which is to control, if necessary, the next start of the carriage in the direction in which this contact took place. The attraction exerted by the same winding on lever 189 will break the energizing circuit of coil 171, whereby the cylinder 169 of the reversing switch will remain inoperative and the carriage will resume its movement in the preceding direction. The core of windings 190 carries a third winding 193 of same direction which is inserted in the circuit connecting through the coils 13 and 41 the insulated terminal of the generator to brush 181, whereby the core preserves a magnetism just sufficient to maintain the lever 189 depressed until the gear shift is completed.

According to a modified form of embodiment of this device which is illustrated in FIGURE 11, it is assumed that the connections between coils 190 and the selector pushbuttons are eliminated, and thus an insulated brush 194 connected to the insulated terminal of the generator is adapted to assume two opposite stable positions under the control of a hand-lever within easy reach of the driver for engagement with either of two contact studs each connected to one of said coils 190. When, in the position in which it is shown, the brush 194 is connected to the coil 190 nearest to the front of the vehicle; if the pin 149 has attained the position g from position a, the next actuation will bring this pin to its position f and henceforth its displacements will be limited to the movements between its positions g and f. Conversely, when the brush 194 is connected to the other coil 190 the pin 149 can only move from its position g to its forward drive positions. In this arrangement the holding coil 193 is maintained.

Irrespective of the arrangement contemplated, the circuit of each coil 190 comprises a telltale lamp 195 of which the position and color indicate whether the next actuation will engage the reverse gear or a forward drive gear. To prevent another rotation of cylinder 169 of the reversing switch in the case (to be considered presently), of a double depression of the selector pushbutton, the sliding core of coil 171 will engage, at the end of its stroke, a fixed core of an electromagnet (not shown) inserted in the same circuit as winding 13. This fixed core has a central hole through which extends the rod constituting the extension of the core of coil 171 urged by a flexible return spring blade. The fixed core may also be arranged with a view to retain this blade.

A reversing member of the rectilinear translation type may be used for controlling the approximate synchronism of the members to be engaged for producing the next gear ratio, by using means similar to those contemplated to this end on the selector rod driving devices described hereinabove.

In the first device controlled, as in the case illustrated in FIGURE 6, by the stoppage of the electromotor 77 during the synchronizing period, the edge of strip 174 which is engaged by the brush 180 is formed intermediate its ends with a break slightly wider than the brush, so that when this brush drops into this break, the circuit of motor 77 is deenergized. As no current flows at the same time through the electromagnet 71 controlling, in the auxiliary mechanism of FIGURE 3, the clutch between the engine and the drive of the vehicle, as well as the carburetor throttle, this engine is momentarily coupled with the drive and accelerated. The time necessary for resuming normal operating conditions to permit the approximate equalization of the peripheral speeds of the members to be engaged is adjusted through the following means: the strip 174 is connected to the brush 181, as long as the brush 180 engages said strip, through the winding of a coil 196 adapted through its sliding core to pull, by means of a thin insulating wire or a metal wire provided with an insulated end section, the pivoting brush 197 in order to move same away from its contact stud 198, a spring normally urging this pivoting brush against the stud 198. The strip 174 is connected through a flexible conductor to the contact stud 198. Brush 181 is connected through coil 71 to the pivot pin of brush 197, so that when this brush resiliently engages its contact stud 198 the strip 174 is connected to the brush 181. The sliding core of coil 196 carries a fluid-tight piston slidably engaging a fixed cylinder 199, the aforesaid wire attached to said brush 197 passing through the bottom of this cylinder. To prevent the air trapped in the cylinder 199 from being compressed when the coil 196 attracts the piston, this cylinder has slots formed around the coil. The brush 197 being thus moved away from its stud as long as current flows through the coil 196, its reengagement with this stud for a time sufficient, without excess, for synchronizing the peripheral speeds of the members to be engaged, will be slowed down within proper limits by adjusting the venting of air from this cylinder 199 in the same manner as in the case of the similar device illustrated in FIGURE 7. Another normally closed orifice providing an adjustable output is freed under the control of an electromagnet 200 of which the circuit is closed by the left-hand lever 8 in order to reduce the time necessary for the brush 197 to reengage its contact stud when the actuation reduces the transmission ratio. The engagement of brush 197 with its companion stud 198, by closing the energizing circuit of motor 77, starts the carriage 167 for the second half stroke, thus enabling the brush 180 to connect again the strip 174 to the brush 181. The connection between the strip 174 and the blade 184 may be obtained, as shown in the figure, through the contact stud 198, brush 197 and coil 71. In another arrangement for equalizing the peripheral speeds of the members to be engaged, the same principal as illustrated in FIGURE 4 may be adhered to by causing the movement of translation of carriage 167 to be transmitted from the motor 77 through an elastic coupling in both directions between this carriage and rack 161, the latter sliding in slideways rigid with the carriage. Only the carriage is held against motion at half-stroke during the synchronizing period. More particularly, it may be stopped in the same manner as the cam system of the arrangement illustrated in FIGURE 4 by using a locking lever similar to the lever 98 engaging its boss into a notch formed along the longitudinal edge of the carriage. The angular movement of the lever will break (as in the case of FIGURE 4) the energizing circuit controlling the clutch of the vehicle and the closing of the carburetor throttle. An insulated brush secured on said rack and engaging the carriage surface will thus ground a circuit holding the boss of said lever engaged in its notch until the brush driven by the rack reaches one of the insulating section lining that portion of the carriage which is normally engaged by said brush. Under these circumstances the engine of the vehicle is again disconnected from the drive and slowed down during the time period in which the carriage yields to the elastic pull exerted by the rack and moderated by a brake.

The engine clutch and throttle actuation for synchronizing the relative rotational speeds of the members to be engaged may be controlled, if desired, by the driver himself "monitored" by the data supplied by a telltale lamp as already explained hereinabove in connection with the devices illustrated in FIGURES 4 and 6 of the drawings. In this case, the coils 41 and 71 are dispensed with and a telltale lamp is substituted therefor. To prevent another rotation of cylinder 169 when the selector pushbutton is depressed for the second time, the circuit of coil 41 is held to feed another coil (not shown) holding the sliding core of coil 171 in its bottom position.

As plate 168 carries on its under face the pin 149 (not visible in the figure) this plate may receive, if necessary, its transversal movement of translation when the carriage has performed half of its stroke, from any suitable deflecting member such as those described hereinafter and controlled by one of said coils 179. More particularly, when the gear shift system comprises three selector rods the deviator member may be constituted and controlled in the same manner as either of the selector rods having three longitudinal stable positions according to the description of the device illustrated in FIGURE 7, which will then act transversely upon the pin 149.

All the devices actuating this pin through the combination of a reversing member with a deviator member lend themselves to the addition of extra transmission units to the series of original transmission units, due to the addition of another pin substituted for the pin 149 when the latter has been moved to its position *e* corresponding to the highest transmission ratio. In this position the auxiliary pin secured under the plate 168 on the same transverse line as pin 149 is in position *h*, FIGURE 9. Depressing the right-hand pushbutton will move the pin 149 towards the rear of the vehicle up to the level of the transverse channel by which the deviator member pushes same to the left outside the left-hand rod. Simultaneously, the auxiliary pin shifted backwards to the same extent is also deviated to the left to take in turn position *g* on the right-hand rod. This last-named movement of plate 168 causes a stepup gear or overdrive unit to be inserted in the transmission mechanism. In this position *g* of the auxiliary pin the brush 181 engages another insulating knob. Another depression of the right-hand pushbutton will bring this pin to position *a* in which the engaged gear becomes, due to the stepup gear unit, the first additional ratio.

With the change speed device illustrated in FIGURE 11, it is possible to insert intermediate ratios between the original gear ratios, due to the discontinuance intervention of a new stepup gear operated by means of the arrangement described with reference to the change speed device illustrated in FIGURE 1. The component elements of this system are designated in FIGURE 11 by the same reference numerals as in FIGURE 1.

If the rotational speeds of the members to be engaged are already synchronized, and if the driver takes care that the selector pushbutton remains depressed only until he or she is advised by a telltale lamp that the new transmission ratio is engaged, strip 174 is connected directly to brush 181.

If desired, the movement of translation of the carriage may be produced not by a rotary motor but by a pair of fixed opposite electromagnets attracting by turns a magnetic core mounted on a sliding rod attached to one end of the carriage. The winding of each coil is connected at one end to one of the brushes 173 slipping on the strip 174 at the other end to one of the brushes 175 connected by turns to the insulated terminal of the generator by the rotation of cylinder 169.

The stepup gear providing the intermediate ratios may comprise claw or dog-type clutches requiring the preliminary synchronization of the members to be engaged, instead of being operated by means of the friction clutches of some of its elements.

As shown in FIGURE 11, this mechanism may be similar to the set of gearings providing the original transmission ratios. In this case, it is mounted after these gearings. The shaft 201 constituting the extension of the engine crankshaft is shorter and carries on its end a pinion 202 provided with dogs on one lateral face. The shaft 203 through which the torque is transmitted to the drive wheels is mounted in axial alignment with shaft 201 and centered thereon by means of a cylindrical extension of one member which revolves in a central cavity of the other member. Mounted for free rotation on shaft 203 is another pinion 204 carrying dog teeth registering with those of pinion 202. Between these two pinions a sliding hub 205 is rotatably connected through splines to shaft 203 so as to be adapted to slide axially thereon, this hub being formed on both sides with dogs adapted to engage either of pinions 202 or 204. In its intermediate position the sliding hub 205 is disconnected from both pinions 202 and 204 and these are constantly rotatably interconnected by a parallel lay shaft carrying two fixed pinions constantly meshing the one with pinion 202 and the other with pinion 204. When the sliding hub 205 (in the position illustrated) engages with its dogs those of pinion 202, the two aligned shafts are in direct drive and transmit to the wheels, without any modification, the rotation resulting from each one of the gearing providing the original transmission ratios. In its opposite position, the sliding hub connects the pinion 204 to its shaft and the latter is driven from shaft 201 with a geared up ratio corresponding to that of the lay shaft gears. The shift from one driving connection to the other is controlled and actuated by means of the following arrangement: The sliding hub 205 is formed with a groove adapted to be moved in its axial direction by a sliding fork responsive to a sliding rod 206 similar to the aforesaid selector rods. This sliding rod is actuated somewhat like the right-hand rod 25 of FIGURE 7 by coils adapted to attract their magnetic core carried by the rod 206. These coils are constantly connected by one end of their winding to the bround and by their other end each to one of the contact studs engaged by the arm 207 fulcrumed on an insulated pivot pin connected to the insulated terminal of the generator when the conducting strip 22 is in its longitudinal position. The brush 207 in its endmost positions does not engage any stud. The position in which it is shown (to which it is urged by insulated spring means) corresponds to the direct drive of shafts 201 and 203. When the triangular cam closes the circuit of coil 20 the sliding core thereof pulls through an insulated wire the brush 207 in a direction opposite to that of the spring tractive effort. The brush 207 will engage firstly (and nearly until it attains its opposite end position) a continuous conducting strip connected to the coil 41 of the device of FIGURE 3 which neutralizes the accelerator of the vehicle and therefore the vehicle acceleration; the brush engages at the same time the stud through which coil 209 is energized to pull the rod 206 to the right; then it engages a first stud of coil 210 restoring the rod to its neutral position; subsequently, brush 207 is disconnected from coils 71 and 210 along one portion of its path, whereafter it resumes these contacts; eventually, the brush engages the stud connected to coil 211 pulling the rod 206 leftwards.

When the next rotation of the triangular cam 18 breaks the current flow through coil 20, brush 207 urged by its spring resumes in the opposite direction the engagement with the various contact studs. During its passage in each direction from one to the other of the two studs connected to coil 71, the latter is deenergized and the engine of the vehicle is reconnected to the drive and accelerated, while the sliding hub 205 is disconnected from both pinions 202 and 204.

To slow down the movements of brush 207 in either direction the core of coil 20 comprises an extension in the form of a thin rod of a piston sliding in fluid-tight conditions in a closed cylinder 208 constituting the continuation of said coil. This rod extends through a fluid-tight bearing or like passage formed in the bottom of the cylinder associated with the coil. Near each bottom, the cylinder has a port formed to permit the passage of air under the control of a suitable adjustment valve.

The two end coils 209 and 211 may be replaced with other driving devices notably in the form of a pair of bell-shaped casings clamping a common flexible diaphragm therebetween, as in the example of FIGURE 2, and operating in the same manner, to actuate the rod 206 secured to this diaphragm under the control of the pressure of vacuum of a fluid transmitted through a distributor. The opposed coils actuating this distributor are connected to the contacts of brush 207 as in the case of coils 209 and 211.

To improve the synchronization of sliding hub 205 with the pinion to be engaged through the frictional contact produced between the front faces of their dogs, their relative movements towards each other is controlled by means of the device acting directly on the selector rod which is illustrated in FIGURE 7 and designated by the same reference numerals in FIGURE 11. If shaft 201 drives shaft 203 through pawl-and-ratchet means the step-up gear may be engaged by a magnetic clutch coupling the pinion 204 to its shaft, without requiring the synchronization. The deviator member may consist of a stop member providing obliquely an elastic resistance to the longitudinal travel of pin 149, without requiring any energy outside that applied to the reversing member.

The deviator member illustrated in plan view from above in FIGURE 12 pertains to this type. It comprises two flat sliders 212 sliding transversely to the selector rods, carrying at right angles, underneath, partitions 213 inclined with respect to the direction of motion of said rods, and constituting each a light-weight assembly movable parallel to the cover of the gear casing, and urged by low-force, high flexibility springs 214 to a mean position with respect to their slideways. The pin 149 (not shown) has an upward extension through the movable member solid therewith, such as notably the plate 168 of the device illustrated in FIGURE 11, in the form of a pin on which a roller 215 engaging said partitions 213 is journalled. This roller is shown in the form of circles in its positions plumb to those likely to be occupied in succession by the pin 149 at the end of its movements for engaging a gear and at the level of the transverse channel permitting its passage from one selector rod to another. The pin 149 may be moved by means of any suitable reversing member adapted to hold it substantially perpendicular to the mean plane of the selector rods. Each partition 213 intersects one of the longitudinal paths of the roller 215. The slideways of slides 212 are an integral part of a plate 216 assumed to be transparent and sliding in turn in a transverse direction in slideways stationary with respect to the gear casing and connected to fixed points thereof through springs 217 constantly urging the plate to its intermediate position as shown in the figure. These springs have adequate strength and elasticity for shifting from one selector rod to an adjacent rod the pin driving transversely the reversing member carrying this pin. In the absence of a connection in the transverse direction other than its weak springs 214 a slider 212 retracts under the thrust transmitted through the roller 215 moving rapidly in the longitudinal direction and intercepted by this slider; it does not exert any appreciable side thrust against the roller when the pin moves past the transverse channel. On the contrary, if the slider 212 is caused to move bodily with the plate 216, the rollers, by moving aside the partition engaged thereby, tensions one of the springs 217 of which the force suddenly released when the pin drops into registration with the transverse channel urges it onto the adjacent selector rod. The slider 212 nearest to the front of the vehicle and shown in the drawing in the upper portion of plate 216, becomes operative during the backward movements of the control pin from its front position to prepare its transfer at midstroke to the left, but only when the gearing to be engaged increases the transmission ratio. In this case the right-hand selector pushbutton will prepare the connection of this slider with the plate 216 through the following means: A magnetic arm 218 pivoting on the right-hand side of plate 216 is normally urged away from the relevant slider 212 by a flexible blade. Mounted on this plate 216 is an electromagnet 219 fed through switch A and adapted, when energized, to attract the arm 218 and to rotate same so as to bring its free end in front of a lateral shoulder formed on said slider. When this slider is shifted to the right, it moves the plate 216 in the same direction by its shoulder bearing against the tip of arm 218; thus it tensions the spring 217 on the left-hand side of the plate, this spring expanding when the pin attains the transverse channel so as to engage it with the adjacent left-hand selector rod. The connection between the other slider and the plate 216 is similar to that described hereinabove; its operation is symmetrically opposite to the preceding one when the pin moves forward and switch B is closed. Partitions 213 do not exert any deflecting force on the roller 215 when the latter engages them during the second half of its movement. The opposite partitions may, as in FIGURE 12, either slightly overstep the middle of the height of plate 216 in order to promote the stoppage of pin 149 on the rod thus attained, or be discontinued before this position is attained. The diameter of roller 215 may be such as to increase the relative spacing of the selector rod, thus increasing the inclination of partitions 213 with respect to their direction. This inclination is reduced by multiplying the longitudinal travel of the roller with respect to its transverse travel. Notably, the pin 149 may be actuated through the medium of a rocking lever rigid with a transverse shaft sliding in the lower portion of the casing having in this case the selector rods also slidably mounted in its lower portion. The pin secured on this shaft and extending upwards engages transverse notches formed in the lower face of the selector rods. The roller 215 is formed with spherical edges and is adapted to pivot about a pin constituting the extension of said lever.

Another shifting member of the same type is illustrated in plan view from above in FIGURE 13. The pin 149 is secured at right angles to and centrally of the slider 220 movable transversely in the frame 21. Identical springs 222 having the force and flexibility required for deflecting the pin interconnect pegs rigid with the slider and other pegs secured on the side edges of frame 221. This frame 221 is adapted in turn to slide transversely in the carriage 223 which can only slide in longitudinal guide means secured on the gear casing. The carriage 223 is reciprocated in the longitudinal direction of the vehicle by the reversing member to which it is attached. This reversing member may consist of an extensible and retractable telescopic link or connecting rod of one of the types described in the foregoing, pivoted at one end on a fixed pin and at the other end on one of the transverse edges of carriage 223. This carriage 223 may be actuated like carriage 167 (FIGURE 11). In each one of the two opposite corners of frame 221 an arm 224 is adapted to pivot on a pin extending at right angles to the upper face of the frame; this arm 224 has a concave end portion adapted to engage in its cavity some of the pegs 225 secured at right angles on the cover of the gear casing and aligned in the positions meeting the following operating conditions: This end of arm 224 having a semi-cylindrical hollow portion adapted to engage said pegs projects under said arm down to a level flush with the top of the gear-casing cover, while the carriage 223 moves over the pegs without contacting same. Secured on the arm 224 is a flexible blade having one end engaged between two pegs of carriage 223 or frame 221, to keep the arm in the position shown in the figure in which, during the movement of translation of said carriage 223, it will not strike any of these pegs 225. This arm 224 has an extension, beyond its fulcrum, in the form of a relatively thick magnetic plate extending at right angles to said frame and adapted, during its rotation, to move very close to the core of a coil 226. This coil is secured at right angles on the frame and its energizing circuit is closed by the switch A or B which is on the same side as this coil. The magnetic attraction exerted by the coil on said plate will move the concave end of the arm solid therewith towards the frame to the position in which it engages the nearest peg immediately as the longitudinal translation of the carriage begins. When the depressed selector pushbutton is the right-hand one, if the carriage moves backwards the right-hand arm 224 engaging its concave end on the registering peg will bear there against somewhat in the fashion of a crutch and move the frame 221 to the left while tensioning the left-hand spring 222 exerting on the slider 220 an increasing pull until the pin 149 engaging the transverse channel is shifted to the selector rod located on the left-hand side of the one previously driven thereby. The pin is shifted in a similar manner to the right when the carriage moves forwards and the circuit of the left-hand coil is closed by switch B. Preferably, each switch A or B is connected to the terminal of the carriage driving motor which is connected to the insulated terminal of the generator when the carriage travels in the direction for which the pin 149 has to be shifted by closing this switch.

Another exemplary form of embodiment of a shifting or deviator member actuated by the force applied to the reversing member is illustrated in FIGURE 14. A flat carriage 227 is adapted to slide in the axial direction of the vehicle in guide means fixed with respect to the gear casing. This carriage may be driven forwards and backwards by turns through any adequate reversing member, notably a rotary electromotor having its direction of rotation reversed upon each new actuation. In the example shown in FIGURE 14 two opposite electromagnet coils 228 attract byturns their sliding magnetic core resiliently attached to the carriage 227. The latter could be driven as well from opposed power means transmitting a fluid pressure or vacuum, such as a pair of bell-shaped cups or shells enclosing and clamping therebetween a flexible diaphragm, or cylinders in which pistons are slidably mounted. The winding of said driving coils, or those controlling the power means, is connected at one end to the ground and at the other end to one of the terminals of the reversing switch. In a slot (not visible in the drawing) formed on the left-hand side of carriage 227 a slider 229 projecting from the carriage surface is slidably fitted so as to move parallel to the carriage guide means. On a pivot pin perpendicular to the flat carriage 227, and close to the edge thereof which is opposite to said slider, a relatively short arm 230 is fulcrumed and has secured thereon, transversely thereto and near its pivot pin, the end portion of a flexible blade 231 having its free end engaged between two perpendicular pegs carried by a disc fulcrumed on a pivot pin perpendicular to the slider 229. A plate 232 is adapted to slide in transverse slideways provided on the carriage under the impulse of a link pivoted at one end on said plate 232 and at the other end on the free end of arm 230. Slidably mounted on a round-sectioned shaft 233 extending transversely to the carriage and secured on the ends of this carriage by means of flat supports is a sleeve 234 carrying at right angles thereto, backwards or forwards, an arm 235 having its other end pivoted either on the disc 150 carrying the pin 149 sliding on the cover of the gear casing according to the disposal illustrated in FIGURE 10, or on a lever pivoted by ball-and-socket means on this cover and carrying on its end the pin 149 as in conventional manual control arrangements for transmission mechanisms. The arm 235 comprises if necessary a sliding section elastic in both directions. The sleeve 234 has a circular groove formed therein which is engaged by a relatively thick blade secured at right angles on the plate 232 for coupling the transverse sliding movements of said sleeve 234 and plate 232 while enabling the arm 235 to pivot on its shaft 233.

The slider 229 is normally kept solid with carriage 227 by means of a lock bolt 236 having a rounded tip which is adapted to slide transversely in bearings secured on said carriage and is urged by spring means for engagement in recesses formed in said slider and which are equal in number to said selector rods. To each position assumed by the slider and wherein the lock bolt retains this slider on the carriage there corresponds an inclination of said short arm 230 which positions the pin 149 on one of the selector rods, provided that no resistance bends the flexible blade 231. The slider may be held against motion with respect to the gear casing by a mechanism similar to that holding the selector rods 25 in the device shown in FIGURE 2, the component elements of this mechanism being designated by the same reference numerals in this figure. The lever 31 fulcrumed on the pivot pin carried by the left-hand carriage guide means has secured on its outer end a magnetic metal blade 32 which may be urged by spring means against the core of the fixed electromagnet 35; furthermore, it comprises adjacent to said pivot pin a boss 33 having a rounded or triangular contour which is engageable in notches formed in the slider edge opposite said bolt, these notches having the same relative spacing as the cavities receiving this bolt. The electromagnet 35 is connected on the one hand to the ground and on the other hand, if necessary, to the insulated terminal of the generator through an insulated brush 237 secured at right angles on the carriage and slipping in succession, during the carriage translation, on two insulated conducting sections 238 secured on the guide means of said carriage 227 and covering each only one-half of the path of brush 237. The section 238 engaged by the brush 237 during the first half of its backward travel is connected through switch A (actuated by the right-hand selector pushbutton) either directly to the insulated terminal of the generator or with the terminal of the carriage driving motor connected at that time to the same terminal of the generator. The other section 238 is connected in a similar way to the insulated terminal of the generator through the left-hand pushbutton. These connections between switches A and B, on the one hand, and sections 238, on the other hand, imply that pin 149 follows directly the movement of the link as in the mounting shown in FIGURE 10.

The carriage being in one of its end positions, if energizing current is caused to flow through the electromagnet 35 the boss 33 will be kept in the notch previously occupied by it with a force sufficient to prevent the slider from being driven by the lock bolt 236, the latter being removed from its cavity when the carriage translation begins. The pin 149 being fastened to the same selector rod during the first half of its path, the portion of flexible blade 231 which is fitted against the base of arm 230 follows the carriage movement without pivoting, while its end retained by the slider pegs bends until the pin, having attained the transverse channel, is thrown onto an adjacent selector rod by the expansion of blade 231 resuming its rectilinear shape. Immediately thereafter the brush 237 is moved away from section 238 and connected to the insulated terminal of the generator, thus deenergizing the coil 35 which releases the boss holding the slider 229 against motion. Simultaneously, the lock bolt 236 registering with a cavity of said slider engages same and causes it to become again solid with the carriage. To facilitate its release, the lock bolt has an extension in the form of a core sliding in a coil 239 secured on the carriage, the winding of this coil depending on the circuit connecting the coil 35 to brush 237. This coil 239 may also be connected directly to the ground and on the other hand to a pair of insulated contact studs each adapted to be engaged by the upper face of the arm of one of switches A or B which is resiliently urged upwards. The magnetic lock bolt 236 sliding in coil 239 is thus retained in its cavity when the shifting of pin 149 is not required. A flexible blade secured endwise on the carriage 227 engages with its bent end the notches formed in the cross member 240 solid with plate 232 so as to keep the pin 149 on the selector rod engaged by virtue of the elastic action of blade 231. If desired, this blade 231 may be replaced with a rigid rod connected at one end to the slider through opposite springs or engaged between the pivoting pegs thereof; in this case the arm 235 is flexible in the transverse direction. The current reversing switch associated with the carriage motor may be of the type illustrated in FIGURE 11 if the motor is of the two-way or reversible type. In the example illustrated in FIGURE 14 this reversing switch is of the type shown in FIGURE 1 with the triangular cam 18 connected to the insulated terminal of the generator engaging alternatively each one of the blades 19 connected in this case to the coil of one of the electromagnets 228. Cam 18 and coil 16 actuating same are jointly connected to the insulated terminal of the generator through a switch 241 actuated upon each new operation.

The pin 149 may be held in its position g, FIGURE 9, by using the same procedure as in the arrangement illustrated in FIGURE 11. In the arrangement described hereafter the two coils 228 are both connected on the one hand to a flexible magnetic blade 242 engaging a grounded contact stud and adapted to be moved away therefrom by a coil 243, and on the other hand through this last-named coil to a brush 244 secured across the right-hand guide means of the carriage, the brush end which slips on the surface of plate 232 engaging, when the pin 149 attains its position g, an insulating knob 245 secured on said plate. When the brush 244 leaves this insulating knob to engage the conducting portion of the plate, coil 243 attracts the blade 242 away from its stud. By virtue of these connections, the carriage 227 stopped when pin 149 reaches position g moves away therefrom due to the direct momentary connection provided between coils 228 with the ground through the blade 242. The reversing switch changing by turns the direction of translation of the carriage upon each fresh actuation should not operate when the pin retained in position g has to be moved away from this position in the same direction as that in which it came to it. The device illustrated in FIGURE 11 is adequate for this purpose. To the same end, a noninsulated brush 246 fulcrumed on a fixed pivot pin beyond which a fork extension is provided which has its prongs bent at right angles to the plane of the figure engages, in its position transverse to the carriage, a contact stud connected to the circuit of electromagnet 16 actuating the reversing switch. An arm 247 secured across the plate 232 engages the gap between the prongs of said fork when the pin 149 drives the right-hand selector rod. The relative spacing of the fork prongs is such that the arm 247, by engaging one of them, restores the brush 246 on its stud when the carriage has completed its stroke. Conversely, the brush 246 may have an extension in the form of an arm engaging the gap between two pegs normally secured on plate 232, near the right-hand edge thereof. Under the brush 246 a magnetic rod 248 is adapted to slide parallel to the direction of motion of the carriage; this magnetic rod 248 of adequate length slides in two opposite coils 249 and carries two perpendicular pegs extending on either side of the brush 246. These two coils 249 are connected on the one hand to the ground and on the other hand each to an insulated contact stud against which a lever 250 resiliently urged upwards is adapted to bear, this lever 250 being within easy reach of the driver's hand and connected to the insulated terminal of the generator. To enable the pin 149 to clear position g of FIGURE 9 towards position f, the lever 250 is briefly depressed to energize the coil 249 remotest from the front of the vehicle in order to attract the rod 248 and cause the brush 246 to tilt backwards and thus move away from its stud connected to coil 16. The other lever 250 energizing the other coil 249 actuates the brush 246 in the opposite direction. The rod has a rod extension of nonmagnetic material connected to the ground and carrying a transverse brush 251. In each one of the end positions of rod 248 one arm of brush 251 engages a stud connected to a telltale lamp mounted at the side of lever 250 having produced this contact. These lamps are connected on the other hand to an insulated terminal of the generator. The gap between the pegs carried by rod 248 is such that brush 251 remains in contact with the stud previously engaged thereby while the brush 246 has resumed its contact with its stud. The lamp 252 which remains lighted indicates whether the next actuation will cause the reverse or one of the forward gear ratios to be engaged. A flexible blade engaging one of the notches of the rod carrying the brush 251 will keep the latter in each one of its end positions.

The rotation of brush 246 may also be controlled by means of a hand lever connected to said brush with a certain play or free motion, so that after the brush has resumed its engagement with its contact stud, it is maintained, by frictional engagement with its support, in an inclined position having the same meaning as the lamps 252.

The carriage 227 may also drive by frictional engagement a member between two stop members where as its contact causes one of said telltale lamps 252 to be switched on to indicate the direction in which the carriage was stopped at midstroke, and therefore whether it is necessary or not to move the brush 246. The effect of the insulating knob 245 is discontinued as follows, when the pin 149 clears position g when moving from position a to position b: The rod extension of the core sliding in coil 239 moves a non-insulated flexible blade carrying a magnetic blade. When energizing current is supplied to this coil the blade is moved for engagement with an insulated contact stud connected to brush 244. It is retained in this position by the attraction produced on said blade by a coil 253 receiving energizing current during a gear shift. The blade 242 is similarly retained away from its stud by the attraction exerted on the plate provided at its outer end by a coil fed through switch 241. If the insulating knob 245 is no more required, the arm 23 is pivoted directly on the aforesaid sleeve 234. The movement of the dogs to be engaged towards each other is controlled by means of a concave cam 142 mounted on one edge of the carriage and engaged by a follower roller carried by the piston sliding in cylinder 107; this follower engages the bottom of said concave cam contour when all the selector rods are in their neutral position. If the selector rods act through the levers 8 and blades 21 of FIGURE 1, new gear ratios may be interposed between the original ratios according to the diagram of this figure. Another example of a deviator or shifting member driven from the reversing member is illustrated in FIGURE 15. In this arrangement, on a shaft extending at right angles to the axial plane of the vehicle, a disc 254 of magnetic metal is adapted to revolve under the control of an adequate prime mover, this disc 254 carrying an arm 255 extending normally at right angles to the longitudinal axis of the vehicle; this arm is fulcrumed near one end on a longitudinal link directed towards the front of the vehicle and carries at one end a pin 149. Upon each actuation of the change speed mechanism a reversing switch shown diagrammatically in the form of a brush 256 pivoted between two contact studs is adapted to energize the prime mover in order to change by turns the direction of rotation of said disc 254. Another disc of magnetic metal 257 is mounted for free rotation on the same shaft and in sliding engagement with the first disc 254. Formed in the upper face of the disc 254 is a circular groove containing a winding consisting of insulated wire having one end grounded and the other connected to an insulated brush 258 carried by the end of arm 255. On the same shaft and contacting said other disc 257 is mounted for free rotation an arm 259 having its end connected through a link to a suitable point of the aforesaid link carrying the pin 149. This arm is connected through similar elastic means to a pair of opposite pegs carried by the disc 257. The brush 258 on the end of arm 255 is adapted slidably to engage in succession a pair of fixed elongated studs 260 each extending along one-half of its stroke. The stud 260 engaged by the brush 258 when the latter is in its foremost position with respect to the vehicle is fed with current through switch A. The other brush may be fed similarly through switch B. When the pin moves from its end position forwards, and if switch A is closed, the current flows through the coil housed in disc 254 of which the magnetic attraction causes both discs 254 and 257 to revolve as one. The thus entrained disc 257 exerts on the arm 259, through one of its elastic connections, an increasing tension urging same for rotation in the same direction. The pin 149 resiliently urged to the left is shifted in this direction to the adjacent selector rod when it registers with its notch. Brush 258 is thus moved immediately away from stud 260 through which it was energized, and the magnetic coupling between the two discs 254 and 257 is discontinued. If on the other hand the left-hand selector pushbutton is depressed, the pin is not shifted. In order to impart a suitable elasticity in either direction to the longitudinal link carrying the pin 149, the arm 255 may be mounted for free rotation on the shaft and driven in this case through the disc 254 by means of elastic connections as in the case of arm 259. The disc 254 may be connected elastically to the central shaft forming an integral part of an electromotor fed through a reversing switch adapted to reverse its direction of rotation upon each fresh actuation. In the example illustrated the arm 255 is attracted by turns by one and the other of the opposite coils 261.

FIGURE 16 illustrates by way of example a combination of reversing members with a deviator or shifting member, wherein these are actuated through separate means. These members consist of elastically extensible and retractable connecting rods, according to one of the constructions already contemplated for the reversing member, these connecting rods being fulcrumed together in the vicinity of pin 149 driven directly, preferably through the reversing rod. The latter consisting of a non magnetic tubular member 262 pivoted endwise on a fixed fulcrum (if necessary through resilient means) comprises a set of opposite prime movers such as juxtaposed coils 263 attracting to the level of their center a magnetic core slidably mounted on a non-magnetic rod carrying the pin 149 on its outer end. The coils 263 are connected on the one hand to the ground and on the other hand each to one of the contact studs of a reversing switch of adequate type, connected by turns to the insulated terminal of the generator, notably through the pivoted contact arm 164. The shifting member consists of a nonmagnetic tubular member 265 fulcrumed at one end on a fixed support and slidably engaged by an internal magnetic core solid with a nonmagnetic rod pivoted on the reversing link through two-way resilient means. Juxtaposed on said tubular member 265 are coils 266 equal in number to said selector rods and having a relative spacing equal or proportional to that of said selector rods. These coils have one end grounded and the other end connected each to one of the contact studs of a distributor similar to that shown in FIGURE 1, of which the rotary arm 1 is connected to the insulated terminal of the generator. The contact stud of the reversing switch shown diagrammatically in the form of a brush 264 energizing that one of said coils 263 which attracts the pin 149 towards the rear of the vehicle is connected to the pivot pin of the movable arm of switch A. The contact stud of this switch A is connected to that one of said driving coils 6 of the distributor which moves the rotary arm 1 to a position of engagement of the stud corresponding to coil 266 of the shifting link which is positioned on the left-hand side with respect to that containing the magnetic core at the beginning of the actuation. The other switch B is adapted to connect the other stud of the reversing switch to the other coil 6. The group of coils may be replaced on each resilient link with a motor rotating in one or the other direction for screwing in or out the shaft thereof on the link rod in order to reduce or increase its total length. Each terminal of the motor driving the shifting link is connected to the fulcrum or pivot pin of the arm of one of said switches A or B. Two studs each resiliently engaged by one of said arms raised in their inoperative position are connected jointly to the insulated stud of an arm adapted to pivot between two grounded contacts. This arm extends between two insulated pegs of the reversing link which are so disposed as to bring said arm to a position of engagement with one of its studs when the pin 149 has completed its stroke, and to move said arm away therefrom then said pin attains or approaches its half-stroke position, thus denergizing the prime mover of the deviator or shifting system after this prime mover has accumulated sufficient enengey. During its downward movement the arm of switch A engages a contact stud connected to the terminal of the reversing motor which is connected through the reversing switch to the insulated terminal of the generator when the pin 149 is moving to the rear of the vehicle. Then the aforesaid prime mover will shift the pin 149 leftwards. The stud of switch B is connected to the other terminal of the reversing motor.

In the hitherto described arrangements the effort of the deviator member is discontinued when it has accumulated in the elastic system through which it urges said pin 149 laterally a force just sufficient to cause this pin to be shifted from the selector rod engaged thereby to the next selector rod. Assuming that these selector rods are equally spaced from one another the force applied laterally to said control pin may be the same upon each actuation.

The same effect may be obtained by using a deviator or shifting member actuated by means of an elastic fluid without discontinuing the effort produced by this fluid, but only retarding its action, so that when the pin 149 attains the level of the adjacent selector rod the elastic energy accumulated in the deviator member cannot in any case exceed that necessary positioning said pin on said rod. However, this force should be sufficient to engage the pin through the passage of said stationary partition, such as shown at 148 in FIGURE 9, between two adjacent selector rods. If this stored energy were exhausted before the pin has completed its transverse stroke, the transfer movement of this pin will proceed with a substantially uniform motion due to the continuous supply of fluid controlled power with a suitably moderated output to the deviator or shifting member. During this pin translation the reversing member accumulates an elastic energy which drives the pin longitudinally when it has cleared the stationary partition, without allowing same to overstep the selector rod which it just left behind.

The action of the reversing member may also be slowed down in order to impart to the shifting elastic effort an accumulation or storage period of a length sufficient to permit the preliminary adjustment of its intensity.

The pin movements may be slowed down, within adequate limits, by adjusting the fluid output in the tubular members connecting the source of pressure or vacuum to the receivers actuating said pin longitudinally and transversely. The output of these tubes is adjusted by means of a valve consisting notably of a screw tap or cock adapted to reduce gradually the cross-sectional passage area of the fluid duct. As the reversing and deviator members comprise a feed tube for each direction of application of their effort, the output of the two tubes of each one of these members may be adjusted separately. These two tubes may also be connected together to the source of pressure or vacuum through a common tube or pipe having interposed therein the single valve cock retarding the operative effort, in either direction, of the load member.

When the elastic force actuating the reversing and shifting members is derived from the vacuum created in the induction manifold of the vehicle engine, its magnitude varies with the vehicle speed when the carburetor throttle is closed. This magnitude may be practically stabilized by limiting same with the assistance of a valve closed by a calibrated spring which is adapted to vent to the atmosphere the duct transmitting the vacuum to the pin driving member when this vacuum exceeds the predetermined value. The magnitude of the efforts exerted by the deviator and reversing members may assume different values, notably by increasing the piston area of these members. When these members are actuated by electromagnets, their action may be retarded by means of a brake, notably of the type illustrated at 140 in FIGURE 7.

Certain devices, which may be used either separately or in combination with the above-described means for safety, are adapted, by using some locking system, to hold the pin on the selector pin to which it was previously moved. This device makes it possible to shift the pin 149 through any means urging same laterally with a resilient force at least sufficient to shift said pin to an adjacent selector rod, irrespective of its initial position.

More particularly, pin 149 may be retained on the selector pin just engaged by it, by using a relatively thin stationary partition disposed in the path of its transverse movement. Each selector rod other than the lateral rods is then widened so that the pin may assume in its transverse notch two symmetrical positions with respect to said thin partition disposed vertically along the rod axis. As shown in FIGURE 17, this partition may be of the type designated by the reference numeral 267, secured on the lower wall of the casing in which the selector rods are slidably mounted, or on a cross member. The rod 25 has an axial slot formed therein which is engaged without any frictional contact by the partition of which the dimensions are just sufficient to prevent the control pin 149 from clearing the selector rod 25 stationary in its neutral position. The pin 149 may move round the partition immediately after leaving same. The partition may also, as in the case illustrated at 268, be secured under a cross member 269 overlying the selector rods. It acts in this case as a stop member to an upper extension of pin 149. To reduce the width of the selector rod the end of pin 149 striking said thin partition is reduced to the thickness of a thin blade. The selector rod may even maintain its normal thickness if the partition 268 is solid with a support sliding along the cross member 269 between two fixed stops limiting its movements to the positions in which it holds the pin 149 in alignment with rod 25. Spring means urge the partition 268 back to the mean position. The partition may be replaced on said sliding support by a pair of identical partitions disposed in the inoperative position on either side of the intermediate selector rod. The front and rear edges of partition 267 or 268 and the short blade constituting the extension of pin 149 at one or the other end are bevelled in the same direction as the partitions 213 of FIGURE 12, in order to facilitate the passage of said pin on the partition side from which it will be capable of moving away from the selector rod.

FIGURE 17 shows from the rear a gear shift system equipped with this device, which is actuated by the vacuum of the induction manifold of the engine when the carburetor throttle is closed. Each reversing and deviator member actuates the pin 149 by means of a link. In the example illustrated the reversing member consists of a pair of parallel cylinders 270 open in the same direction and having their pistons fulcrumed on equal and opposite arms of a shaft 271 revolving in fixed bearings and rigid with a third arm 271 pivoted on a link 272 carrying at its end the control pin 149. The tip of this pin 149 is held level with the notches of the selector rods, notably by means of the sliding mounting of the pin which is shown in FIGURE 10. The two driving cylinders may also be disposed in opposition on a common axis. The common rod of their pistons is pivoted, in this case, intermediate its ends on the bent free end of the link carrying the control pin 149 at its other end. Bellows may be substituted for the cylinders 270. The deviator member illustrated shows the example of a driving device actuating the cross member by means of a connection generally of sinuous and flexible character permitting of selecting the location of the prime mover. The latter consists of a closed cylinder 273 in which a fluid tight piston is slidably mounted and has its rod extending through a fluid-tight passage in one of the cylinder bottom walls. The vacuum is applied to one or the other face of this piston through pipes opening near the bottoms of the cylinder. The piston rod is thin to reduce the differential pressures exerted on the two piston faces. This arrangement may be substituted for the one comprising assembled bell-shaped cups 29 enclosing a diaphragm as shown in FIGURES 2 and 7. The link consists of a rigid tubular member 274 of rectilinear or curvilinear configuration, fulcrumed on a fixed pivot ball 275 and slidably engaged by a rod of same configuration pivoted at its free end on said pin 149 or on the reversing link. The tubular member 274 has a partially flexible tubular extension the flexible portion being located notably in the vicinity of the ball pivot, this extension being practically incompressible in its longitudinal direction leading to the bottom of the driving cylinder which is engaged by a rigid rectilinear section of said extension. The rod engaging the tubular member 274 comprises in the latter an extension in the form of a cable of substantially constant length, of known type, having its other end attached to the thin rod of the driving piston. Each duct or pipe leading into these driving cylinders comprises valve means such that when the corresponding cylinder is isolated from the source of vacuum it is vented to the atmosphere. In the example illustrated this system, notably of the slide valve type, consists of a fixed cylinder 276 connected through two opposed pipes to the source of vacuum and to the prime mover, respectively. Slidably mounted in this cylinder is a relatively long fluid-tight piston 277 formed with a circular groove and secured along its axis on a rod carrying across one end a magnetic-metal blade preferably of rectangular configuration normally engaged by a coil 278 adapted to slide in the direction of piston 277. When this coil is deenergize as shown in the figure, its core urges the magnetic blade against the edge of cylinder 276, and the pipe connected to the source of vacuum is closed by the piston while the pipe connected to the driving cylinder is vented to the atmosphere due to a longitudinal groove formed in the piston and leading from said plate to the port connecting this pipe to the inner chamber of cylinder 276. When energizing current flows through coil 278, its core adheres strongly against the magnetic blade. If then the coil is moved away from the cylinder 276 by sliding to the position in which the groove of piston 277 registers with the opposite ports of said cylinder, the vacuum is transmitted to that face of the driving piston which is connected to the actuated slide valve.

Four coils such as 278 each mounted in front of a magnetic blade of one of the pistons 277, are secured by their cores to a cross member 279 of magnetic metal which carries across its end rods such as 280 adapted to slide in fixed guide means whereby the cross member 279 may move while remaining parallel to itself in the direction of pistons 277. The cross member 279 moves these pistons back to their inoperative positions under the influence of return springs. It is furthermore anchored intermediate its ends to the piston of the stationary cylinder 281 connected, like the pipes leading to cylinders 276, to the induction manifold of the engine through the main duct 282 comprising a valve assured to be of the plug type. This valve is actuated by means of a lever 283 rigid with its rotary valve member or plug and urged to its inoperative position (in which it is shown) by a relatively weak spring (not shown). Then the valve isolates the duct 282 from the induction manifold of the engine and vents this duct to the atmosphere. Under these conditions, duct 282 is connected to the induction manifold of the engine in the opposite position of lever 283 to which it is moved by the pull exerted thereon, in the direction of the arrow, by the clutch control, through a spring 284 of adequate force and through suitable connecting means. This lever 283 is doubled by an insulated brush 285 connected to the insulated terminal of the generator and adapted to engage, immediately as the clutch disconnecting movement begins, a circular contact stud to the pivot pin of the pivoted arm 286 leading by turns to the coils 278 of the reversing member. The circuit of brush 285 comprises two series-connected, normally closed switches. One of these switches, designated by the reference numeral 287, comprises an arm rigid with the lever controlling the valve mounted in the main duct 282, so that the rotation of this arm which moves same away from its contact stud will close at the same time the main duct 282. The other switch is kept closed by the elastic pressure exerted by a flexible blade 288 on a stud from which it may be moved by actuating a push member within easy reach of the driver's hand or left foot to permit of disconnecting the engine from the drive without changing the transmission ratio. The circuit of coils 278, which is grounded on the one side, is closed on the other side by means of the following circuit means: The two right-hand cylinders 276 feed the cylinders 270 of the reversing link; the left-hand cylinders 276 are connected to the two bottoms or end chambers of cylinder 273 controlling the deviator link. Two studs connected each to the coil 278 of one of said pair of right-hand cylinders 276 are connected by turns upon each actuation to the insulated terminal of the generator through a switch shown in the form of the pivoted arm 286. The stud corresponding to the cylinder 270 driving the pin 149 backwards with respect to the vehicle may be connected through said switch A to the coil 278 acting upon that face of the piston of cylinder 273 which urges the pin to the left, as seen in the figure. The other stud of arm 286 is adapted to close through switch B the circuit of coil 278 which controls the force urging the pin 149 to the right. A perforated blade may be substituted for the piston 277, this blade sliding between two plates into which the pipes to be connected are caused to open. A simplified vacuum distributor may comprise a fluid-tight case constantly connected to the main duct 282. The pipe controlling the members driving the control pin 149 are connected to this case through a fitting or union incorporating a valve opening towards the pipe, this valve being normally closed by a spring. The valve shank has an extension in the form of a magnetic sliding core of a coil secured in said case and connected thereto as well as to an external insulated terminal. When this coil is energized, it attracts its firstly moderately engaged core, thus moving the valve member. The connections are the same as those of coils 278. Conversely, the valve is adapted to be opened while compressing a spring towards the vacuumized case. It is kept closed by a lock member released by the coil attraction when energizing current flows therethrough. More particularly, the pipe associated to each driving member leads to the bottom of a cylinder disposed internally and at the bottom of the case. This cylinder has a piston slidably mounted therein with a spring overlying this piston and urging same downwards, the rod of this piston extending freely through a disc secured on the edge of said cylinder. Stepped orifices are formed through the cylinder above said piston. The outer end of this piston rod is flush to the outer face of the disc which is slidably engaged by a sliding or pivoting blade carrying on its edge a magnetic bar registering with the fixed core of a coil. In the inoperative position, the spring-loaded blade closes the rod passage. When it is attracted by the coil, an aperture formed in this blade registers with the rod, thus enabling the piston to be moved by the vacuum in the case for clearing the lower orifices of the cylinder and connecting the case to the driving member. If necessary, normally open orifices are formed in the tube near the case. These orifices are closed, immediately as the piston is moved, by a ring slidably engaging the tube and secured to an extension of the piston rod. To prevent the distributor tubes from being opened in the inoperative position, these tubes are connected to a reservoir, preferably of the flexible-walled type. The tubes leading to the reversing member and those controlling the deviator member may be responsive to different cases having different vacuum values and feed systems. The reference numeral 289 designates valve means adapted to retard the output of the fluid controlling the driving members, and 290 is a vacuum limiting valve. In a modifier form of embodiment of the device shown in FIGURE 17, the coils 278 are fixed. Their sliding cores are attached to the piston of the corresponding cylinder 276 and urged back by a return spring or a rotary arm of a two-way valve substituted for the cylinder. The distributor of FIGURE 1 may be used for feeding by turns the reversing coils such as the right-hand coil 278, which are connected in succession to the contact studs engaged by the rotary arm. Two insulated arms pivoting together about the axis of disc 3 driving these arms by frictional engagement between two end stops provide at the end of their stroke, the one the connection with the deviator member through switch A according to FIGURE 17, and the other the connection through switch B. Similarly, a fluid distributor rotating bodily with disc 3 may feed the cylinders 270 by turns. Two valves having their rotary members driven in unison by frictional engagement with the disc are adapted to coordinate, according to the direction of rotation, the connections between the driving members. The control pin driving members, notably bellows contracted by the vacuum, may be mounted on either side of this pin and adapted to pull same in opposite directions by means of wires. The deviator members may be disposed parallel to the reversing members. Their cable will in this case lead to the pin by passing over a pulley. The deviator link may be parallel to the reversing link by providing a suitable transmission lever. According to another possible form of embodiment of the device shown in FIGURE 17, magnetic bars register each with one of the aforesaid coils 278 and are adapted to pull the pin 149 through a cable passing over a pulley. Similarly, the shaft 152 of FIGURE 10 has secured thereon two discs similar to the discs 146 of FIGURE 8 and each adapted, when current flows through the coil winding, to become drivingly connected with a pulley of magnetic metal revolving freely on shaft 152 and driving in turn a wire pulling laterally the connecting-rod 151. When the pin 149 is carried by the end of a hand-control lever of conventional type, swivel-mounted on the cover of the gear casing, the driving members apply their effort to a suitable point of this lever. If the spring normally restoring this lever to its central position is maintained, the magnetic blade is mounted on this lever or on the reversing link in order to cause said magnetic blade to slide on a fixed permanent magnet when the pin 149 passes through its position g, FIGURE 9, so as to be held by magnetic attraction therein if the lever is released at that time. To the same end, a spring may pull the lever transversely. When the pin reaches position g the lever is stopped by a short transverse rod oscillating with a reduced angular amplitude about a vertical axis. Under hand control it passes around this oscillating rod when it is desired to reverse the driving direction of the vehicle. Since pin 149 is secured on the end of a lever through swivel means on the cover of the gear case, partition 267 which is to prevent this lever from clearing the intermediate selector rod in its neutral position is transferred to this cover. The short blade following the movements of pin 149, which is to engage the partition 267, is secured under a longitudinally movable member secured or pivoted on the lever carrying said control pin 149, such as the reversing lever or link, or the arm 247 of FIGURE 14. Since the positions of the lever carrying the pin 149 on its end are symmetrically the reverse of those of said pin 149 with respect to the swivel, the coordination between the two reversing and deviator members actuating this lever is also reversed with respect to their coordination in their direct action upon said pin. To revert to the manual gear shift control lever, the detent positioning means which are usually provided in the automatic device may be dispensed with.

The systems such as the one shown in FIGURE 7, which comprise selector rods, may, if these rods are formed with a transverse notch, be provided with an emergency hand control lever having its control pin 149 normally kept in a recess on the right-hand side of the notch formed in the right-hand selector rod 25.

In the above-described devices, if the selector pushbutton remains depressed throughout the time period necessary for performing a gear shift, the pivoted arms attracted by coils 9 or 83 are actuated directly by these pushbuttons through a mechanical connection.

A pair of upwardly outflared stop members disposed on either side of the group of selector pushbuttons may be provided for guiding the left foot of the driver towards one or the other pushbutton while preventing the foot from slipping outwardly.

As contrasted with the arrangement first contemplated herein, the two control pushbuttons may be disposed sufficiently close to each other to permit their simultaneous engagement by the driver's left foot, a locking device of known type permitting of depressing only one pushbutton at a time. If the pushbuttons are depressed simultaneously, only the clutch disengagement takes place, whether these pushbuttons are mounted on the clutch pedal, or whether a clutch control pushbutton is mounted therebetween but at a higher level.

The selector pushbuttons may be replaced with keys within easy reach of the driver, notably keys disposed along a circular arc concentric with the steering wheel and resiliently pivoted on the right-hand and left-hand sides of the steering column. The function of these keys may be that of preselector members. Each key will thus close the circuits controlling the gear shift in the desired and selected direction when the clutch control will permit this change by suppressing the frictional engagement between the engaged members. The movable arm of switch A or B actuated by one of these keys will close the energizing circuit of a coil of which the magnetic attraction will keep the arm lowered until the clutch control opens this circuit, only when returning to its inoperative position, by means similar to those associated with coil 35 in the arrangement illustrated in FIGURE 2.

The shock of the sliding members upon completion of their stroke may be absorbed by interposing a hollow elastic pad in which an orifice is formed. The stress applied to these members may also be discontinued before their stroke is actually completed.

The application of the driving force to the control pin 149 through a sinuous transmission, of which a typical example is shown in FIGURE 17, is applicable to the selector rods in the devices illustrated in FIGURES 4, 6 and 7.

The improvements characterizing some of the above-described devices are applicable to all gear change devices using two control pushbuttons.

The so-called "reversing" member may also be designated by the term "alternor" (which so far has not been created) or "alternator," the latter having already a different meaning.

The means already described for holding the control pin 149 in its position g of FIGURE 9 and for releasing this pin therefrom or still preventing this pin from stopping in this position, may be complemented, in all cases by the locking system described hereinafter with reference to FIGURE 18 and adapted to limit the pin movements in either direction, when the pin is in said position g. The selector rod 25 on which the pin is in this position g carries a perpendicular peg 291 of which the stroke is limited by the lock means. The latter consists of a round-sectioned shaft 292 adapted to revolve about its axis between two stable positions and carrying in turn two perpendicular plates 293 having a relative spacing slightly greater than the peg diameter. The shape and angular spacing of these plates are such that either will be engaged by the peg when the pin 149 attains position g, so that this pin can only move away therefrom, without leaving the right-hand selector rod, unless it moves in a direction depending on the position of said lock bolt. The shaft 292 carries a perpendicular arm 294 driven in either direction by a mechanical control device and retained in either of the end positions of plates 293 by a detent positioning device (not shown). If shaft 292 pivots through the angle permitting the passage of said plates from one to the other of these positions, the reversing member, during the next actuation, must carry along the pin 149 in the same direction as that of its preceding actuation. To this end, the opposite driving members controlling the alternating movements of rod 25 are each connected not directly to one of the contact studs of the reversing switch which are engaged by the pivoted arm 295, but to one of the two brushes 296 mounted across the end of shaft 292 by means of an insulating plate. On the circular path of these brushes, three contact studs are disposed and mounted on a stationary insulating support. The intermediate stud is connected to one of the contact studs of the reversing switch shown diagrammatically in the form of a rotary arm 295 and the two end studs are both connected to the other stud of said reversing switch. In each end position of shaft 292, one of the brushes 296 thereof engages the intermediate contact stud and the other one of the end studs. The angular movement of shaft 292 reverses the connections between brushes 296 and the fixed studs of the reversing switch, thus neutralizing the next reversal of the connections by this switch. The peg 291 may be mounted not on the rod 25 but on any other suitable component element of the reversing member which will bring it within the reach of the blades 293 when the pin 149 has attained said position g, notably on the longitudinal link actuating said pin or endwise of arm 247 of FIGURE 14. The next reversal may also be neutralized by depressing one of the pushbuttons immediately after the lock shaft rotation has occurred. The two-way flexibility of the reversing member should enable the control pin 149 to stop at midstroke. The means described for holding the pin 149 in its position g of FIGURE 9 and for releasing said pin from this position may be dispensed with if the pin brings one of the selector rods to its neutral position when the pin itself attains the end of its stroke. In this case, the rod engages only one gear, notably the reverse. As shown in FIGURE 19, the intermediate notch formed in rod 25 is widened in a direction opposed to position f of said pin in which this gear engagement is produced, this increased width corresponding to the length of half a pin stroke, so that the pin 149, when moving away from point f, will carry along the rod 25 only after the latter has attained position g, and thus the pin will move the selector rod 25 to its neutral position when the pin itself is in position a. It will engage a first forward gear ratio by moving to position b, without moving the selector rod thus left. This gear ratio may also be engaged by the pin in position f, the reverse gear being engaged through a separate mechanism.

The driver of the vehicle is kept informed, as to the transmission ratio thus engaged, by the lighting of a sign specific of this ratio. Thus, in the device illustrated in FIGURE 20, this sign consists of section of the speedometer scale covering the optimum speed range corresponding to this ratio. The section may carry the digit designating this ratio; as long as this ratio is engaged, only this digit is illuminated. When the movable pointer or index moves from this section to an adjacent section the driver knows not only that he must change the transmission ratio, but also on which side he has to move his left foot.

The graduation and digits of the speedometer scale are translucent, light colored, preferably white, and appear in sharp contrast on a flat opaque ring 297 of dark or black color. The movable member consists of a light opaque disc 298 of same color as the graduated ring and engaged without any contact under the edge of this ring. The rotary pointer or index consists of a narrow radial aperture cut in the disc 298 and having inserted therein a thin translucent strip 299 which may be flat or slightly curved, or of a thickness and cross-sectional contour adapted to effect the refraction of the light rays striking its inner face, the strip 299 having the same light color as the digits on ring 297. Under this ring and disc assembly is a fixed reflector 300 having the shape of a circular trough of adequate cross-sectional contour. It is divided by thin opaque partitions 301 disposed radially with respect to the axis of rotation of the disc and disposed flush to said disc and said fixed ring. These partitions are assumed to be firstly secured on the reflector 300 of which they accommodate the shape as close as possible, within the limits of the sections of the ring 297 which correspond each to a given transmission ratio. In each one of the compartments thus formed an elongated electric bulb 302 of white or slightly colored glass (notably yellow or green and preferably ground) is disposed across the intermediate radius of the section concerned, so as to illuminate by transparency the scale graduation included in this compartment as well as the pointer 299 as long as the latter remains in the same compartment. Simultaneously with the lighting of one of said sections, two small transparent glass electric bulbs 303 of bright red color, disposed each radially in one of the two compartments adjacent to the illuminated compartment and close to the partitions limiting this illuminated compartment, are lighted. Each bulb 303 is associated with a cylindrical reflector (not shown) adapted to reflect the light from this bulb in a direction at right angles to the rotary disc while protecting the fixed scale from its radiation. When the translucent radial pointer 299 leaves the section corresponding to the engaged gear ratio, it is no more illuminated by the same light color as the scale section but receives the bright red illumination from the small bulb 303 registering therewith. If under average operating conditions, it is deemed preferably to defer the gear change, notably in the direction of increasing speeds, up to a speed denoted by a graduation line relatively remote from the illuminated section, the red lamp positioned on this side of the partition is transferred to this graduation line in order to illuminate the pointer with red light only when the gear change becomes necessary.

The reflector 300 is isolated and connected to the insulated terminal of the generator. The filament of each bulb is connected at one end to the reflector and the other end of the filament of each main bulb 302 of a compartment, and of the filaments of the two red lamps 303 associated with adjacent compartments are insulated and connected together to an insulated stud.

If the gear change device comprises a distributor having a rotary arm (such as the arm 1 of FIGURE 1), this arm will carry along a grounded brush which successively engages the insulated studs of each group of lamps, thus closing the relevant circuit. An arm of this character is mounted on the rotary camshaft of the device illustrated in FIGURES 4 and 6. When the pin 149 is actuated by the reversing and deviator members, each one of these members will carry along, during its movement, either directly or through adequate connections, an insulated brush engaging insulated contacts corresponding to the positions in which this member may be stopped. Each brush is connected to one of the terminals of the generator. The studs engaged by the brush at each stable position of the control pin are connected through a conductor in which the group of lamps corresponding to this position is inserted. In the other cases each selector rod carries across one of its ends a short flexible blade 304 thus grounded and adapted to engage in its end position either of a pair of insulated studs 305 connected each to the group of lamps corresponding to the transmission ratio thus engaged. When no transmission ratio is engaged (neutral) another telltale lamp 306 is lighted; this lamp 306 is mounted in a compartment disposed along one radius of said reflector 300 and its circuit is closed only when none of the sectors of the scale graduation is illuminated. To this end, the conductor connecting the reflector 300 to the insulated terminal of the generator comprises a thin wire 307 tensioned between two insulated supports and extending at midlength through a metal ring 308 lined internally with an insulating sleeve. A spring having one end secured on an insulated support connects the ring 308 to said lamp 306 and tends to move the ring away from a grounded concave stud. The tension of wire 307 is adjustable by means of a screw so as to press the ring 308 against its stud and thus close the circuit of lamp 306 connected on the other hand to the insulated terminal of the generator when none of the reflector compartments is illuminated; on the other hand, the expansion of wire 307, when it transmits current to the reflector for energizing a group of lamps, enables the spring to move the ring away from its stud. The reflector 300 mounted in smooth frictional contact in an insulating casing may be moved angularly together with the set of partitions 301 and the lamps, for shifting the illuminated zones around the fixed ring 297. The reflector carries an insulated arm extending through this case and carrying on this outer end a kind of winch 309; when this winch is rotated a wire (not shown) is wound thereon so as to rotate to the right this pivoting assembly constantly urged to the left by a spring. When the conducting strip 22 is caused to engage the stud 23, the luminous information supplied by the ring are completed by a lamp connected to the circuit of coil 20 actuating the stepup gear of overdrive providing the intermediate transmission ratios, to illuminate the window 310 when this stepup gear or overdrive is engaged. The manoeuvre effecting the change from one original ratio to another original ratio transfers the illumination of said ring 298 to one of its adjacent sections where it is accompanied by the pointer. The intermediate ratio is engaged by another control action when the pointer reaches a point located approximately in the middle of the illuminated section, as follows: Against the inner edge of reflector 300, externally thereof and at a point selected to be adjacent to the mean radius of each compartment, there is secured a small complementary reflector of which the edges are flush to the rotary disc 298; this small reflector contains a red electric bulb 311 of round, elongated or other suitable shape; if an elongated bulb is used it will be directed obliquely with respect to the axis of disc 298. All these lamps 311 are connected to a branch line grounding the right-hand flexible blade 19 receiving current from the triangular cam 18 when the latter breaks the circuit of coil 20 engaging the stepup gear or overdrive.

The window of pointer 299 is provided with an extension overlying the annular zone containing the lamps 311, this extension constituting a normally dark section becoming red when it registers with a lighted lamp 311. Thus the driver is warned that another gear change has to be performed in the direction shown by the pointer movement, for engaging an intermediate gear ratio. If the control action suggested by the pointer leaving the illuminated zone previously occupied by it on ring 297 does not put out the light in this zone and in window 310, this control action must be repeated to restore the necessary correspondence between the position of said pointer and the sections of said ring which are concerned with or correspond to each transmission ratio.

A device similar to that described hereinabove is also adaptable to a speedometer having a rectilinear scale graduation, as will readily occur to anybody conversant with the art.

The red illumination of pointer 299 by lamps 303 or 311 may be confirmed by a sound signal as follows: The shaft carrying the disc 298 on its end also carries, adjacent to this disc and extending along a radius thereof, a tube open at the level of the inner end of the pointer; this tube contains a photoelectric cell 312 responsive substantially only to the light emitted by the red bulbs and producing therefrom an electric current subsequently amplified to actuate the sound signal. The pointer 299 consists in this case of a bar made from a material having the optical properties of glass, of adequate thickness and having a ground upper face and a plurality of spaced steps forming as many prisms adapted to refract the red light received from the bulbs 303 or 311 towards the photocell. The efficiency of this device may be improved by using a filter of adequate characteristics, through which only the red bulb radiation can be transmitted to the cell while substantially blocking the radiation produced by the main bulbs 302 having a color selected for this purpose, notably green. Moreover, these last-named main bulbs are disposed at the periphery of reflector 300 concentrating their light rays onto the ring 297 and the point of said optical bar, in order to protect this pointer forming bar from their radiation. Finally, this optical bar may be surrounded, except at its point and towards the cell, by an opaque screen. The cell 312 is fed with current of adequate voltage from a dry battery the circuit of which is closed by the photocell when the latter receives said red radiation. This circuit comprises an amplifier (shown in block form at 313) fed in the same manner. The amplified current is directed by a switch 314 to the coil 315 attracting a hammer striking a bell either once or repeatedly until the red lamp is extinguished.

The means already contemplated hereinabove for pivoting the conducting strip 22 with the assistance of two opposite electromagnets constitutes a convenient arrangement for predetermining the original transmission ratios between which the intermediate ratios will be inserted. On each one of the conductors provided for grounding the set of lamps associated with reflector 300 a coil 316 of an electromagnet is inserted; this electromagnet has its movable blade (connected through its pivot pin to the insulated terminal of the generator) adapted to be attracted against its contact stud connected in turn to one of the contacts 317 disposed on a circular arc. These studs 317 are adapted to be engaged by a pair of insulated adjacent brushes or movable contact arms 318 of same relative spacing as said studs 317 and mounted on a pivoting plate 319; each brush is connected to one of the coils 320 actuating by magnetic attraction exerted on their common sliding core an arm extending at right angles to said conducting strip 22. The left-hand coil 320 connected to the left-hand brush 318 is adapted to pivot said strip 22 to its transverse position in which the stepup gear is inoperative. The other coil 320 is adapted to move said strip 22 to a position in which it engages the stud 23 to energize through the connection provided by cam member 18 the coil 20 controlling the actuation of said stepup gear or overdrive. As the strip 22 remains in the position to which is was moved by the last energized coil 320, the transmission ratios to which the stepup gear will add an intermediate ratio will correspond to the stud 317 engaged by the right-hand brush 318 and to the studs disposed on the right-hand side thereof. When, with decreasing transmission ratios, the energizing current flows through the left-hand coil 320, the strip 22 is restored to its transverse position disconnecting the stepup gear for all lower ratios. The pivoting plate 319 actuated by a hand lever is held in the position causing the brushes 318 to engage their studs by means of detent positioning means engaged between pegs extending at right angles to the surface of plate 319.

The zone of the transmission ratios in which the stepup gear will be effective may be modified by altering the relative arrangement of brushes 318. The operation of said stepup gear or overdrive may be discontinued without moving these brushes by resorting to a hand-controlled switch (not shown) breaking the circuit between the insulated terminal of the generator and studs 317, while closing the circuit to the left-hand coil 320;

All the gear change devices described hereinabove are adapted to be controlled by means of an electric contact of any duration; therefore, they can be operated automatically through means corresponding to this contact when necessary. The contact may be obtained notably by causing either of two brushes or arms displaceable along a straight line and each connected to the circuit of one of said switches A or B, to engage studs connected to the insulated terminal of the generator.

The changes in transmission ratios must necessarily take place in the direction of higher gears as the vehicle speed increases and in the direction of lower gears as the vehicle speed decreases; furthermore, in each case, this change takes place at vehicle speeds that are higher as the engine torque increases at the same time. The device described hereinafter and illustrated in FIGURE 21 meets these requirements.

Figure 21:
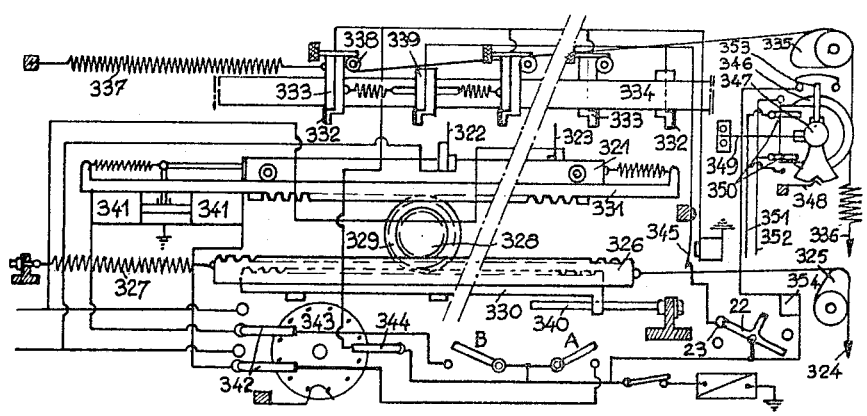
FIGURE 21 shows an automatic arrangement for gear changing by means of the pair of driver responsive pushbuttons or plungers.

It being understood that the changes in transmission ratios in the direction of higher gears take place when the brushes move to the right, these brushes are mounted jointly on the carriage 321 pulled to the right by the centrifugal force produced by the pivoted balance weights of a tachometer of known type (not shown) revolving at a speed proportional to the vehicle speed; this carriage 321 is urged to the left by an adjustable spring. Each brush consists of a flexible insulated conducting blade extending at right angles to the carriage. One brush 322 connected to the circuit passing through switch A in the nonautomatic control conditions is disposed on the visible carriage edge; the other brush 323 connected to the circuit of switch B is disposed on the opposite edge of the carriage. To permit a wide and accurate relative spacing of the contact studs, the movement received from the tachometer are transmitted to said carriage 321 through the following amplifying mechanism: The tachometer applies its torque in the direction of the arrow 324 to a pulley rigid with the grooved cam 325 to which a wire is attached and pulls one end of a sliding rack 326 urged in the opposite direction by a spring 327 adjustable by means of a screw. Meshing with the rack 326 is a pinion 328 rigid on either side, through its shaft, with a pair of toothed wheels 329 of which only the back one is shown in the figure. These wheels 329 mesh in turn at the bottom with another normally stationary rack 330 and at the top with a sliding rack 331 on which the carriage 321 carrying the brushes 322, 323 is normally held against motion. Each stud such as 332 is secured through the medium of an insulator on the lower end of a support 333 slidably mounted on the staitonary frame 334. These supports of studs 332, adapted to be engaged by brush 322, are fitted on the visible edge of frame 334; on the other hand, the supports carrying the studs engaged by the other brush 323 are fitted on the oposite edge of this frame. The studs engaged by brush 322 are secured on the lower portion of the left-hand side face of their support 333, so that the brush 322 engaging these studs during its movements to the right will clear the straight insulating edge of their support without contacting these studs during the movement of said support to the right. On the other hand, the studs 332, engaged by brush 323 during its leftward movements are mounted on the lower portion of the right-hand face of their support 333. All these studs 332 are connected jointly to the insulated terminal of the generator. Since each stud 332 must have a specific position inasmuch to the right as the momentary engine torque is higher, its support 333 is pulled to the right by a wire wound in the groove of a grooved cam of adequate contour, such as 335. The cams 335, each associated with a specific support 333 are jointly rigid with a grooved pulley having a wire anchored thereon, this wire being pulled in the direction of the arrow 336 by a member responsive to the increase in the torque developed by the engine. Thus, the pulley wire may be pulled by depressing the movement of the accelerator pedal which opens the carburetor throttle, or by a piston responsive to the pressure of the engine lubricating oil, or by the return spring of a flexible diaphragm responsive to the vacuum produced in the engine induction manifold. Each support 333 is urged to the left by a return spring 337. The wire through which the cam 335 pulls the support 333 is wound on a winch 338 mounted on the support and controlled by a worm of which the rotation controls the initial position of the support. Each support 333 may also be secured at a point selected along a rigid rod sliding in adequate bearings along the upper face of the frame 334 and having its end responsive to the cams 74 of FIGURE 4 which actuate the selector rods 25. The intermediate gear ratios are engaged as a consequence of the engagement of the studs 332, carried by intermediate supports 339 interposed on either side of the frame 334 between the studs controlling the original ratios, with brushes 322 or 323 associated therewith. These new studs are all connected to the stud 23 connected in turn to the insulated terminal of the generator through the conducting strip 22. The movements of intermediate supports 339 carrying the intermediate studs may be controlled by the movements of the adjacent suports 333 concerning the original gear ratios. As shown in FIGURE 21 these supports 333 are interconnected by spring means between which a flat rod is attached each rod extending through the corresponding intermediate support 339 secured on this rod in its initial position.

The actuation of the original supports 333 which are to provide at any time, for each of them, the position controlling the gear change at the proper time, may be produced directly by the cams 335 but only for some of them which are attached through springs to the adjacent supports 333. The pull may even be exerted by a single cam 335 to each series of support 333 lining one side of frame 334. In this case, only the last one of these supports on the right is pulled directly by the cam 335 and the next supports are interconnected by a spring, the last support on the left being resiliently connected to a fixed point or being itself fixed. The elastic means interconnecting the supports 333 may have different characteristics. Each support may be attached to the adjacent springs through the end portion of a flat rod on which it is secured at a selected point. These supports 333 may also be interconnected through any adequate kinematic nonelastic system consisting for example of hingedly interconnected links also pivotally connected to the frame 334; alternately, rack means interconnected through pinions as in the example of FIGURE 21 may be used.

The increasing relative spacing of said supports 33 in case of increasing engine torques is reduced by slowing down the movement of the carriage 321 as the speed increases, by giving to the cam 325 a contour approximating the shape shown in the figure.

If the mode of operation set forth hereinabove adapts itself to a fixed position of said contact studs 332, the supports 333 and 339 are secured on th e frame which, in this case, will travel in slideways under the control of a single cam 335.

The initial position of brushes 322 and 323 may be altered at will according to the conditions prevailing in a predetermined trip or course by causing the set of racks 330 to slide as a consequence of the rotation, in a nut or internally-threaded socket secured under the cross member interconnecting same, of a screw-threaded rod 340 actuated by a transmission controlled by means disposed within the reach of the driver's hand. On the other hand, the carriage 321 may be moved along the rack 331 by means of a pair of coils 341 secured under this rack and having a common core solid with linkage means connected to the carriage. The right-hand coil 341 responsive to switch A is adapted to move the brushes to the right for accelerating the next gear change to a higher ratio. Switch B produces the reverse effect. The carriage is restored by springs to its mean position on the rack.

The contacts of switches A and B are connected to the coils 341 through a pair of brushes 342 carried by an insulating pivoted plate 343 carrying in addition the brush 344 connected to the set of contacts mounted on a support 333. In the position shown in the figure this brush 344 carries a contact connected to the insulated terminal of the generator. The circuit fed through this brush comprises a branch line leading to the ground through a coil of which the attraction exerted on a flexible magnetic blade 345 closes the circuit from studs 332 of supports 339 and the contact stud 23 fed through the conducting strip 22. The nonautomatc control through the selector pushbuttons is restored by rotating the plate 343 to the right to its position in which the brushes 342 switch over to other contact studs. A flexible bolt maintains the plate in its end positions. The coils 341 may be dispensed with and the connections of the switch contacts may be maintained continuously. Only the pivoting brush 344 is maintained.

When the momentary value of the engine torque is given by the accelerator pedal the elastic connection between this pedal and cams 335 provides between these members a certain relative lost motion which may be used to advantage, but on the other hand this lost motion may also require a retarding action on cams 335. To this end the rotation of these cams is slowed down by a liquid-flow brake, notably of the type described hereinafter: Between the spring pulled by the accelerator pedal and cams 335, the wire transmitting the pull is wound without slip on a grooved pulley surrounding a drum 346 open only towards its cylindrical shaft 347 on which it rotates through fluid-tight bearings. The shaft is carried by a bearing at the back of said drum in which it is firstly assumed to be held against motion. The drum and shaft carry each, internally of said drum, an abutting radial blade, whereby the drum is divided into two compartments adapted to be altered in shape and interconnected by a pair of bent ducts extending through said shaft 347 at the root of the shaft blade. The liquid therein is prevented from flowing between these compartments by a ball valve in one direction through one duct and in the other direction through the other duct. This flow is throttled in each duct by a needle valve having a screw-threaded shank which engages the duct from the adjacent shaft end. The same mechanism is associated with cams 325. The duct in which fluid is caused to flow when the drum 346 rotates clockwise as shown in the figure has a relatively wide branch section closed by a spring-loaded valve, the latter being unseated, as long as the engine torque does not attain a predetermined value, by a coil responsive to a hand-controlled switch or an adjustable contact responsive to the drum. The energizing circuit of this coil is connected in series with a telltale lamp. When the lamp is lighted a sudden depression of the accelerator pedal in the direction of the arrow 336 will drive the drum without any appreciable resistance while the cams 325 are braked. The studs of brush 323, which are pulled to the right, engage this brush to control the engagement of a lower transmission ratio promoting the acceleration. A sudden slowing down will produce the same change if only the drum is braked during its counterclockwise rotation.

The following mounting, adapted when operated to de-energize the above-mentioned coil, may be provided for altering differently, under the sole control action of the accelerator, the behaviour of the automatic control system, by sustituting a switch for the connections to brushes 322 and 323 with the circuits of switches A and B as shown in FIGURE 21, this switch providing normally the same connections by reversing one of them and eliminating the other one, if necessary. The shaft 347 may then revolve freely in its bearings (not shown). However, it is normally held in the position in which its blade is aligned with the drum blade by a flexible strip 348 having an elbow or boss engaged in the intermediate notch of a cam face concentric and solid with shaft 347. The pressure of this positioning member is adjustable by screw means (not shown). Another flexible blade 349 having one end fitted in a projection of shaft 347 has its other end engaged in the gap formed between fixed pegs and urges the shaft to this position. Behind this blade 349 and secured at right angles to shaft 347 is an insulating plate carrying a pair of brushes 350 connected through conductors (not shown); the upper brush in the figure leads to switch A and the lower one to switch B. These brushes are adapted to engage four studs by turns, according to the arrangement shown in FIGURE 21, these studs being thus connected alternatively to a pair of conductors 351, 352. When the switch mounting is substituted for the connections of brushes 322, 323 illustrated, the first conductor 351 is constantly connected to brush 322 and conductor 352 to brush 323. Brush 350 connected to the circuit of switch A engages in its normal position a contact stud connected by conductor 351 to brush 322; the other brush 350 engages a stud connected to brush 323. These contact studs normally engaged by brushes 350 are spaced from the adjacent end stud by a distance inferior to the relative spacing of the brushes, so that when one of these brushes engages one of the end studs and is stopped in this position by means not shown, the other brush has no contact whatsoever.

As long as the movements of the accelerator pedal are slow or moderate, the liquid flow between the drum compartments limits the effort transmitted to the elastic locking or positioning blade 348 to a value too low to move this blade out from its notch. If on the other hand the pedal is suddenly depressed home the blade 348 is extracted from its notch due to the elastic tension either of the accelerator pedal or of springs 337. The brush 350 towards which the rotation of shaft 347 is thus caused to take place becomes disconnected from the brush 322 or 323 corresponding thereto in its normal position (as shown in the figure) to engage the adjacent end stud connected to the other one of these brushes.

More particularly, if the pedal held until then in its lowermost or fully-depressed position is suddenly released, notably for stopping the vehicle or before negotiating a curve, the contact studs 332 to be engaged by the brush 322 when the latter is moved to the right will engage this brush during their leftward travel caused by the tension of springs 337 while this brush itself is held against motion as will be explained presently. However, due to the freshly established connection between said brush 322 and the lower brush 350 connected to the circuit of switch B, the gear shift controlled through these contact studs will take place in succession in order of decreasing transmission ratios. The reverse sequence of operations permits a fast engine acceleration through low transmission ratios increasing subsequently by turns, and also of engaging the first one of these transmission ratios. The cams 325 are held against motion by means of a noninsulated brush 353 solid with shaft 347 and engaging only in the endmost positions of this shaft on its fixed bearing either of a pair of insulated studs connected to coil 354 constantly connected in turn to the insulated terminal of the generator. When the circuit of this coil is closed through the engagement of brush 353 with one of its companion studs, the coil actuates a brake or lock means (not shown) for holding against rotation the pulley rigid with cams 325. To prevent, if required, undesired gear changes likely to be controlled by the accelerator movements, each stud engaged by the brushes 350 in their endmost positions is connected to a conductor 351 or 352 corresponding thereto in the figure through a switch (not shown) normally urged to its open position by a spring and closed only by the energization of an electromagnet through a circuit adapted to be closed by a push member within each of the driver's hand or finger, notably in the form of a ring concentric to the steering wheel. At the same time this push member restores the brake application on drum 346 and may, in addition, actuate an electromagnet releasing a spring-loaded bolt normally engaging a notch in shaft 347 thus held against movement in its mean position. Thus, the predetermined sequence of gear changes controlled in the increasing or decreasing order by the sudden actuation of the accelerator pedal takes place only if the driver's fingers depress said last-named push member, and ceases when this push member is released. The action of the push member may also be started by briefly depressing same, and subsequently stopped by exerting another pressure thereon. This sequence of gear changes may be discontinued at a predetermined ratio by limiting in each direction of rotation, the angular movement of drum 346 as follows. To this end, this drum 346 carries near its opposite or nonvisible edge a perpendicular peg adapted to engage in either direction a stop member. Each stop member consists of a flat rod constituting the extension of a sliding core of a coil carried by an arm fulcrumed on a pivot pin concentric with shaft 347. The aforesaid flat rod, normally retracted within the coil by a spring, projects in the path of said peg only when the energizing circuit of its coil is closed by the aforesaid push member. The angular position of each arm carrying one of the coils is determined by a transmission member within reach of the driver.

When the automatic gear change operation is eliminated by rotating the plate 343 in the clockwise direction it is still possible to change speed by simply depressing the accelerator pedal if the hand-actuated push member through which these gear changes can be effected closes at the same time the connection between the insulated terminal of the generator and another contact stud (not shown) receiving the brush 344. In a modified form of embodiment of the gear-change arrangement shown in FIGURE 21 the sliding members are semi-circular instead of rectilinear.

Figure 20:
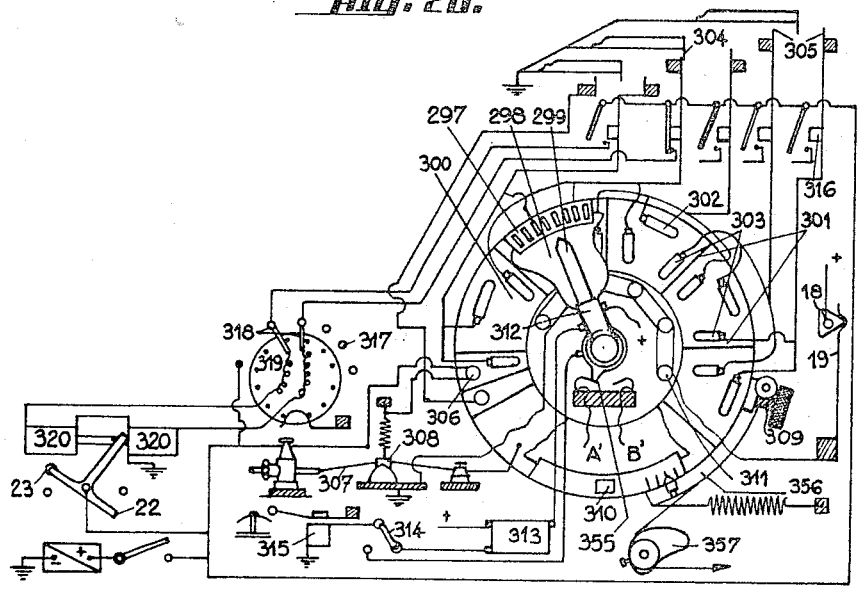
FIGURE 20 shows the monitoring and signalling system on the speed indicator.

The pointer 299 of FIGURE 20 registers with the red lamps 303 located on the right-hand side of a partition 301 only when it moves in the direction of increasing speeds, and with the red lamps 303 positioned on the left-hand side of a partition when it revolves in the opposite direction; therefore, this pointer behaves like the brush 322 with respect to its contact studs in the first case, and like brush 323 in the second case. This feature permits, by using the device illustrated in FIGURE 20 for controlling the coil 315, of providing an automatic gear change control arrangement similar to the preceding one, with the assistance of the speedometer shown in FIGURE 20 to which the following description refers.

The shaft of disc 298 driven through a sufficient magnetic torque is rigid with an insulating sleeve outflared or widening towards the disc 298 to constitute a kind of flat collar. Mounted for free rotation on this sleeve is a conducting ring 355 formed with a boss or cam lobe. A helical compression spring (not shown) surrounds said sleeve and urges the ring 355 against said flat collar for rotatably coupling the latter with this ring during its rotation. After a short angular movement the ring engages with its lobe one or the other of a pair of fixed flexible studs and is thus stopped thereby. The left-hand stud is connected through a conductor A′ to the contact of switch A, and the right-hand stud is connected through conductor B′ to the contact of switch B. To switch the device to automatic gear change control conditions the pivoted switch 314 applies the current delivered by the amplifier 313 to a stud connected through a flexible conductor to said ring 355. The contact formed between the ring lobe and the flexible stud engaged thereby closes the circuit of the corresponding switch A or B, so that the registration of pointer 299 with red lamps 303 and 311 will increase the transmission ratio when the vehicle speed increases, and will reduce this ratio when the vehicle speed decreases. The intermediate ratios are introduced by the engagement of conducting strip 22 with the stud 23 closing the energizing circuit of red lamps 311 interposed between adjacent red lamps 303. These lamps 303 and 311 having the same function as the contact studs 332 in the device illustrated in FIGURE 21, they are moved in the same manner as these studs 332 as a function of the momentary torque delivered by the engine. More particularly, each lamp 303 or 311 is solid with a sliding carriage movable along circular slideways concentric with disc 298. The lamps 303 are mounted on their carriage either directly or through an arm carried radially thereby. The carriages carrying each a lamp 303 which are disposed on the right-hand side of a partition 301 are interconnected by spring means. The carriage of the first one of these lamps 303 on the left is resiliently connected to a fixed point through adjustable means. The spring driving the last one of these lamps 303 on the right-hand side has an extension in the form of a wire attached to the remotest end of a circular cam face 356 concentric to disc 298 and mounted likewise on a carriage of said circular slideway. The winch 309 mounted in this case at the opposite end of cam face 356 pulls a wire anchored in the groove of a grooved cam 357 rigid with a pulley receiving a wire of which the traction in the direction of the arrow corresponds, as in the case of cams 335, to the momentary value of the engine torque. The cam face driving winch, in combination with the adjustable fastening of the carriage of the first left-hand lamp 303, controls the distribution of the various lamps 303 located on the right-hand side of partition 301, which, when registering with the pointer 299, controls the shifting to original ratios in the increasing order. The carriages supporting the lamps 303 disposed each on the left-hand side of one of said partitions 301 which alternate with the carriages of the lamps of the preceding series, are similarly interconnected through springs, the last spring on the right leading to another cam face of which the winch 309 is connected to another grooved cam rigid with cam 357. The red lamps 311 adapted to control the engagement of the intermediate ratios are also each mounted on a carriage of the circular slideway, this carriage being connected on either side through spring means to the carriages of the aforesaid lamps 303 of the other series which are housed in a same compartment. Lamp 311 is mounted on the end of a radial arm secured on a carriage whereby said lamp registers with the bottom of pointer 299. The lamp 302 is mounted on the other end of this arm and registers with the fixed ring 297 and the index end or point of said pointer 299. Each partition 301 is solid with the lamp 303 disposed on its left-hand side. The springs interconnecting the carriages of the lamps 303 in a same series are attached either directly to the carriage or to a selected point of a semicircular cross member parallel to said slideway and secured on the carriage. These springs differ by their length and elasticity in such a way that the relative spacing of the lamps increases more towards the right when, as the engine torque increases, the cams 357 revolve in the direction of the arrow. The carriages are provided with grooved rollers parallel to said slideway and rolling on a rail provided along the outer edge of this slideway and urged thereagainst by the oblique traction of the springs interconnecting the carriages. According to an alternate form of embodiment, the lamps are carried each by a rotary arm mounted on a fixed tube surrounding the shaft of disc 298. The shank of the tangent worm associated with each winch 309 has an extension in the form of a flexible transmission member leading to a pinion. The pinions of the two winches are drivingly connected through a third pinion within reach of the driver; by rotating this third pinion, the distribution of lamps 303 is modified as well as the automatic operation as a function for example of a predetermined course. This adjustment is carried out by means of a pointer carried by the upper cam face 356 which moves along a graduated scale on the fixed ring 297. The connections of switches A and B are maintained to preserve the possibility for the driver of a quick control action. The electronic circuit may be protected by a valve inserted in the wire connecting the amplifier 313 to said ring 355. This conductor may comprise a contact device consisting of two insulated blades each lining the upper face of a contact arm of one of said switches A or B. These blades are connected together and in their inoperative position they engage the one, one of the studs connected to said ring and the other, a stud connected to the amplifier, so that the closing of any one of said switches A or B will break the circuit of ring 355. The vehicle is started by depressing the selector pushbuttons. The means controlling cams 335 and the reversal of the connections of brushes 350 when the accelerator pedal is suddenly depressed are adaptable to the automatic change speed control means responsive to the lighting of the red lamps, by resorting to the following modifications of the switching system illustrated in the right-hand portion of FIGURE 21: In this case, the drum 346 is attached to the wire actuating the cams 357 having the same function as cams 335. Conductors 351 and 352 are eliminated. The upper brush is constantly connected to the contact stud of switch A; the other brush 350 is connected to the contact stud of switch B. The contact normally engaged by the first one of these brushes is connected to conductor A′. The contact normally engaged by the other brush is connected to conductor B'. The endmost studs engaged by these brushes upon completion of their angular movements are connected jointly to the conductor delivering current to amplifier 313. Coil 353 energized as in the preceding case holds the disc 298 against motion by pressing its flexible edge against the lower face of said rigid ring 297. When the existing red lamps (of which some are lighted) as well as other red lamps, as will be explained presently, are responsive to the rotation of cams 357 actuated like cams 335 for moving towards the pointer 299 thus held against motion, they determine the gear changes obtained through the control means of FIGURE 21 due to the switching device shown in the right-hand portion of this figure. The automatic gear change control utilizing the photocell 312 may be neutralized by switch 314 or another switch inserted in the circuit between ring 355 and amplifier 313. The possibility of changing the gear ratio by simply depressing the accelerator pedal is still maintained due to the connection, with the amplifier, of the end studs engaged by either of brushes 350 when the manual push member releases the shaft 347 with which they are rotatably solid. This connection may comprise, if necessary, a switch adapted to be closed by the same push member so that the sequence of gear changes is discontinued when the push member is released.

To obtain at low vehicle speed, with this novel device, the shifting to a lower gear by means of a sudden acceleration, the coil provided to this end for the automatic control arrangement of FIGURE 21 releases the drum 346 for clockwise rotation. Moreover, its circuit energizes the required red lamps and actuates a switch suspending the permanent connection to the upper brush 350 while connecting the other brush to said ring 355. This circuit is preset as long as the transmission ratio remains lower than a predetermined ratio by means similar to those causing the strip 22 to rotate in the arrangement of FIGURE 20, and becomes operative by depressing the accelerator home to close a contact.

A modified form of embodiment (not shown) of the automatic control arrangement responsive to the position of lamps 303 and 311 has no electronic circuit. In this case, the ring 355 is constantly connected to the insulated terminal of the generator. The shaft of disc 298 carries in front of said pointer 299 a pair of superposed insulated brushes of unequal lengths. One brush connected to conductor A' engages with its outer end insulated contact studs carried each by the rotary carriage or arm supporting one of the lamps 303 mounted on the right-hand side of a partition 301. These studs are connected through flexible conductors to the stud of switch A. The other brush connected to conductor B' is similarly adapted to engage insulated contact studs solid with the lamps 303 mounted on the left-hand side of a partition 301, and connected jointly to the stud of switch B. The support of each lamp 311 carries two insulated contact studs each engageable by one of said brushes. The two studs engaged by a same brush may both be connected through a switch to the set of contact studs mounted on the supports of lamps 303 which are engaged by these brushes. The two switches are closed by the mechanism moving the conducting strip 22 to its position of engagement with stud 23. However, due to the moderate pressure exerted by the brushes on the contact studs, an amplification of the current transmitted therethrough may be necessary. To ensure a sound contact between these brushes and the contact studs, as in the case of the lobe of ring 355, the torque driving the disc 298 may be derived from a device similar to that driving the rack 326 or any other equivalent device. The gear change controlled only by the actuation of the accelerator pedal makes it necessary to complete, notably on either side, by means of additional contact studs 332, each series of said contact studs which are normally engaged by the brushes 322 or 323. Similarly, in the automatic gear change control arrangement responsive to the photo-electric cell 312 the push-member releasing the shaft 347 causes the lamps 303 to be de-energized by insulating the reflector; it will simultaneously switch on a group of these lamps and other lamps continuing their series. Thus, the circuit connecting to the amplifier the endmost contact stud engaged by the upper brush 350 comprises, at least partly, lamps disposed on the right-hand side of a partition 301, and other similar and likewise movable lamps constituting the extension of their series. The circuit of the other endmost stud energizes the lamps located on the left-hand side of a partition and the lamps next thereto. More simply stated, the two endmost contact studs are both connected to the amplifier through a circuit energizing new lamps mounted in front of, or in alignment with, the partitions 301 and disposed notably on the circle of lamps 311, or these very lamps if necessary, as well as movable lamps constituting their extension on either side.

Whatever the form of embodiment of the gear control arrangement contemplated, a convenient switch actuated device permits of disconnecting instantaneously the engine from the drive wheels. The switch actuates at the same time the engine clutch. When the gear change arrangement is controlled by a circular distributor of the type illustrated in FIGURE 1, this distributor comprises a pulley concentric to the disc 3 and has a flexible wire secured in its groove and adapted to be wound when the gear ratio increases. The wire is attached at its other end on a magnetic core sliding in a coil and urged by a spring so as to tension the wire moderately. When the coil circuit is closed by the switch, the core moves the arm to the position in which no gear is engaged. Moreover, in the case of the device illustrated in FIGURE 2, the switch opens the circuit of coil 35 or discontinues the engine feed; in the case of the system shown in FIGURE 7 the switch energizes the circuit of brushes 128. In the devices illustrated in FIGURES 4, 5 and 6 the switch closes the circuit energizing the motor 77 in the direction to decrease the transmission ratios until the cams 74 have resumed their position shown in FIGURE 5 so that a projection on disc 88 opens this circuit.

In the forms of embodiment wherein the control pin 149 is responsive to a set of reversing and shifting or deviator members, this control pin 149 is connected through wires to the sliding cores of a pair of opposite fixed coils parallel to the longitudinal axis of the vehicle and constantly urged by a weak spring whereby they can follow without any appreciable resistance the movements of said control pin. The switch closes the circuit of the coil bringing said control pin back to register with the transverse channel of the grid of FIGURE 9. At the same time the core of a third coil forming the extension of said channel attracts said control pin to its position g.

The electromagnets controlled by the switch may actuate in turn driving members by means of fluid under pressure or vacuum acting in the same manner.

To summarize, the essential objects of the invention is a device for changing the speed ratio in an automotive vehicle by means of two pushbuttons one of which increases this ratio while the other decreases it. One embodiment of the invention makes use of a revolving distributor the contacting arm of which rotates in either direction under the control of either the pushbutton to effect the electrical connections engaging the transmission gear combinations according to successive ratios increasing in one direction and decreasing in the opposite direction. The invention provides means for inserting in any cases intermediate speed ratios between the original ones.

The other embodiments relate to transmission gear combinations obtained through gears caused to intermesh by the sliding motion of selecting rods.

A subsidiary mechanism may substitute itself for the driver during the change of speed ratio to operate the clutching out of the engine and to actuate the throttle.

Another embodiment comprises synchronously rotating cams driving each one a selecting rod.

Each selecting rod may also be operated by a separate actuator.

In the arrangements reproducing the action of the manual speed change lever which successively actuates each selecting rod through a finger engaging a transverse recess of said rod, said finger is reciprocally moved along said rods and shifted according to requirements at the mid-stroke towards the adjacent selecting rod. Such a shift is obtained either by the force proper of the longitudinal translation owing to the slant reaction of a resilient member, or by a separate force.

The principle of the control of speed ratio change by means of two pushbuttons may also be used for self-acting control depending both of the vehicle speed and of the tractive effort developed by the engine.

The above descriptions refer to exemplary forms of embodiment only and should not be construed as limiting the invention, since many modifications and variations may be brought thereto without departing from the scope of the invention as set forth in the appended claims.

What I claim is:

1. A control device for changing the rotational speed ratio of the driving wheels and of the engine of an automobile vehicle fitted with an accelerator pedal acting upon the throttle, a clutch and successively usable separate groups of transmission gears corresponding to given speed ratios respectively, comprising two separate driver-responsive selectively operable operated selector members, acted upon separately for increasing and decreasing the speed respectively, a clutch out control system for said engine, coupled for simultaneous action with each selector member, at least one multiposition reversably movable pilot distributor the successive positions of which correspond to said given speed ratios respectively, said pilot distributor being variably connected to said selector members and adapted to be actuated in a different direction of speed variation by each of them; servomotor means operatively connected to said pilot distributor for being separately energized through same, and variable coupling means operatively connected to said servomotors, respectively for selectively engaging one group of said transmission gears at a time.

2. A device according to claim 1, wherein said selector members are operatively connected to a pair of upward projecting pushbuttons respectively, arranged adjacent the side edges of the clutch pedal or on the vehicle floor in case of automatic clutching and comprise drawback means urging said pushbuttons toward their inoperative positions respectively.

3. A device according to claim 2, comprising at least one additional speed varying relay operatively connected to said pilot distributor and adapted to add to the original speed ratios an at most equal number of additional speed ratios.

4. A device according to claim 3, comprising at least one medial speed changing relay associated in parallel with said pilot distributor and adapted to insert intermediate speed ratios between the original speed ratios.

5. A device according to claim 2, comprising a pair of oppositely acting linkage means directly connecting said pair of pushbuttons respectively to said pilot distributor.

6. A device according to claim 2, comprising a pair of oppositely acting servo-assisted transmission means connecting said pair of pushbuttons respectively to said pilot distributor and including each one a fluid operated power unit directly connected to and actuated by the corresponding pushbutton.

7. A device according to claim 2, comprising a pair of oppositely acting servo-assisted transmission means connecting said pair of pushbuttons respectively to said pilot distributor and including each one at least one electric servomotor, and an electric circuit arrangement operatively connecting said servomotor to a main electromagnetic contactor unit the energizing circuit of which includes an on-off switch having an open home position and mechanically connected to the corresponding pushbutton.

8. A device according to claim 7, wherein both of said on-off switches form a single double throw changeover switch having at least two working positions and shiftable in opposite directions by said pushbuttons.

9. A device according to claim 7, wherein said pilot distributor is an electric rotary multiple contact master controller the fixed contacts of which are connected to electromagnetic clutches respectively adapted to engage at least one of said groups of transmission gears, so that the rotation of said controller in one direction causes the changing of said speed ratios according to their speed increasing sequence.

10. A device according to claim 9, wherein said medial speed changing relay comprises an electric servomotor energized by a time-lag subsidiary circuit arrangement selectively connectable to the respective working circuit of each aforesaid main contactor unit through a delayed-acting commutator with triggered driver-responsive two ways on-off switch for energizing and de-energizing said subsidiary circuit which comprises an automatic changeover switch connected to the working circuit of said main contactor units respectively and alternatively interconnecting both of said working circuits, and triggered switch being inserted in series in one of said connections.

11. A device according to claim 5 wherein each variable coupling integrally interconnecting at least some of the components of the group of transmission gears engaged, is a clutch actuated by a fluid operated actuator connected to a rotary plug valve acted upon by said pushbuttons.

12. A device according to claim 10, associated with a gear box type transmission having parallel shafts successively interconnectable in rotation to obtain stepped speed ratios by means of a sliding and rotating gear coupling member, comprising a set of selecting rods slidably movable parallel to said shafts and carrying each one a gear shift fork freely pivoted to one rotating and sliding gear coupling member, each selecting rod being longitudinally shiftable in at least one operative end position engaging one group of said transmission gears and in a mean neutral position, whereas said device further comprises resilient drawback means urging each selecting rod towards its neutral position, and resilient locking means with controlled holding means, common to all of said selecting rods and at least one followup servocontrol mechanism connected to said pilot distributor.

13. A device according to claim 12 comprising means for simultaneously and automatically carrying out the double clutching combined with an intermediate acceleration of the engine.

14. A device according to claim 13, comprising an electromechanical system phase-locked through a contactor relay with each one of said pushbuttons and including a mechanical transmission resiliently connected to the acceleration pedal and connecting this latter to the throttle, a first long pull electromagnet actuator the plunger of which is coupled to said mechanical transmission and which is adapted to neutralize said acceleration pedal, a second long pull electromagnet actuator the plunger of which is coupled to said mechanical transmission, said second electromagnet actuator having an adjustable field and being provided with an accelerating return spring, said plunger of said second electromagnet actuator being integral with a dashpot like pressure and vacuum damper fitted with a controlled valve and with adjustable flow passages, relays and electromagnetic clutch actuators operating in relation to the control of said throttle, and feedback contact means for carrying out the sequence of operations in a given order of succession.

15. A device according to claim 12, wherein said pilot distributor is a camshaft extending substantially transversely to said selecting rods and carrying a plurality of cams equal in number to said selecting rods, each cam corresponding to one selecting rod which is connected to a cam follower engaging said cam, the operative profile of which comprises radially varying portions causing said selecting rod to shift reciprocally.

16. A device according to claim 15, comprising at least one reversibly rotatable electric servomotor with a self-acting fail-safe brake, which servomotor is resiliently connected through a torque limiting clutch to a reducing gear driving said camshaft in either direction through equal angular amplitudes, an electric control circuit connected to a changeover switch mechanically actuated by either of said pushbuttons and including stop limit members carried by a rotary electric servodistributor connected to said camshaft to be rotatable in unison therewith, and selfacting locking means for said camshaft.

17. A device according to claim 16 comprising phase-lock contacting members for triggering the subsidiary control circuits of said relays and for engaging said intermediate and additional speed ratios, said subsidiary control circuits also controlling said doubleclutch and accelerating system, said phase-lock contacting members being carried by said electric rotary servo-distributor whereas temporary stop means are provided for said camshaft to assist the synchronization of the gears to be engaged in the gear box.

18. A device according to claim 17, comprising synchronizing brake means operatively connected to the actuating means of said selecting rods and adapted to slow down the approach of the synchromeshes of the gear box prior to their engagement.

19. A device according to claim 17, comprising only said subsidiary circuit for introducing said intermediate speed ratios in addition to the original speed ratios, and delayed-acting means adapted to previously cause the synchronizing approach of the gears to be engaged within the gear box through stopping said reversible electric servomotor in the neutral position of said selecting rods while the vehicle engine is clutched and accelerated.

20. A device according to claim 12, comprising separate actuator means for each selecting rod and two independent electric circuits successively energized by either of said pushbuttons.

21. A device according to claim 20, wherein said first independent electric circuit is common to all of said selecting rods and comprises means for returning to its neutral position any selecting rod which is in one end position at the time of clutching out, whereas said second independent circuit includes means preparing and causing the engagement of the next gear combination.

22. A device according to claim 21, comprising a driving shaft common and extending substantially perpendicular to all of said selecting rods to which it is connected through respective bevel gears including each one a pair of driving pinions meshing at two diametrically opposed locations with a same driven pinion operatively connected to a corresponding selecting rod, and separate electromagnetic clutches provided on said driving pinions respectively for selectively connecting same to said driving shaft.

23. A device according to claim 12, comprising a driving finger shiftable in a direction parallel to said selecting rods and in a direction substantially perpendicular to said selecting rods, each selecting rod being formed with an open transverse notch for removably receiving therein said driving finger to reciprocate each selecting rod in its longitudinal direction, guiding grate means engaged by said driving finger for guiding same in the longitudinal and sidewise directions and formed with longitudinal channels corresponding to said selecting rods respectively and with a single transverse channel common to all of said selecting rods and wherein said driving finger is reciprocally shiftable in the neutral position of that selecting rod which is engaged by said driving finger; a revers-ing member controlling the alternate longitudinal displacements of said finger, a shifting member controlling the sidewise displacements thereof, a control transmission and a coordination system for said reversing and shifting members, in operating relationship with both of said pushbuttons.

24. A device according to claim 23, wherein said reversing member comprises a connecting rod pivoted at one end to said driving finger and at the other end to the hoop of an eccentric carried by and resiliently connected to a drive shaft actuated by either of said pushbuttons, and selfacting lock means for said drive shaft.

25. A device according to claim 23, wherein said reversing member comprises a rod pivoted at one end to a fixed point and resiliently connected at its other end to said driving finger, said rod consisting of two telescopic parts comprising a double acting servomotor integrated with that part which is pivoted to said fixed point and controlled by a changeover switch.

26. A device according to claim 23, wherein said reversing member comprises a rod resiliently connected to said driving finger and to a screw coupling mechanism powered by a reversible actuator.

27. A device according to claim 23, wherein said reversing member comprises a trolley longitudinally reciprocable in a direction parallel to said selecting rods and operatively connected to a double acting electric servomotor, a support integral with said driving finger and slidably mounted in said trolley for transverse reciprocation therein in a direction substantially perpendicular to said selecting rods, an electric revolving drum controller for making the changeover commutations for said electric servomotor and of the dependence of said pushbuttons, and a double acting shifting member resiliently connected to said sliding support and in operating relation to said revolving drum controller.

28. A device according to claim 27, comprising a second driving finger integral with said sliding support and adapted to cause the engagement of said additional speed ratios.

29. A device according to claim 27, wherein said double acting electric servomotor is a rotary reversible electric motor resiliently coupled through a clutch to a gear meshing with a toothed rack connected to said trolley.

30. A device according to claim 27, wherein said double acting electric servomotor consists of a pair of counteracting long pull electromagnets the plungers of which are respectively connected to said trolley.

31. A device according to claim 23, wherein said shifting member consists of an obstacle obliquely opposing a resilient resistance to the longitudinal motion of said driving finger connected to said reversing member, which driving finger is then displaceable sidewise through elastic release of said obstacle.

32. A device according to claim 31, wherein said shifting member comprises a plate extending substantially parallel to said selecting rods and slidably movable in guides in a direction substantially perpendicular to said selecting rod, a pair of strong opposing springs connected each one to a fixed point and to said plate for urging same towards a mean position, a pair of parallel slides slidably mounted in said plate for reciprocating motion in the direction of displacement of said plate, said slides being each one connected to said plate by a pair of weak opposing springs urging said slides toward their mean positions, each slide corresponding to a direction of longitudinal motion of said driving finger and carrying a plurality of substantially parallel plane strips extending obliquely with respect to said slide and substantially perpendicular to said plate, said strips corresponding in number and in relative mean position to the longitudinal channels of said guiding grate of said driving finger, a pair of spring-biased stop means provided on said plate and movable between operative and inoperative positions, each of said stop means being resiliently urged towards its inoperative position and being adapted to engage in its inoperative position one respective slide when this latter moves in a direction opposite to the sidewise shift of said driving finger, and a separate electromagnetic actuator for each of said stop means to move same in its operative position upon actuation of one of aforesaid pushbuttons, said driving finger being connected to a roller adapted to engage one of said strips during its longitudinal motion in either direction.

33. A device according to claim 31, comprising a carriage longitudinally reciprocable parallel to said selecting rods and to the plane thereof and connected to said reversing member, a frame slidably mounted on said carriage and reciprocally movable in a plane parallel to said selecting rods in a direction perpendicular to these latter, a slide part carrying said driving finger and slidably mounted on said frame to be reciprocally movable parallel to the direction of relative motion of the latter, a pair of opposing springs connecting said slide part to said frame and urging said slide part towards a mean position, two movable spring-biased stop means urged towards their inoperative position and provided in symmetrical relationship on said frame, separate electromagnetic actuator means associated with each movable stop means to move same in operative position upon actuating one of said pushbuttons, and further stop means which are fixed with respect to said carriage and arranged in the path of each one of said movable stop means respectively in the operative positions thereof, during displacement of said carriage in either longitudinal direction to which correspond said stop means respectively.

34. A device according to claim 31, comprising a carriage longitudinally and reciprocally slidable parallel to said selecting rods and to the plane thereof, at least one double acting electric servomotor resiliently coupled to said carriage and energizable through a circuit operated by either of said pushbuttons, a guided slide reciprocally and longitudinally movable parallel to said carriage and formed longitudinally with a set of spaced notches equal in number to said selecting rods, electromagnetically controlled lock-means integral with said carriage and adapted to engage one of said notches to integrally connect said guided slide with said carriage, resilient lock means with electromagnetic hold, mounted on a fixed part and adapted to lock said guided slide relative to said carriage, a transversely reciprocally movable support slidably mounted on said carriage, a rocking lever pivoted to said carriage and swingable about an axis perpendicular thereto, one arm of said lever being pivoted to one end of a link the other end of which is pivoted to said support whereas the other arm of said lever is integral with a resiliently deformable element connected to said guided slide, a transverse shaft carried by said carriage, a longitudinal arm slidably and rotatably mounted on said shaft and connected at its end to said driving finger, a driving bracket integral with said support and in bilateral engaging relationship with said arm, and an electric circuit for automatic commutation for phase-locking the moving mechanical part to the operation of either of said pushbuttons and including movable and fixed contacts integral with said relatively movable and fixed parts respectively.

35. A device according to claim 31, comprising a first transverse swinging arm the pivot of which is substantially perpendicular to the plane of said selecting rods, said arm being resiliently connected to at least one double acting electric motor energizable through a changeover switch operable by either of said pushbuttons, the end of said first arm being connected through a link to said driving finger and said arm being integral with a moving contact adapted to alternatively engage two respective fixed contacts connected to said ON-OFF switches operated by said pushbuttons, a second swinging arm mounted on a pivot which is coaxial with that said first arm, the end of said second arm being connected through a rod to said link, an electromagnetic clutch for resiliently and temporarily interconnecting said arms, said electromagnetic clutch being electrically connected to the circuits of said contacts.

36. A device according to claim 25, comprising one aforesaid reversing member with a telescopic rod, the double acting actuator of which is energized through the respective circuits of said pushbuttons, one aforesaid shifting member having a similar telescopic rod resiliently connected to that of said reversing member, said shifting member being provided with an actuator energizable through an aforesaid electric servo-distributor electrically connected to said respective circuits of said pushbuttons.

37. A device according to claim 31, wherein said shifting member is operated by an actuator powered by an elastically compressible fluid and comprising means for slowing down the action of said fluid and means for storing elastic energy for said reversing member.

38. A device according to claim 31, comprising means for slowing down the action of said reversing member so that sufficient time be available for the elastic force of said shifting member to store energy to allow previous adjustment of said elastic force.

39. A device according to claim 38, wherein said slackening means consist of valve members adjusting the flow rate of said elastic fluid in the conduits connecting the pressure source supplying said elastic fluid to said reversing and shifting members respectively.

40. A device according to claim 39, comprising locking means adapted to retain said driving finger on that selecting rod which has just been engaged by said driving finger.

41. A device according to claim 40, wherein said locking means consists, for at least each one of some intermediate selecting rods, of a thin fixed obstacle arranged vertically along the centre line of said selecting rod and having a size just sufficient to prevent said driving finger from running past said selecting rod resting in its neutral position, said driving finger being able to pass round said obstacle as soon as it has left it.

42. A device according to claim 41, comprising an aforesaid reversing member consisting of two opposing fluid operated rams energized by the vacuum induced by the admission of gases to the engine with the throttle closed, said rams being pivoted by their moving parts through crank means to a reversing rod carrying said driving finger; one aforesaid shifting member comprising a double way vacuum operated shifting ram, a shifting lever pivoted to a fixed swivel bearing, a sliding rod slidably mounted in said shifting lever and pivoted to said reversing rod and to said driving finger, said sliding rod being connected through a flexible connection to the moving part of said shifting ram, and at least one electromagnetically controlled vacuum distributing valve connected to said rams and an electrofluid commutating circuit to phase lock said distributing valve to the operation of either of said pushbuttons.

43. A device according to claim 1, wherein said selector members are controlled through a set of hand operated preselecting piano keys.

44. A device according to claim 40, wherein said means for retaining said driving finger in its position on each aforesaid selecting rod in the neutral position thereof, are assisted by a locking arrangement limiting to its position the displacements of said driving finger in either direction.

45. A device according to claim 44, wherein said locking arrangement comprises for each aforesaid selecting rod, a stop element integral with a part connected to said selecting rod, and a rotary mechanically driven shaft, reciprocally rotatable between two extreme stable resiliently locking positions and carrying two axially and angularly spaced abutments adapted to unilaterally engage said stop element when said driving finger reaches its aforesaid position, said shaft carrying a pair of angularly spaced electric contacts adapted to make the changeover electrical connections.

46. A device according to claim 45, wherein the intermediate transverse notch of each aforesaid selecting rod is enlarged by a length substantially equal to one-half stroke of said driving finger in the direction opposite to the position of said driving finger wherein a speed ratio is actually engaged.

47. A device according to claim 7, comprising a light signal system for indicating the particular speed ratio being used.

48. A device according to claim 47, wherein said light signal system comprises scale portions of the speed indicator defining the respective speed ranges corresponding to the various speed ratios, lighting means for each of said scale portions separately lit for each speed ratio being used and alarm means acted upon when the dial pointer of said speed indicator leaves the illuminated scale portion and indicating towards which direction of variation the speed change has to be effected.

49. A device according to claim 48, which is fully automatic and phase locked to the speed and to the actual tractive effort of the driving wheels and comprising a reciprocally movable contact carrying member, spring-biased in one direction and displaceable in the opposite direction by the centrifugal force developed by the moving weights of a tachometer rotating at a speed proportional to that of the vehicle, two resiliently flexible contacts constituting the movable contacts of both aforesaid ON-OFF switches and carried by said carriage, an amplifying mechanical transmission interconnecting said tachometer and said carriage, two sets of contact members arranged in the path of said flexible contacts respectively which make the contact in either direction of motion respectively, and a resiliently connecting mechanism coupled to the acceleration pedal.

50. A device according to claim 49, comprising at least one double acting electric servomotor for moving said carriage in either direction and an electric switching circuit for phase locking said servomotor to both of said pushbuttons.

51. A device according to claim 49, comprising a hydraulic brake for slackening said resiliently connecting mechanism and the action of which is depending upon the velocity and displacement of the acceleration pedal, and a switching system associated with said brake.

52. A device according to claim 49, comprising means for providing a phase locked relationship with said speed indicator through a circuit arrangement including at least one photoelectric cell responsive to said light signal means.

References Cited by the Examiner
UNITED STATES PATENTS

| | | | |
|---|---|---|---|
| 2,637,425 | 5/1953 | Long et al. | 192—.092 |
| 3,064,774 | 11/1962 | Maurice | 192—.092 X |
| 3,182,778 | 5/1965 | Droschel | 192—.092 |

DAVID J. WILLIAMOWSKY, *Primary Examiner.*

A. T. McKEON, *Assistant Examiner.*